(12) United States Patent
Pal et al.

(10) Patent No.: US 6,863,343 B2
(45) Date of Patent: Mar. 8, 2005

(54) VEHICLE HEADREST APPARATUS

(75) Inventors: Chinmoy Pal, Yokosuka (JP); Izumi Kobayashi, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 21 days.

(21) Appl. No.: 10/446,123

(22) Filed: May 28, 2003

(65) Prior Publication Data

US 2004/0000807 A1 Jan. 1, 2004

(30) Foreign Application Priority Data

Jun. 26, 2002 (JP) .................................. 2002-186689
Nov. 15, 2002 (JP) .................................. 2002-332715

(51) Int. Cl.$^7$ ............................................ B60N 2/42
(52) U.S. Cl. ............................................ 297/216.12
(58) Field of Search ............................. 297/391, 216.1, 297/216.12, 406, 407

(56) References Cited

U.S. PATENT DOCUMENTS

| 3,101,973 | A | * | 8/1963 | Toth ........................ 297/391 |
| 5,080,436 | A | * | 1/1992 | Meiller ..................... 297/391 |
| 6,082,817 | A | * | 7/2000 | Muller ..................... 297/216.12 |
| 6,220,668 | B1 | * | 4/2001 | Scheffzuck ................ 297/391 |
| 6,623,073 | B2 | * | 9/2003 | Schafer et al. ........... 297/216.12 |
| 2003/0030309 | A1 | | 2/2003 | Pal et al. |
| 2003/0122409 | A1 | | 7/2003 | Pal et al. |
| 2003/0151279 | A1 | * | 8/2003 | Fowler ..................... 297/216.12 |

FOREIGN PATENT DOCUMENTS

| JP | 06-059163 U | 8/1994 |
| JP | 07-291005 A | 11/1995 |

* cited by examiner

*Primary Examiner*—Milton Nelson, Jr.
(74) *Attorney, Agent, or Firm*—Shinjyu Global IP Counselors, LLP

(57) ABSTRACT

A vehicle headrest apparatus has a headrest unit that is mounted to an upper end of a seatback. The headrest unit has a head restraining member with a flexible sheet restraining member configured to be tensioned to restrain a passenger's head when a controller detects a rear-end collision. The head restraining member has a vertical support portion facing the head of the passenger and a horizontal support portion substantially perpendicular to an upper part of the vertical support portion. When a rear-end collision occurs, tension is applied to at least the vertical support portion. In some embodiments, the vertical and horizontal support portions are both formed by the flexible sheet restraining member. In other embodiments, only the vertical support portion is partially formed by the flexible sheet restraining member, and the vertical and horizontal support portions are made of a resilient material having an excellent shape-retaining property.

41 Claims, 51 Drawing Sheets

VEHICLE HEADREST APPARATUS

BACKGROUND OF THE INVENTION

1. Field of the Invention

The present invention generally relates to a vehicle headrest apparatus that is used on a vehicle seat and supports the head of a seated passenger. More specifically, the present invention relates to a vehicle headrest apparatus that is configured to reliably restrain a passenger's head and suppress the rearward movement of a passenger's head when a rear-end collision occurs by actuating a headrest unit itself.

2. Background Information

An example of an automobile seatback system is disclosed in Japanese Laid-Open Patent Publication No. 7-291005 in which the seatback is designed to protect the head of a seated passenger in the event of a rear-end collision. In particular, this Japanese publication discloses a seatback that bears the dynamic load acting on a seated passenger due to the inertia force when a vehicle is subjected to a rear-end collision. The movement of a member that is displaced as a result is transmitted to a headrest support arm and the headrest unit moves toward the front of the vehicle. As a result, a large rearward movement of the seated passenger's head can be prevented.

Another example of an automobile seatback system is disclosed in Japanese Laid-Open Utility Model Patent Publication No. 6-59163. In the automobile seatback system of this publication, when a rear-end collision occurs, a sensor built into the seatback is depressed strongly by the inertia force of the seated passenger and an airbag is deployed from inside the headrest unit. As a result, even if a space exists between the neck area of the seated passenger and the headrest unit, the passenger's head can be prevented from moving rearward.

In view of the above, it will be apparent to those skilled in the art from this disclosure that there exists a need for an improved a vehicle headrest apparatus. This invention addresses this need in the art as well as other needs, which will become apparent to those skilled in the art from this disclosure.

SUMMARY OF THE INVENTION

It has been discovered that in the above mentioned seatback systems that the headrests are actuated using the inertia force of the seated passenger. Thus, these headrest units do not begin moving forward until the rearward displacement of the passenger is large. Consequently, these head rest units cannot be moved sufficiently forward during the period immediately after the collision when the amount of displacement is still small. In short, the head restraining effect of the headrest is reduced.

Moreover, it has been discovered that in the above mentioned seatback system of Japanese Laid-Open Patent Publication No. 6-59163 that an explosive sound is produces near the seated passenger's ears when it deploys. This imposes a severe stress on the passenger's ears. In addition to the severe stress imposed on the passenger's ears, there is the risk that the protective effect of the airbag will decline if a rear-end collision occurs when the passenger's head is positioned close to the headrest unit.

In view of these shortcomings, the present invention seeks to provide a vehicle headrest apparatus that quickly and reliably restrains a seated passenger's head during a rear-end collision without utilizing the inertia force of the passenger's body by detecting the rear-end collision and pushing the headrest unit alone outward in the forward direction of the vehicle.

Thus, one object of the present invention is to provide a vehicle headrest apparatus that can restrain a passenger's head reliably when a rear-end collision occurs by actuating headrest unit itself.

In the present invention, a vehicle headrest apparatus is provided that basically comprises a headrest portion, a head restraining member and a tensioning device. The headrest portion with a mounting member is configured to be mounted to an upper end part of a seatback. The head restraining member includes a vertical support portion arranged to face towards a passenger's head and a horizontal support portion arranged substantially perpendicular to the vertical support portion. The tensioning device isoperatively coupled to the head restraining member to apply tension to at least part of the vertical support portion when a rear-end collision occurs.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
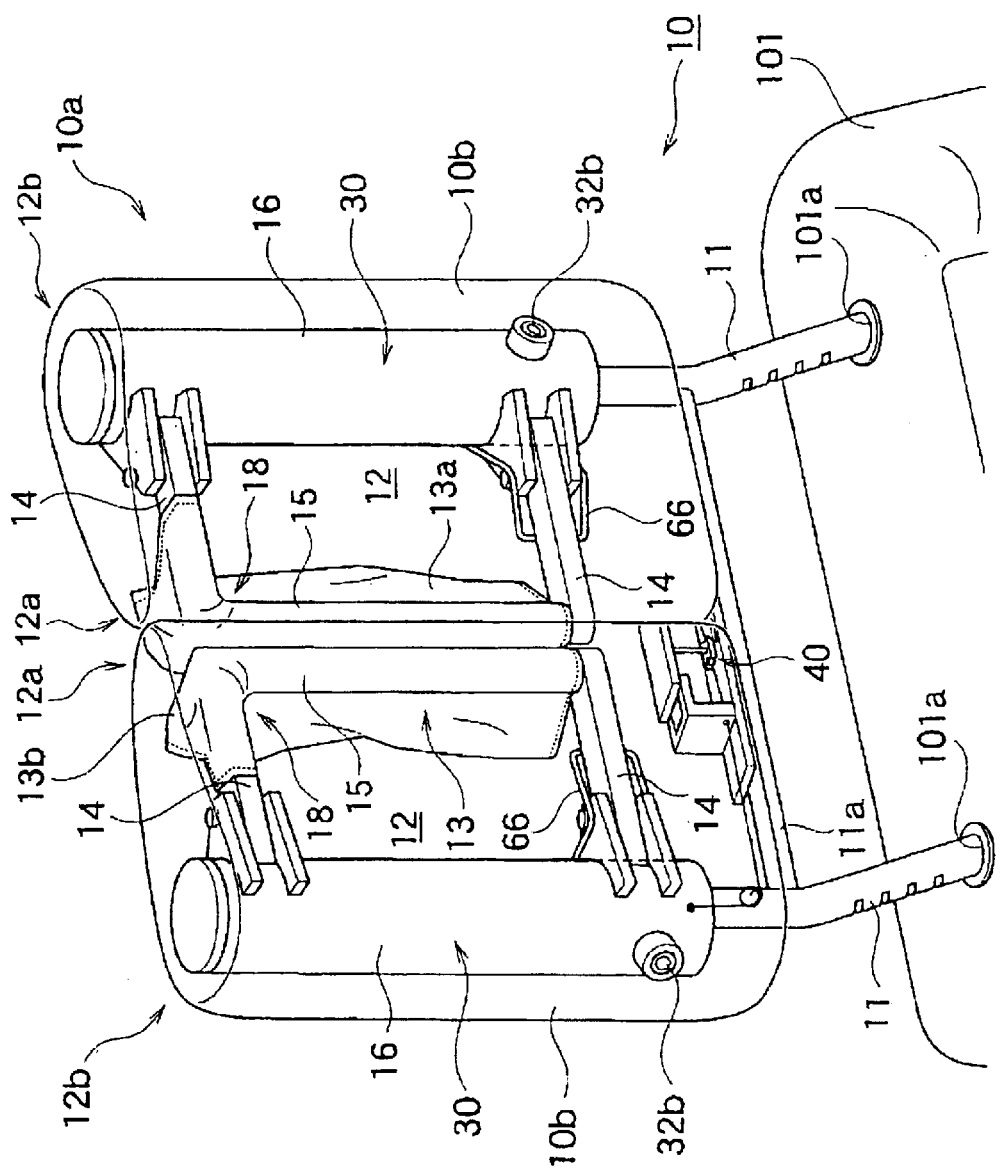
FIG. 1 is a front perspective view of a headrest unit (portions being transparent for purposes of illustration) in accordance with the first embodiment of the present invention when in the initial state.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

As explained below in greater detail, the present invention is directed to a vehicle headrest apparatus that is configured to reliably restrain a passenger's head and suppress the rearward movement of a passenger's head when a rear-end collision occurs by actuating headrest unit itself. The vehicle headrest apparatus basically includes a head restraining member having vertical and horizontal sheet support portions with a vertical tension applying member that applies tension to the vertical sheet support portion and a horizontal tension applying member that applies tension to the horizontal sheet support portion when a rear-end collision occurs. As a result, the vertical sheet support portion (which faces the passenger's head) can stop a rearward movement of a passenger's head caused by an inertia force and restrain the passenger's head without delay.

Since the head restraining member is provided with a horizontal sheet portion in addition to the vertical sheet support portion, the passenger's head can be restrained by the horizontal sheet support portion as well. Consequently, the head restraining capacity of the head restraining member is increased further, rearward movement of the passenger's head can be suppressed effectively, and the head of a seated passenger can be protected.

Moreover, as explained below, the vehicle headrest apparatus uses a swinging force that swings the left and right headrest members forward and upward from an initial storage position. When a rear-end collision occurs, the left and right headrest members are unlocked based on the detection of the rear-end collision so as to swing forward and upward to push the head restraining member toward the front of the vehicle, enabling the passenger's head to be restrained against rearward movement. Compared to pushing the entire headrest unit forward, this arrangement allows the head restraining member alone to be pushed out quickly and reliably, thus enabling the passenger's head to be restrained more promptly.

In some of the embodiments discussed below, the head restraining member is made of an elastic material having an excellent shape-retaining property, the shape of the head restraining member can be maintained regardless of the amount by which the left and right headrest members are swung. As a result, the passenger's head can be reliably restrained even while the left and right headrest members are still in the process of being deployed.

As used herein to describe the various embodiments, the following directional terms "forward", "rearward", "above", "downward", "vertical", "horizontal", "below" and "transverse" as well as any other similar directional terms refer to those directions of a vehicle equipped with the present invention. Accordingly, these terms, as utilized to describe the present invention should be interpreted relative to a vehicle equipped with the present invention.

First Embodiment

Figure 2:
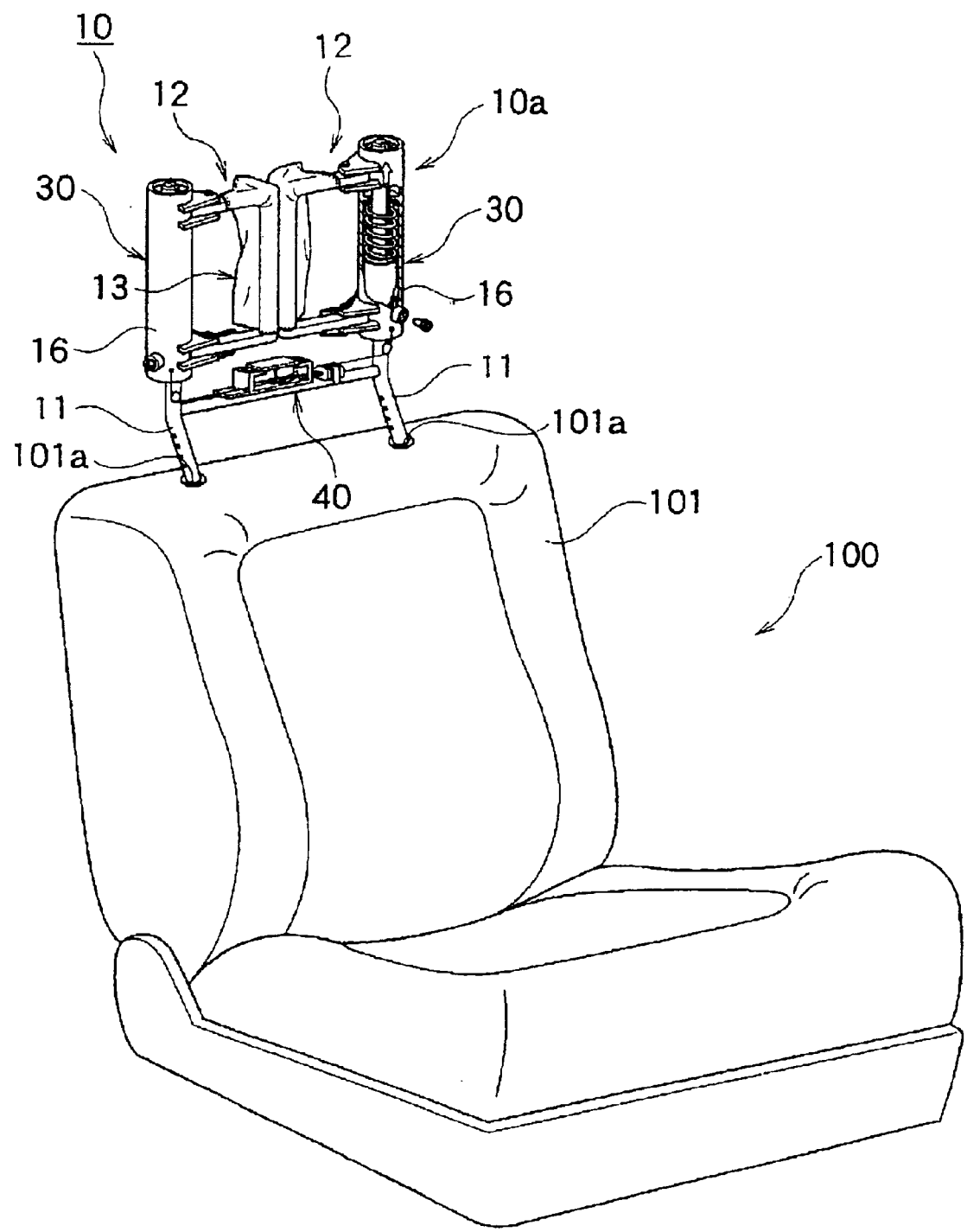
FIG. 2 is an overall perspective view of a seat installed with the headrest unit of the first embodiment of the present invention with the cushion pads removed for purposes of illustration.
Figure 3:
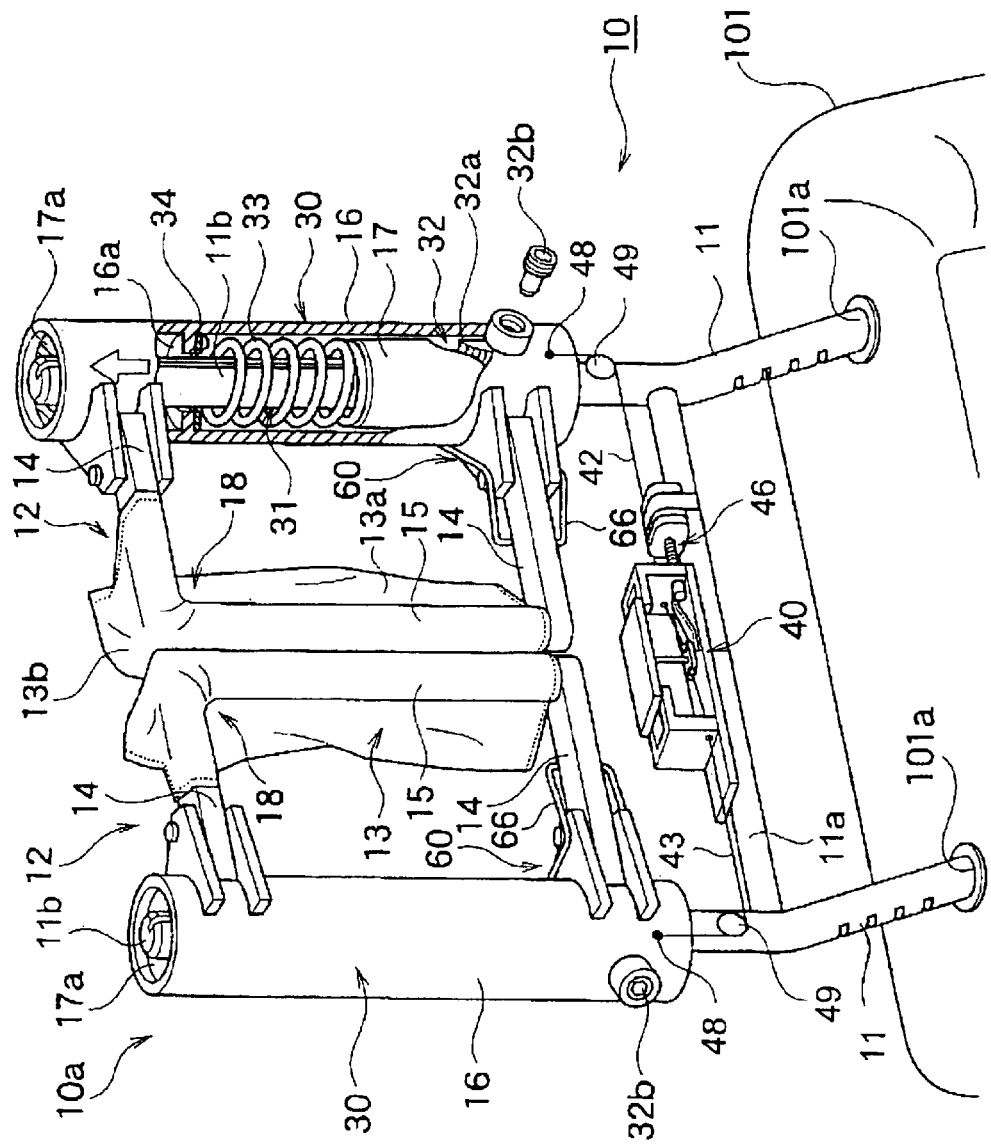
FIG. 3 is an enlarged perspective view of the headrest unit of the first embodiment of the present invention with portions broken away to show some of the main components.

Referring initially to FIGS. 1 to 18, the vehicle headrest apparatus 10 is illustrated in accordance with a first embodiment of the present invention. FIG. 1 is a front perspective view of the headrest unit in an initial state. FIG. 2 is an overall perspective view of a seat installed with the headrest unit. FIG. 3 is an enlarged perspective view of the headrest unit depicting a main component in a cross-sectional manner. As shown in FIGS. 1 to 3, the vehicle headrest apparatus 10 of this embodiment includes a headrest unit 10a with a mounting member comprising a pair of stays 11. The vehicle headrest apparatus 10 is adjustably coupled to a vehicle seat 100 by the stays 11. More specifically, the vehicle headrest apparatus 10 is attached to the upper end part of a seatback 101 of the vehicle seat 100. Thus, the headrest unit 10a is arranged to support the head of a seated passenger sitting in the vehicle seat 100. The stays 11 of the headrest unit 10a are mounted in a pair of mounting holes 101a that formed in the upper end part of the seatback 101, The headrest unit 10a is mounted such that its vertical position can be adjusted relative to the upper end part of a seatback 101 of the vehicle seat 100 by the stays 11.

A connecting member 11a is welded to the bottom end parts of the stays 11 such that the connecting member 11a spans the space therebetween. The connecting member 11a serves to rigidly couple the stays 11 together. The headrest unit 10a is mounted to the projecting end parts 11b of the stays 11, which project upward from the connecting member 11a.

As shown in FIG. 1, the headrest unit 10a basically comprises a pair of (left and right) headrest members 12 and a thin flexible sheet member 13 that serves as a flexible sheet head restraining member that can restrain a passenger's head H. The left and right headrest members 12 are mirror image of each others, and thus, the same reference numerals and symbols will be used for each of the headrest members 12. The headrest members 12 divide the headrest unit 10a in half at a point located approximately midway along the transverse dimension of the headrest unit 10a.

Figure 4:
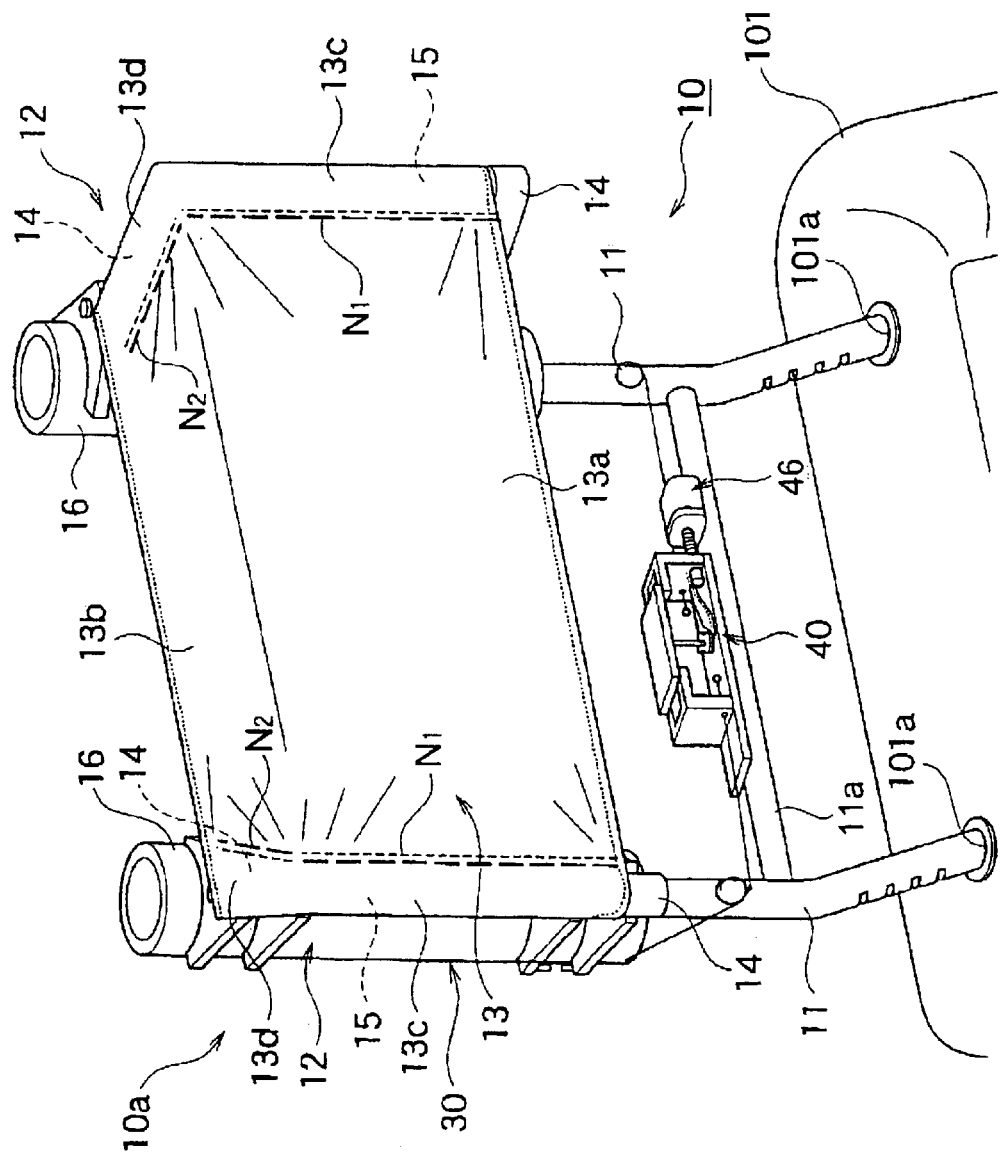
FIG. 4 is a front perspective view of the headrest unit of the first embodiment of the present invention in a completely deployed state with the cushion pads removed.
Figure 5:
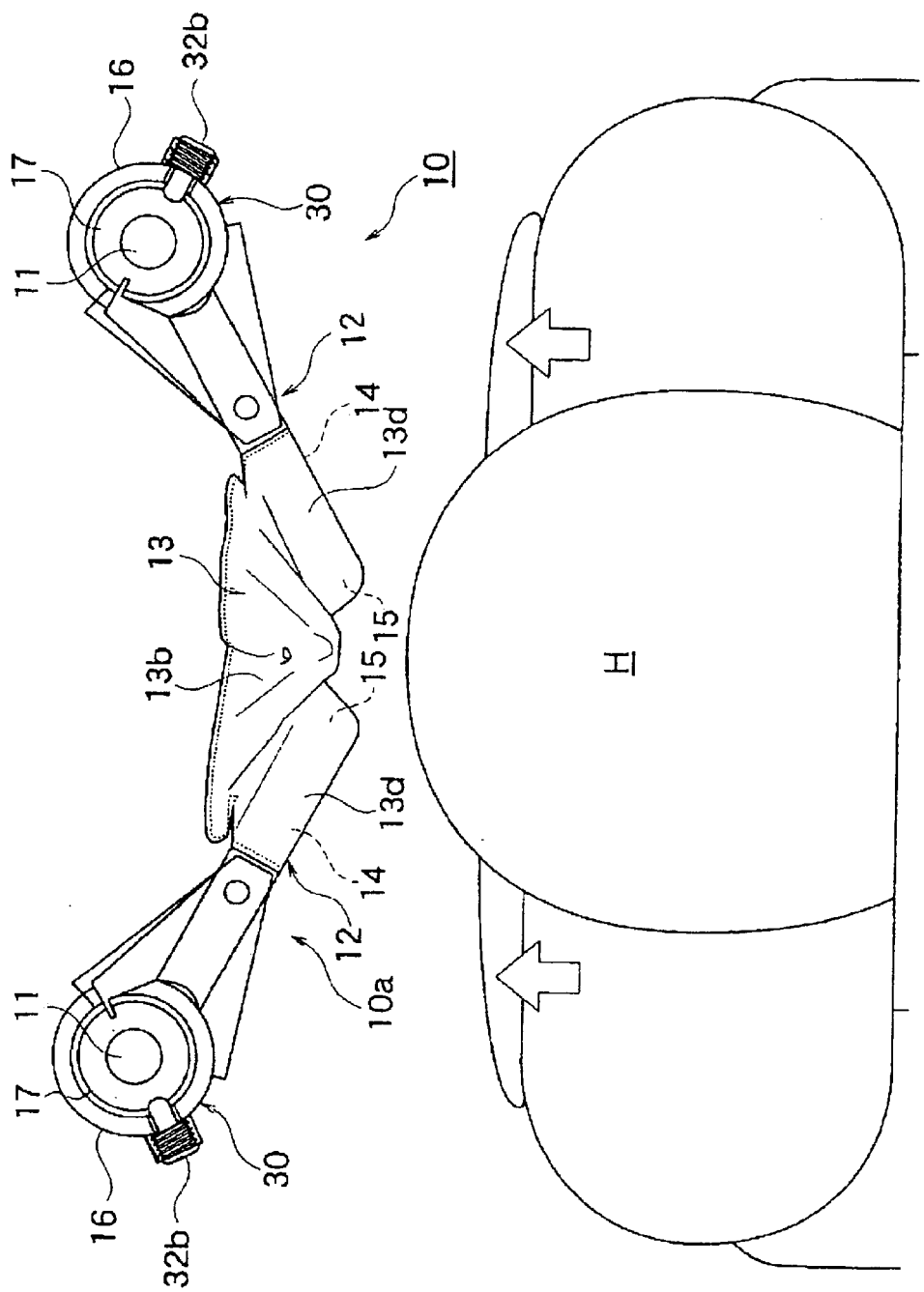
FIG. 5 is a simplified top plan view of the headrest unit of the first embodiment of the present invention while deployment is in progress.
Figure 6:
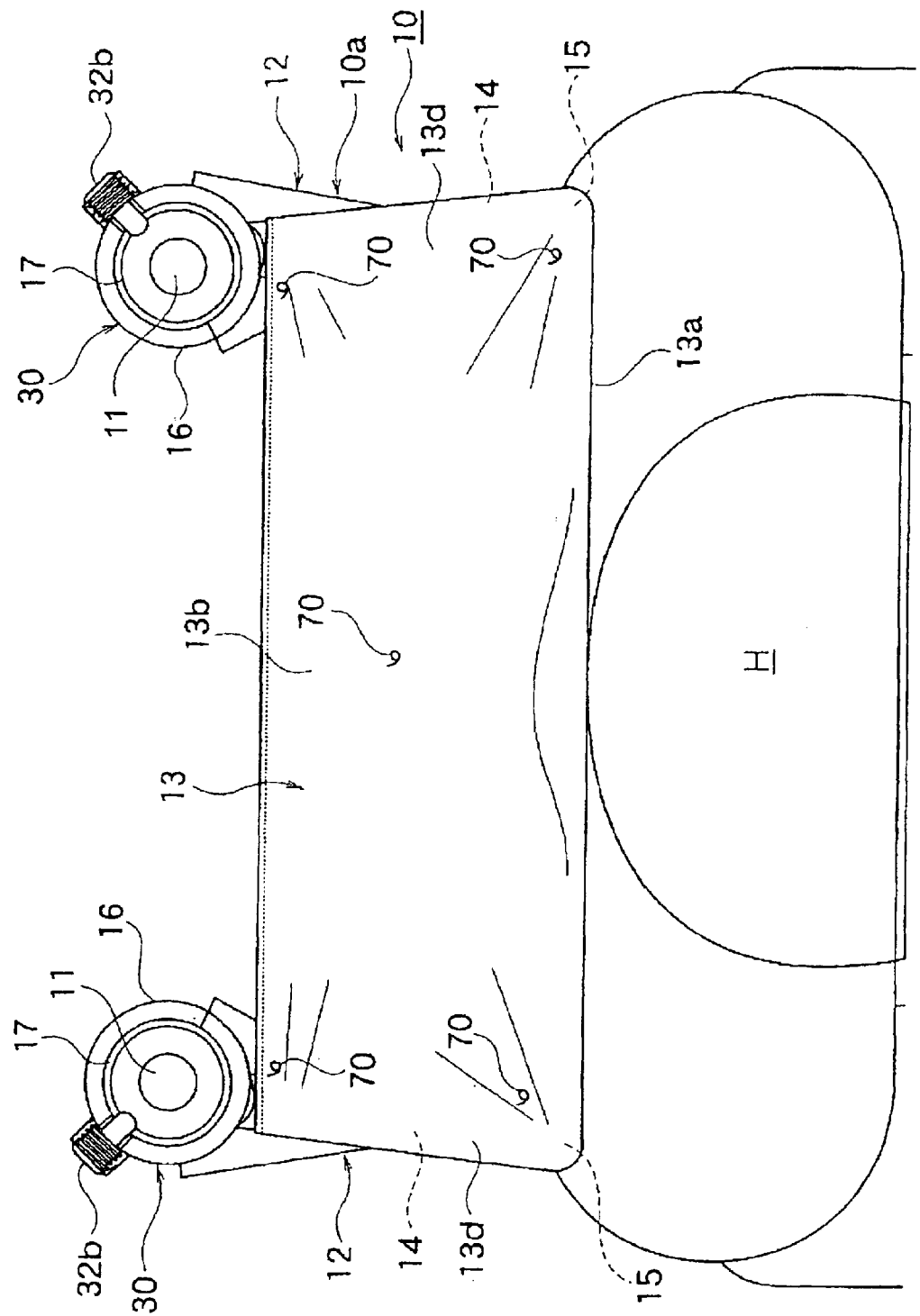
FIG. 6 is a simplified top plan view of the headrest unit of the first embodiment of the present invention after deployment has been completed.

The thin flexible sheet member 13 is moved form a retracted position to an extended position in which the flexible sheet member 13 is expanded towards the passenger's head H. In particular, the flexible sheet member 13 is in a folded state when in the retracted storage position, and is in an expanded state when in the extended deployed position where the flexible sheet member 13 is under tension. The headrest members 12 include a tensioning device or mechanism for holding the flexible sheet member 13 in the expanded state such that the flexible sheet member 13 is under tension as discussed below. The sheet member 13 is arranged so as to span between the free end parts 12a of the left and right headrest members 12. As shown in FIG. 4, the flexible sheet member 13 is provided with two or more leaves, including at least a vertical sheet support portion 13a that faces the passengers head H (see FIG. 5) and a horizontal sheet support portion 13b that is substantially perpendicular to the upper part of the vertical sheet support portion 13a.

The end parts 12b on the opposite sides of the left and right headrest members 12 are each mounted to the stays 11 through a swing force applying device 30 (which serve as a deployment mechanism) in such a manner that they can rise upwardly and swing forward, applying a forward swinging force (toward the front of the vehicle) to the left and right headrest members 12.

The swing force applying device 30 normally stores the sheet member 13 in the storage position shown in FIG. 1, but when a rear-end collision occurs, it deploys the sheet member 13 so as to push the flexible sheet restraining member forward to a deployed position as shown in FIG. 4.

Each of the headrest members 12 comprises a pair of horizontal frame members 14 fixedly coupled to a vertical frame member 15 to form a rigid U-shaped tensioning member that is pivotally mounted to an outer cylinder 16. In other words, the left and right headrest members 12 each have a generally rectangular frame portion that comprises the following: the outer cylinder 16 that forms the shell of the swing force applying device 30; the upper and lower horizontal members 14 that extend horizontally from the upper and lower end parts of the outer cylinder 16; and the vertical member 15 that joins the upper and lower horizontal members 14 together at the ends that are closer to the free end parts 12a. The rigid U-shaped tensioning members hold the flexible sheet member 13 in the folded state when in the retracted storage position, and in the expanded state when in the extended deployed position. The upper horizontal members 14 serve a horizontal tension applying device or member, while the vertical members 15 serve as a vertical tension applying device or member. These frame portions are each covered with a cushion pad 10b.

The sheet member 13 is made of a pliable sheet material having a high tensile strength, such as canvas. As shown in FIG. 4, the horizontal sheet support portion 13b is formed integrally with the vertical sheet support portion 13a so as to extend directly rearward from the upper edge of the vertical sheet support portion 13a.

The transversely facing ends of the vertical sheet support portion 13a and horizontal sheet support portion 13b of the sheet member 13 are folded back and sewn (seams N1 and N2) along their full lengths so as to form pocket sections 13c and 13d, into which the vertical members 15 and the upper horizontal members 14 are inserted as seen in FIG. 4.

The ends of the cushion pads 10b corresponding to the free end parts 12a are provided with openings through which a middle section of the vertical sheet support portion 13a and the horizontal sheet support portion 13b of the sheet member 13 are passed.

An inner cylinder 17 is fitted in a stationary manner around the outside of the bottom part of the projecting end part 11b of each stay 11 as shown in FIG. 3. The outer cylinders 16 are fitted onto the inner cylinders 17 such that they can rotate freely and can slide in the axial direction. Thus, the left and right headrest members 12 can rotate about the inner cylinders 17 in the manner of a double-hinged door.

The sheet member 13 is configured such that it is stored in a folded state when the left and right headrest members 12 are closed, as shown in FIG. 1. When the left and right headrest members 12 are pushed opened to the preset maximum opening (maximum swing state) as shown in FIG. 4, the vertical members 15 are projected forward such that a prescribed spacing is provided between them in the transverse direction. This causes the vertical sheet support portion 13a and the horizontal sheet support portion 13b to be fully deployed between the vertical members 15 and the upper horizontal members 14.

When the vertical sheet support portion 13a and horizontal sheet support portion 13b are fully deployed, the tensile forces applied to the vertical sheet support portion 13a and the horizontal sheet support portion 13b through the vertical members 15 and the upper horizontal members 14, respectively, are dictated by the forward swing force applied by the swing force applying device 30.

The vertical members 15 and the upper horizontal members 14 that apply tension to the vertical sheet support portions 13a and the horizontal sheet support portion 13b are arranged such that the upper horizontal members 14 are coupled to the outer cylinders 16 and the vertical members 15 are connected integrally to the tip end parts of the upper horizontal members 14. As a result, tension can be applied to the vertical sheet support portions 13a and the horizontal sheet support portions 13b in a synchronized manner. This structure, in which the vertical members 15 are joined integrally with the upper horizontal members 14, constitutes the tension synchronizing device 18.

A flange-shaped end plate 17a is fixed to each of the upper ends of the projecting end parts 11b of the stays 11, as shown in FIG. 3. The upper end parts of the outer cylinders 16 fit around the outer circumferences of the end plates 17a in such a manner that the outer cylinders 16 can rotate freely as well as slide freely in the axial direction. Thus, the upper end parts of the outer cylinders 16 are supported by the outer circumferences of the end plates 17a.

Each of the swing force applying device 30 is equipped with a lift mechanism 31 that raises the left or right headrest member 12 with respect to the stay 11 and a swing mechanism 32 that swings the left or right headrest member 12 forward in conjunction with the raising action of the lift mechanism 31.

The lift mechanism 31 comprises a spring 33 compressed between the upper end face of the inner cylinder 17 and an annular reduced-diameter part 16a formed integrally on the inside of an upper part of the outer cylinder 16. A washer 34 is provided between the spring 33 and the reduced-diameter part 16a to facilitate sliding.

Consequently, the outer cylinders 16, and thus the left and right headrest members 12, are constantly subjected to an upwardly pushing force applied by the spring 33 of the left mechanism 31.

As shown in FIG. 3, each swing mechanism 32 comprises a helical groove 32a formed in the outer circumference of the inner cylinder 17 and a bolt 32b that screws into the outer cylinder 16 and serves as a mating element.

The helical groove 32a is slanted in such a direction that the left and right headrest members 12 are swung forward as they move upward and the tip end part of the bolt 32b mates with the helical groove 32a such that it can slide freely therein.

Thus, when the left and right headrest members 12 are pushed upward by the springs 33 of the lift mechanisms 31, the bolt 32b of the swing mechanism 32 moves upward while following the helical groove 32a in the inner cylinder 17. As a result, the outer cylinder 16, being integrally joined with the bolt 32b, swings in such a manner as to push the left and right headrest members 12 open in the forward and upward direction.

The amounts by which the left and right headrest members 12 swing can be established in advance by adjusting the slant angle of the helical grooves 32a. Likewise, amount of swing per amount of upward rise of the left and right headrest members 12 can also be adjusted by adjusting the slant angle of the helical grooves 32a.

A lock device 40 is provided on top of a middle section of the connecting member 11a provided between the pair of stays 11 as shown in FIG. 3. The lock device 40 controls the locked state and the released state of the left and right headrest members 12. More specifically, the lock device 40 serves to control whether the left and right headrest members 12 are held in an initial position (FIG. 1) where they are locked to the stays 11 in resistance to the forces applied by the swing force applying device 30 or released (FIG. 4) such that the swing force applying device 30 can raise them upward and swing them forward.

Figure 7:
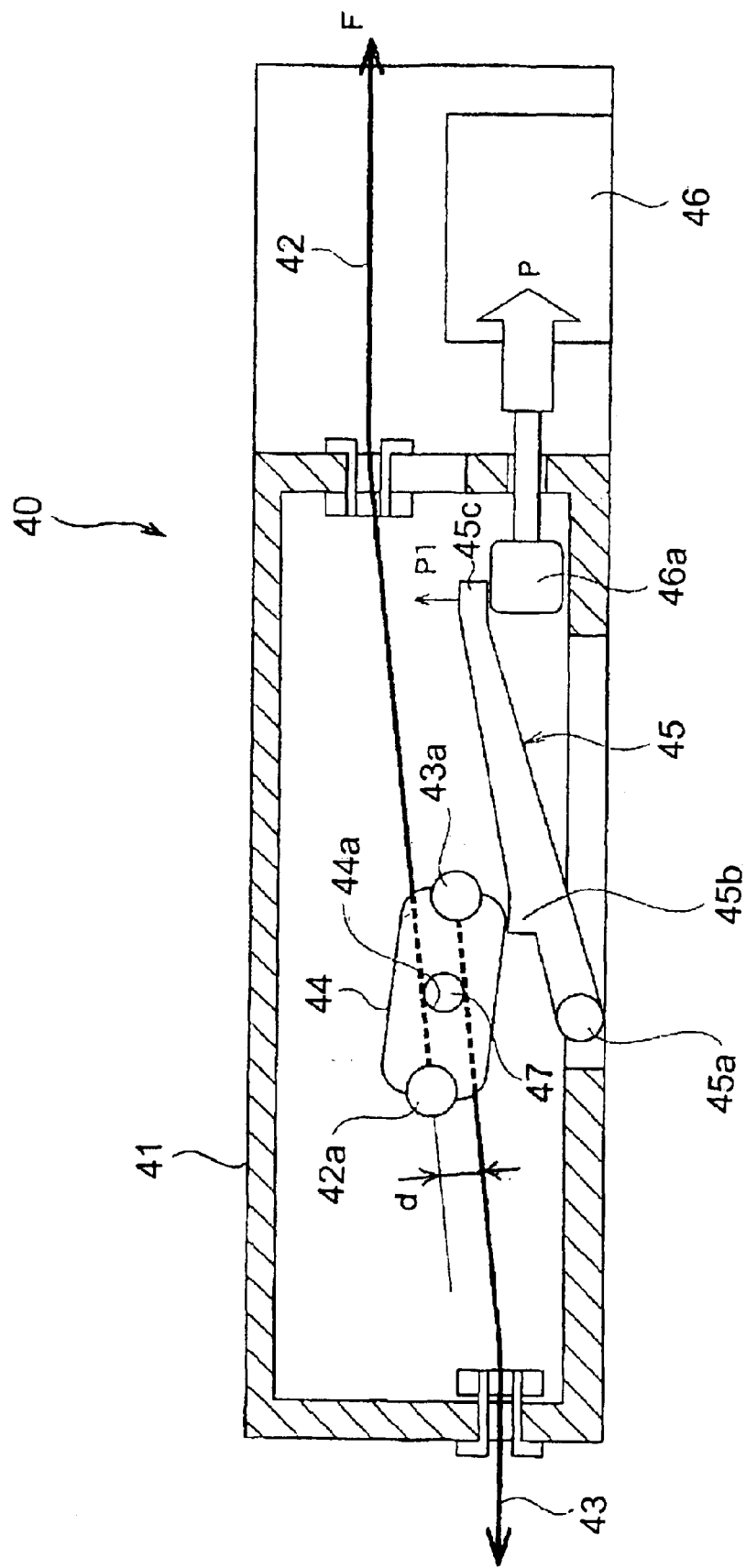
FIG. 7 is a cross-sectional view of the locking device showing the initial holding state of the lock device of the first embodiment of the present invention.
Figure 8:
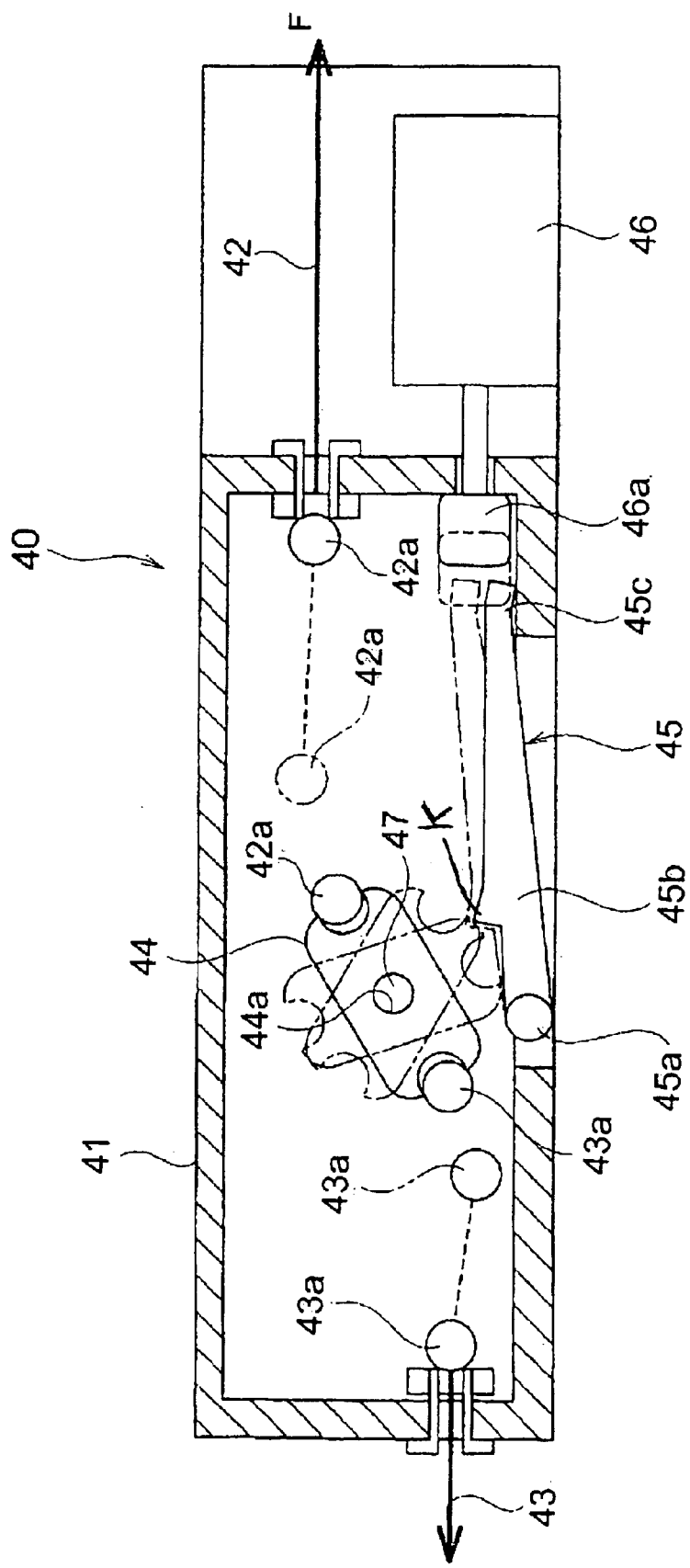
FIG. 8 is a cross-sectional view of the locking device showing the state after the lock device of the first embodiment of the present invention has been released.

The lock device 40 basically includes a casing 41, a pair of control wires 42 and 43, a winding element 44, a lever member 45, and a solenoid or drive unit 46, as shown in FIGS. 7 and 8. The component members 42, 43, 44 and 45 are assembled inside the casing 41 which is fastened to a middle section of the connecting member 11a. The wires 42 and 43 are operatively coupled to the left and right headrest members 12, respectively. As shown in FIG. 3, one end of each of the wires 42 and 43 is connected to a bottom part of one of the outer cylinders 30 by a pin 48. The other end of each of the wires 42 and 43 is passed around a pulley 49 supported on the stay 11 and releasably coupled to the winding element 44.

Figure 9:
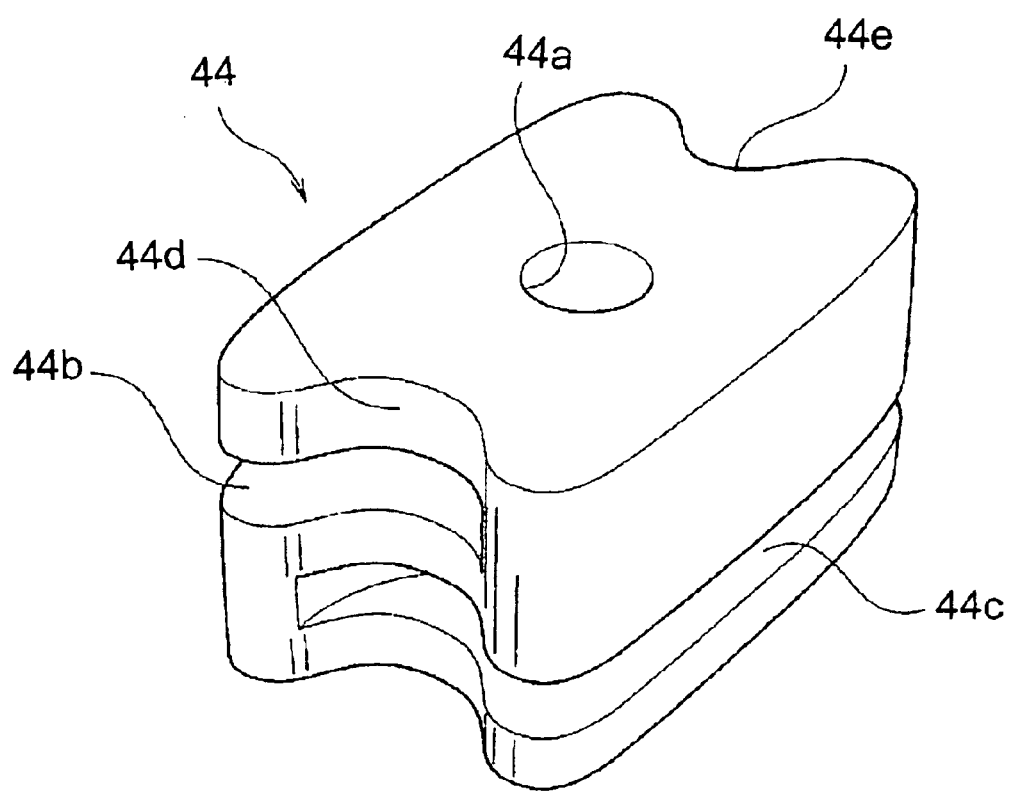
FIG. 9 is an enlarged perspective view of the winding element for the lock device of the first embodiment of the present invention.

As shown in FIG. 9, the winding element 44 is generally rectangular in shape and has a center hole 44a (formed in a center part thereof) through which a support shaft 47 (FIGS. 7 and 8) passes so as to support the winding element 44 on the casing 41 in a rotatable manner. The aforementioned "other" ends of the two wires 42 and 43 are pinched in independent winding grooves 44b and 44c, respectively, which are formed in the long oppositely facing wall faces of the winding element 44.

The tip of each wire 42 and 43 has a catching piece 42a or 43a that are releasably coupled to the winding element 44. The catching pieces 42a and 43a are releasably held in engaging recesses 44d and 44e, respectively, that are formed in the short oppositely facing wall faces of the winding element 44. Tension is applied to the wires 42 and 43 by winding the wires 42 and 43 onto the winding element 44. This tension serves to pull the outer cylinders 16 of the left and right headrest members 12 downward against the force applied by the springs 33 and hold them in the initial storage position (see FIG. 1).

As shown in FIG. 7, the lever member 45 comprises a fulcrum part 45a attached to the casing 41 such that it can rotate freely, a load point part 45b provided with a catching part K that stops rotation of the winding element 44, and an effort point part 45c supported by the solenoid 46 that disengages therefrom when a rear-end collision detecting signal is inputted. As shown in FIG. 7, the catching part K catches on the winding element 44 so as to stop the winding element 44 from rotating in the unwinding direction.

When the solenoid 46 disengages from the effort point part 45c, the lever member 45 is pressed by the unwinding-direction rotational force of the winding element 44 and swings clockwise as shown in FIG. 8 such that the catching part K releases (disengages from) the winding element 44 and allows it to rotate.

The solenoid 46 advances and retracts the stopper 46a. The stopper 46a supports the effort point part 45c of the lever member 45 in the tension release direction of the winding element 44. When in the advanced state, the stopper 46a is disposed between the casing 41 and the effort point part 45c of the lever member 45 as shown in FIG. 7. When in the retracted state, the stopper 46a is disengaged from the effort point part 45c as shown in FIG. 8 and the lever member 45 is free to swing in the unwinding direction (clockwise in FIG. 8).

While a solenoid is used in the illustrated embodiment for advancing and retracting the stopper 46a, the drive unit for the locking device 40 is not limited to a solenoid device. It is also possible to use other devices that can operate the stopper 46a in response to a drive signal from a control system 50. For example, an electric motor can be used and the rotational motion of the motor can be converted in to a reciprocating motion.

Figure 10:
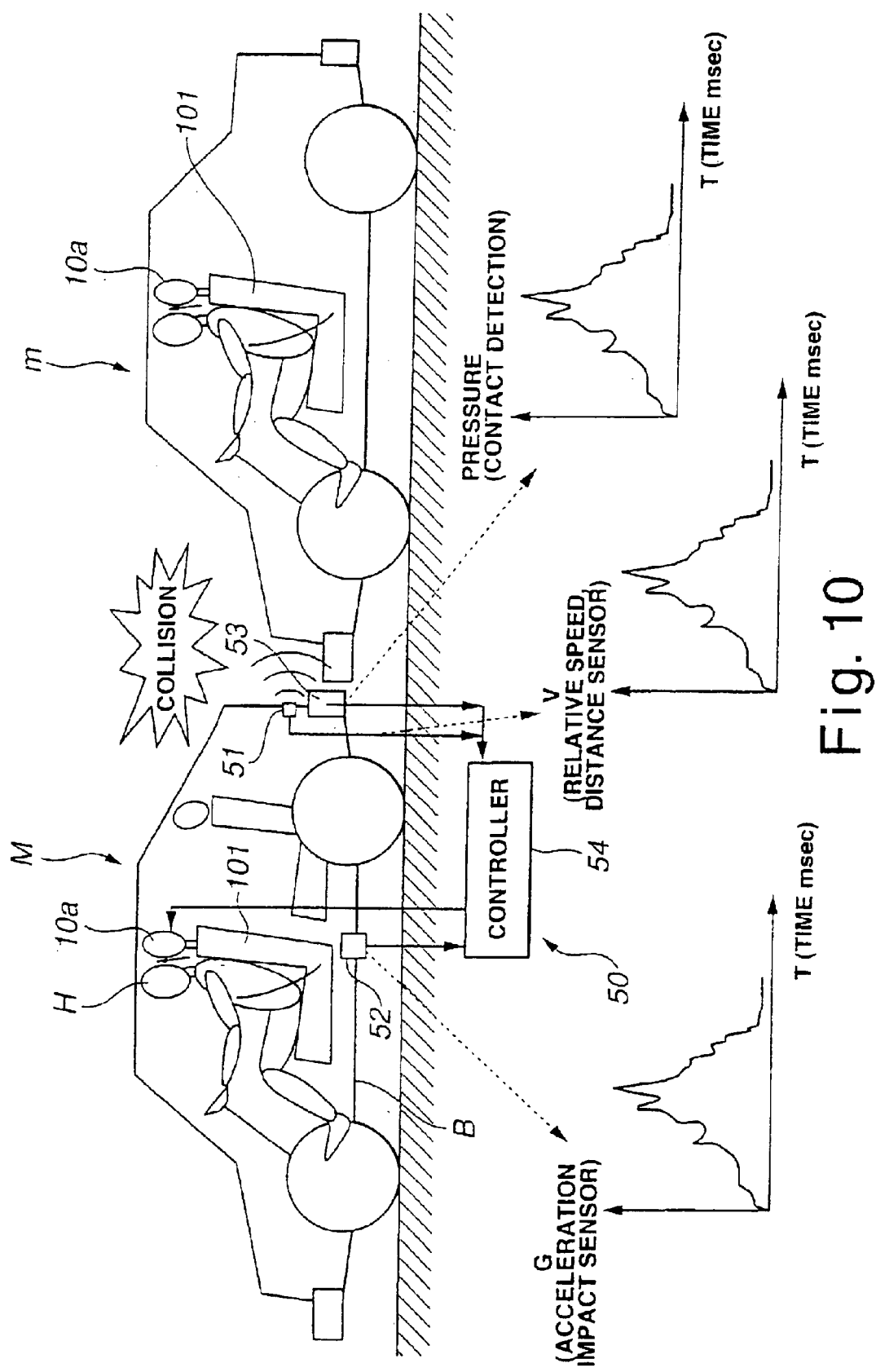
FIG. 10 is a schematic view illustrating the actuation system of the controller of the first embodiment of the present invention.

As shown in FIG. 10, the control system 50 basically comprises a V-sensor 51, a G-sensor 52, a pressure sensor 53 and a controller 54. The V-sensor 51 is provided on the rear end of the vehicle M which is installed with the present invention, and detects the relative velocity with respect to a following vehicle m using sound waves or the like. The G-sensor 52 detects the deceleration of the vehicle body B. The pressure sensor 53 that is provided on the rear bumper of the vehicle M detects the contact pressure of the following vehicle m. The controller 54 receives signals from these sensors 51, 52, 53.

The controller 54 is constituted such that when it detects a rear-end collision based on the detection signals from the sensors 51, 52 and 53, it applies a current to the solenoid of the drive unit 46 so as to release the locked state of the lock device 40. The controller 54 preferably includes a microcomputer with a control program that controls the drive unit or solenoid 46 as discussed below. The controller 54 can also include other conventional components such as an input interface circuit, an output interface circuit, and storage devices such as a ROM (Read Only Memory) device and a RAM (Random Access Memory) device. The microcomputer of the controller 54 is programmed to control the lock device 40 in response to the detection signals from the sensors 51, 52 and 53. The controller 54 is capable of selectively controlling any of the components of the control system 50 in accordance with the control program. It will be apparent to those skilled in the art from this disclosure that the precise structure and algorithms for the controller 54 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Although here the G-sensor 52 and the pressure sensor 53 are used as a mechanism to detect a collision in a direct manner, it is also possible to use a touch sensor or a strain gauge (not shown in figure).

As shown in FIG. 3, the swing mechanisms 32 of this embodiment are each provided with a fastening or resistance mechanism 60. The fastening mechanisms 60 fix the left and right headrest members 12 to the stays 11 when a rearward pushing force applied to the left and right headrest members 12.

Figure 11:
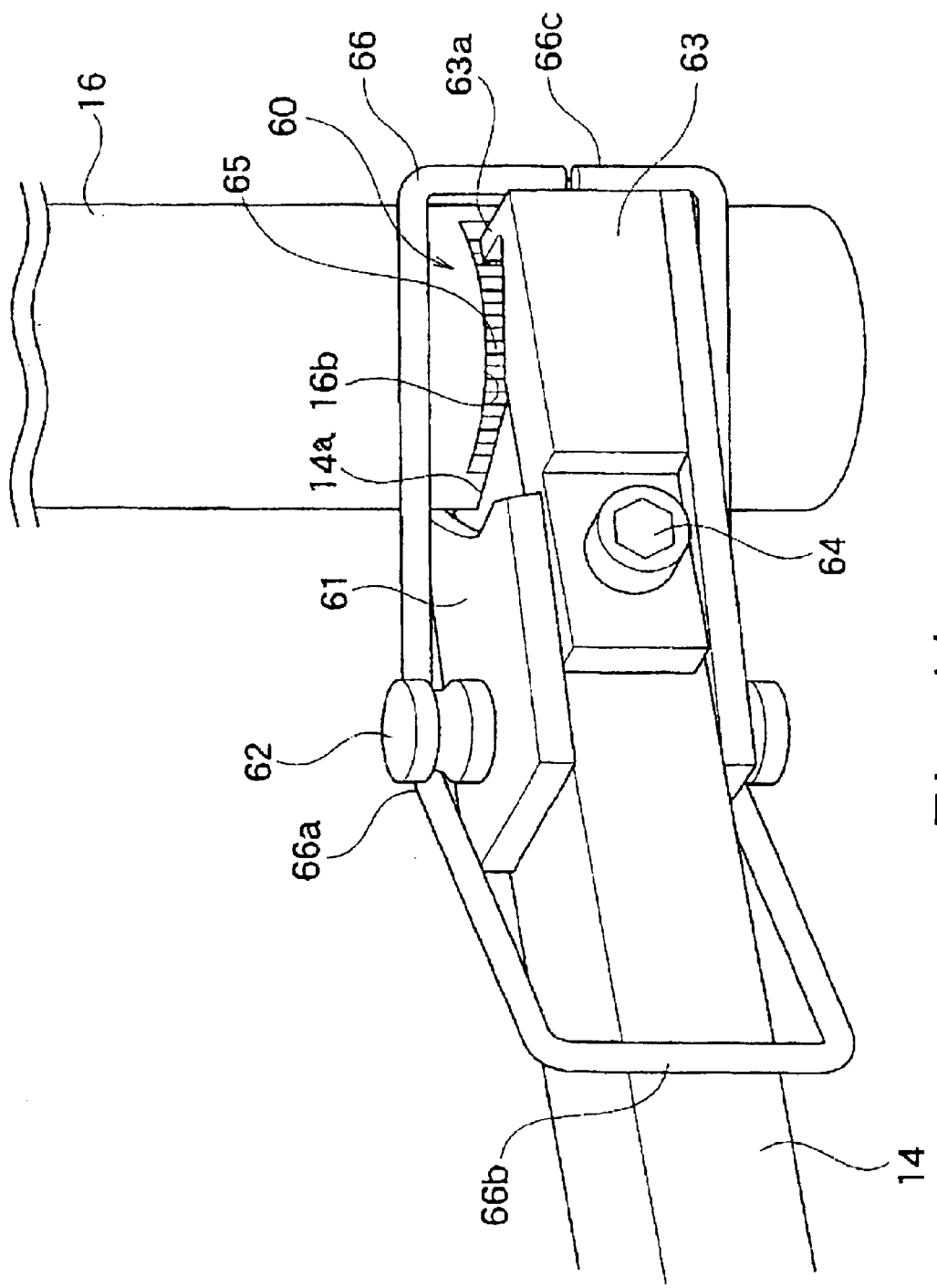
FIG. 11 is a rear perspective view of the fastening or resistance mechanism of the first embodiment of the present invention.
Figure 12:
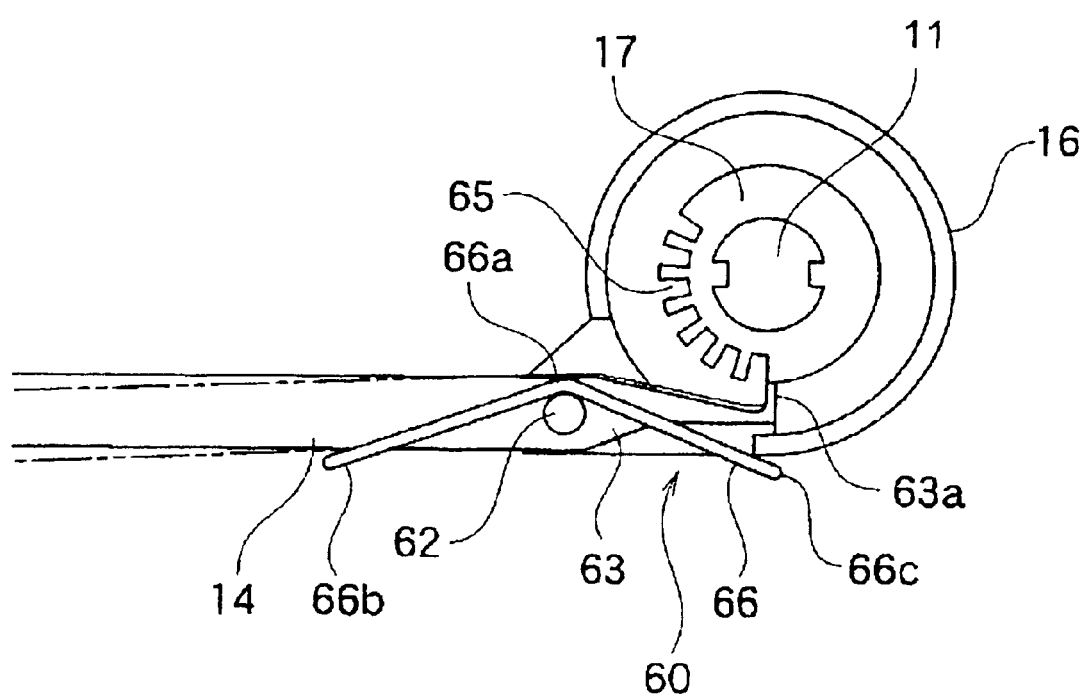
FIG. 12 is a simplified schematic cross-sectional view of the main components of the fastening or resistance mechanism in the first embodiment of the present invention.

As shown in FIGS. 11 and 12, the fastening mechanisms 60 are coupled between the lower horizontal members 14 of the left and right headrest members 12 and the outer cylinders 16. Each fastening mechanism 60 includes a pair of brackets 61, which are fixedly connected to the outer cylinders 16 and a pin 62 that pivotally supports one of the horizontal members 14 for permitting the lower horizontal member 14 to swing freely forward and rearward within a prescribed angle.

The end of each lower horizontal member 14 that is closer to the outer cylinder 16 includes a mating member 63 that projects substantially to the center portion of the outer cylinder 16. The mating member 63 is fastened with a bolt 64 to the lower horizontal member 14. A window part 16b is provided in each of the outer cylinders 16 through which a claw 63a of the mating member 63 passes.

Each inner cylinder 17 has a rack 65 that is arranged to align with the window part 16b of the outer cylinder 16. The rack 65 has a plurality of tooth parts that selectively mates with the claw part 63a of the mating member 63. This rack 65 is formed over the entire circumferential length of the inner cylinder 17.

A generally rectangular spring 66 is arranged between each of the lower horizontal members 14 and each of the outer cylinders 16 as shown in FIG. 11. This spring 66 applies a forward pushing force against the horizontal members 14.

The spring 66 is made of spring steel wire-rod stock shaped into a generally rectangular form and bent into an obtuse V-shape along two opposing sides. As shown in FIG. 11, a central bent portion 66a of the spring 66 is stopped against the front side of the pin 62 so as to act as a fulcrum. A first end part 66b of the spring 66 is stopped against the rear side of the horizontal member 14, while a second end part 66c of the spring 66 is stopped against the rear side of the outer cylinder 16. As a result, a forward spring force is generated between the two end parts 66b and 66c.

Figure 13:
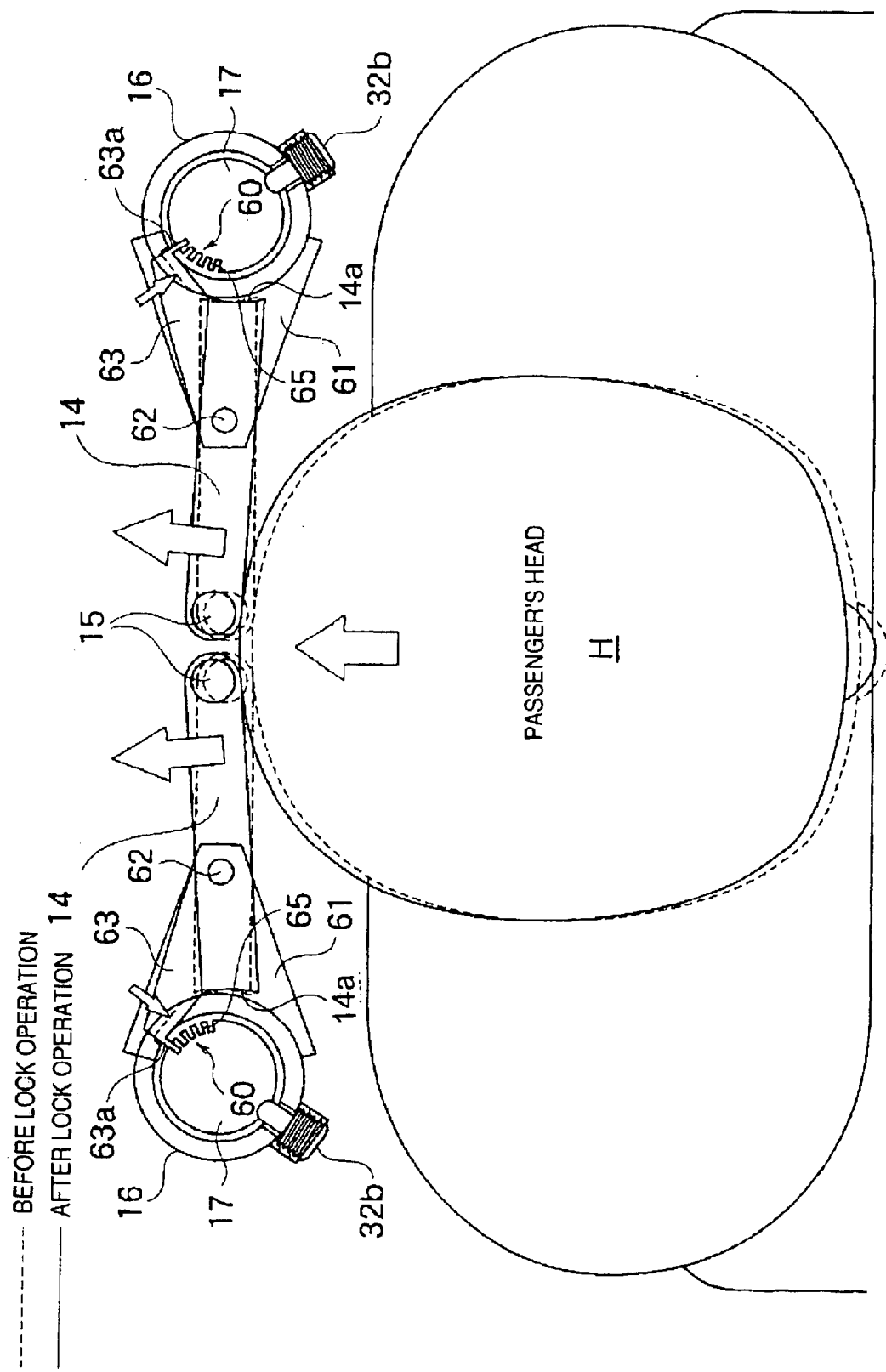
FIG. 13 is a simplified top plan view showing the operation of the fastening or resistance mechanism of the first embodiment of the present invention in the locked state.

Due to the spring force of the spring 66, the fastening mechanism 60 puts the upper and lower horizontal members 14 into a constant state of being swung forward about the pin 62, as indicated by the broken lines in FIG. 13. In this state, the claw 63a of the engaging member 63 is disengaged from the rack 65 and the outer cylinder 16 can rotate freely with respect to the inner cylinder 17, except to the extent that the locking device 40 holds the outer cylinder 16 from rotating.

The prescribed angle or amount by which the horizontal members 14 swing about the pins 62 is small, and is defined by one of the two end corners of the V-shaped recessions 14a, which are formed in the respective ends of the horizontal members 14 that face outer cylinders 16, touching against the outer circumference of the outer cylinders 16.

When the head H of a seated passenger touches against the left and right headrest members 12 and a rearward pushing force acts on the left and right headrest members 12, the upper and lower horizontal members 14 swing rearward against the spring force of the springs 66. As a result, the claws 63a of the mating members 63 mate with the racks 65 and the outer cylinders 16 are locked to the inner cylinders 17.

Thus configured, the vehicle headrest apparatus 10 in accordance with the present embodiment detects when a following vehicle m collides with the rear end of the vehicle M (as shown in FIG. 1) using the V-sensor 51, the G-sensor 52, and the pressure sensor 53. As mentioned above, a touch sensor and a strain gauge (not shown) can also be used. When a collision is detected, the controller 54 applies a current to the solenoid 46 of the lock device 40.

Figure 14:
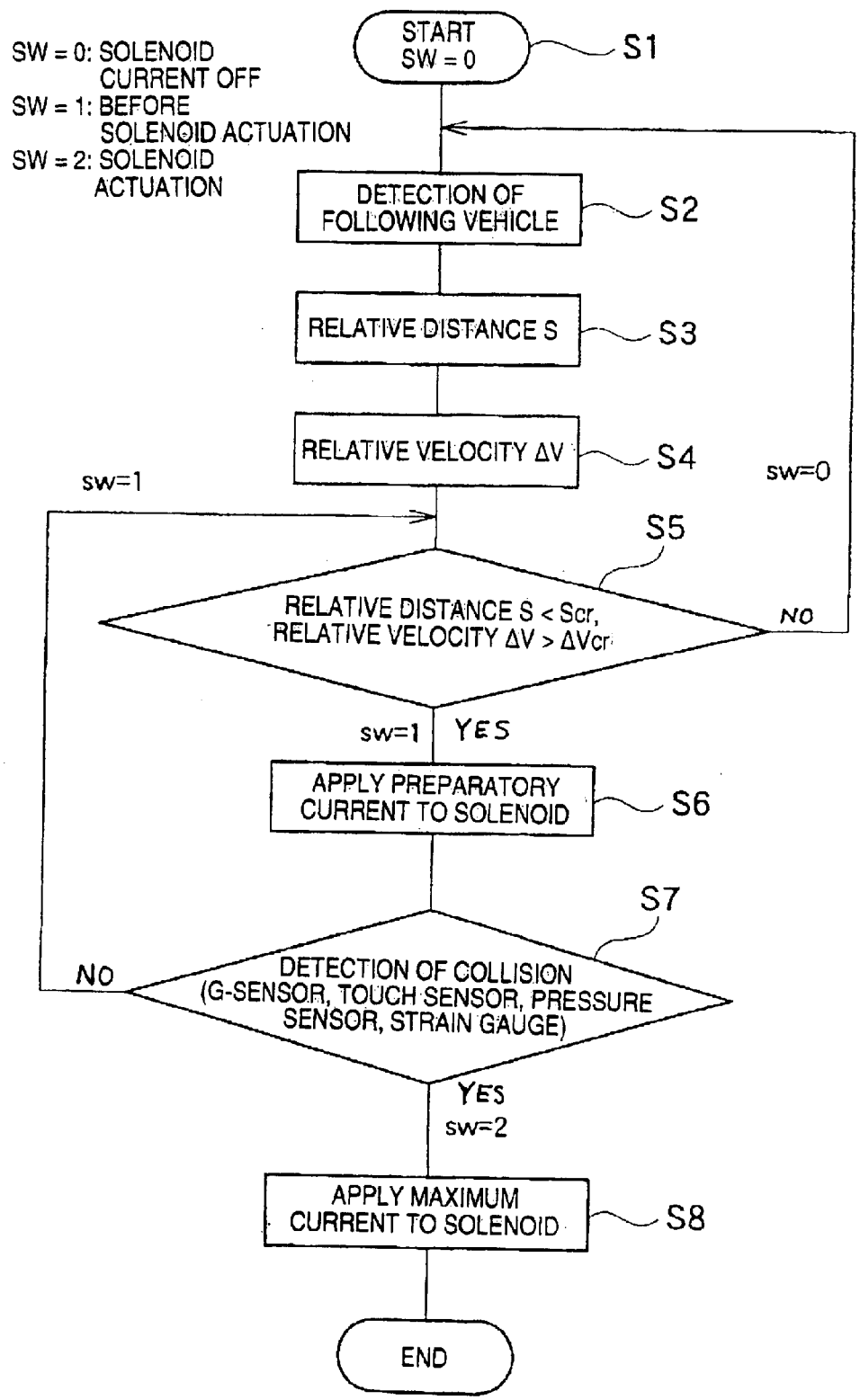
FIG. 14 is a flowchart explaining the control of the lock device of the first embodiment of the present invention.

An example of the control operations executed by the controller 54 is presented in the flowchart of FIG. 14.

First, in step S1 control of the headrest apparatus 10 commences when the ignition switch is turned ON. At this stage, the current (solenoid drive current) supplied to the solenoid 46 is OFF.

Next, in step S2, the controller 54 detects the following vehicle m based on the detection signal of the V-sensor 51. In step S3, the same detection signal is used to calculate the relative distance S between the vehicle M installed with the present invention and the following vehicle m. In step S4, the controller 54 calculates the relative velocity $\Delta V$ between the two vehicles M and m.

Figure 15:
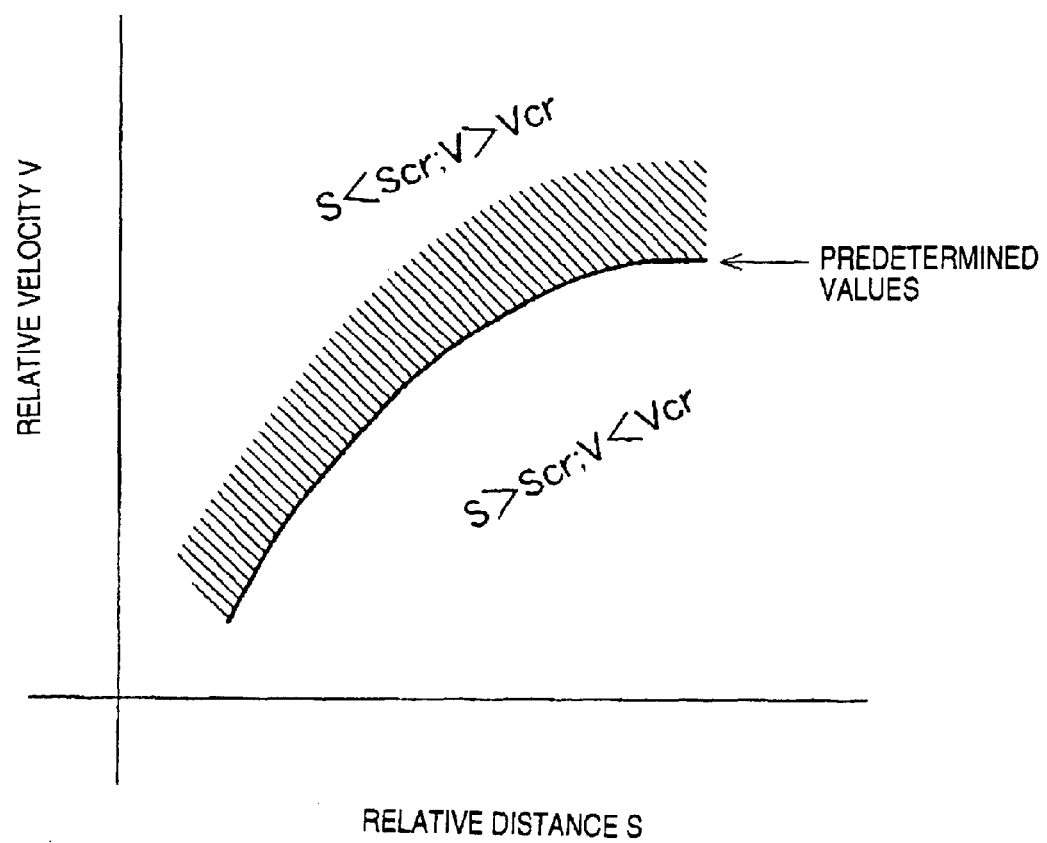
FIG. 15 is a graph for describing the region in which the lock device of the first embodiment of the present invention is released based on the relative distance and relative velocity.

In step S5, the controller 54 uses the control map shown in FIG. 15 to calculate the relationship between the relative distance S and relative velocity $\Delta V$ found in steps S3 and S4 and the preset relative distance Scr and relative velocity $\Delta$Vcr.

If the two conditions S<Scr and V>Vcr are both satisfied, the controller 54 estimates that the following vehicle m will collide with the rear end of the vehicle M and proceeds to step S6. Otherwise, the controller 54 returns to step S2.

In step S6, a current (solenoid drive preparatory current) smaller than the actual drive current is applied to the solenoid 46 of the lock device 40 in order to raise the operational response of the solenoid 46 in advance.

Then, in step S7, one sensor from among the G-sensor 52 and the pressure sensor 53, or the touch sensor and strain gauge, is used to detect if the vehicle M has actually experienced a rear-end collision. In step S8, actual solenoid drive current (maximum current) is applied to the solenoid 46.

As a result, as shown in FIG. 8, the stopper 46c retracts and disengages from the effort point part 45c of the lever member 45. The lock device 40 switches to the released state and the catching part K of the lever member 45 disengages from the winding element 44 as shown in FIG. 8. The couple generated by the tension acting on the wires 42 and 43 causes the winding element 42 to rotate clockwise (as viewed in FIGS. 7 and 8). As the wires 42 and 43 unwind from the winding element 42, the catching pieces 42a and 43a come out of mating recessions 44d and 44e such that the wires 42 and 43 fall free.

Since the restraining forces that were pulling the outer cylinders 16 downward are eliminated, the left and right headrest members 12 are lifted upward by the upward spring force of the springs 33 of the lift mechanisms 31. At the same time, the bolt 32b of each swing mechanism 32 moves along the helical groove 32b of each inner cylinder 17, causing the left and right headrest members 12 to swing forward.

Then, after the outer cylinders 16 rise further, they are stopped from rising due to the reduced-diameter parts 16a formed inside the outer cylinders 16 abutting against the end plates 17a provided on the upper end parts of the stays 11. In this state, as shown in FIG. 4, the left and right headrest members 12 are at the maximum swing amount.

Figure 16:
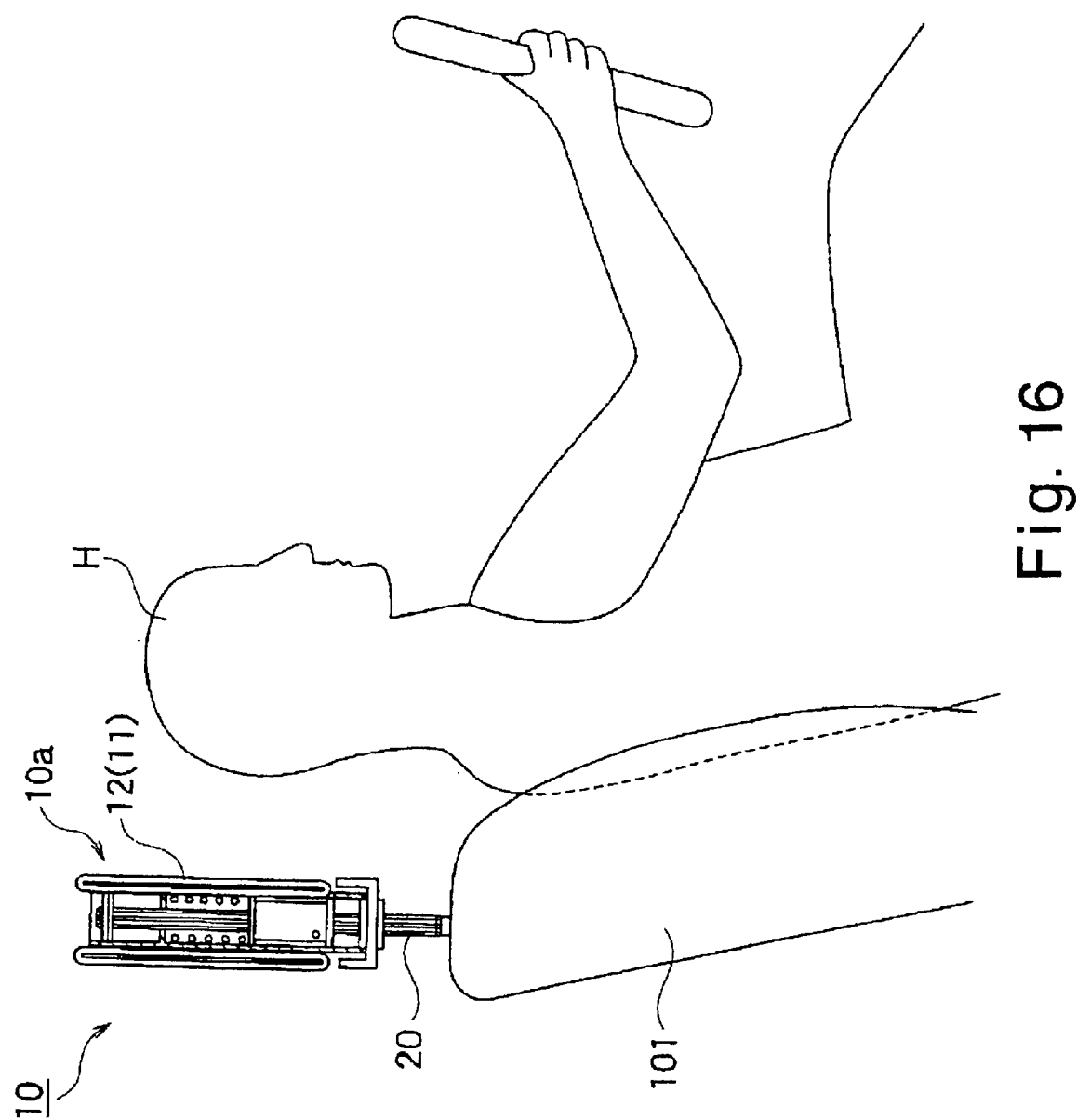
FIG. 16 is a simplified schematic side elevational view of the headrest apparatus of the first embodiment of the present invention during normal driving.
Figure 17:
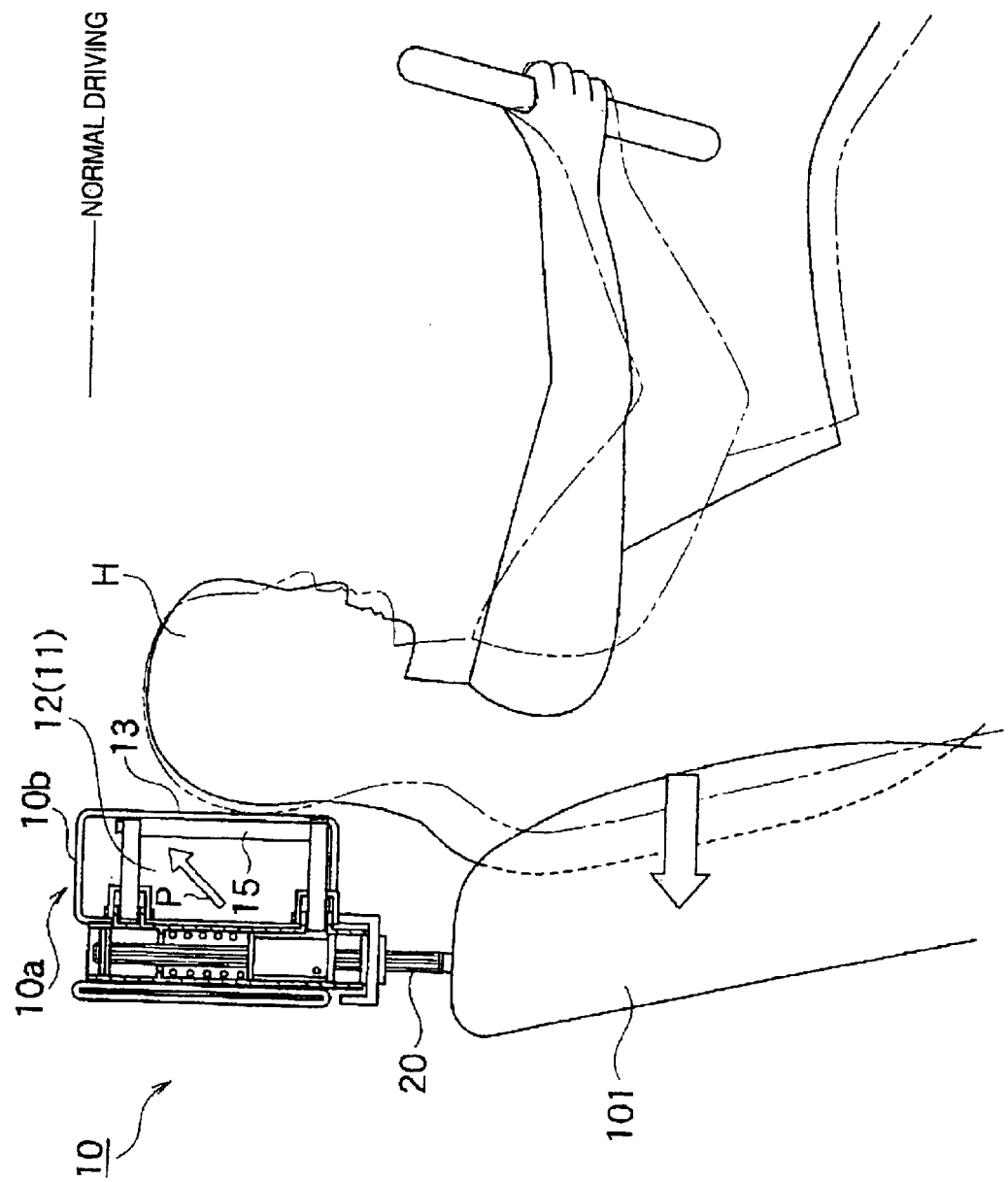
FIG. 17 is a simplified schematic side elevational view of the headrest apparatus of the first embodiment of the present invention when a rear-end collision occurs.

Thus, during normal driving, as shown in FIG. 16, the left and right headrest members 12 are stored and the headrest unit 10a is the same as a conventional headrest. When a rear-end collision occurs, the swing mechanism 32 causes the left and right headrest members 12 to rise and swing forward as shown in FIG. 4. As a result, the vertical sheet support portion 13a and the horizontal sheet support portion 13b of the sheet member 13 are deployed by being pushed upward and forward as indicated by the arrow P in FIG. 17.

When the sheet member 13 is deployed, the vertical members 15 and the upper horizontal members 14 apply tension to the vertical sheet support portion 13a (which faces the passenger's head) and the horizontal sheet support portion 13b. Thus, the sheet member 13 can catch and restrain the passenger's head H without delay.

Also, since the sheet member 13 is provided with a horizontal sheet support portion 13b in addition to the vertical sheet support portion 13a, the holding performance of the sheet member 13, is increased. More specifically, the holding performance of the upper edge of the vertical sheet support portion 13a is increased. As a result, the restraining force provided by the vertical sheet support portion 13a with respect to the passenger's head H is increased. Thus, rearward movement of the passenger's head H caused by inertia force can be suppressed effectively, and the head H of the seated passenger can be protected.

With this embodiment, the weight of the main operating components of the headrest unit 10a that operate when a rear-end collision occurs can be reduced because the main operating components are the left and right headrest members 12, the sheet member 13, the horizontal members 14, and the vertical members 15. Since it does not involve utilizing the load fluctuation caused by the inertia of the passenger's body to discharge the entire headrest, the headrest unit 10a of this embodiment can be operated rapidly and reliably regardless of the weight or sitting posture of the passenger.

Figure 18:
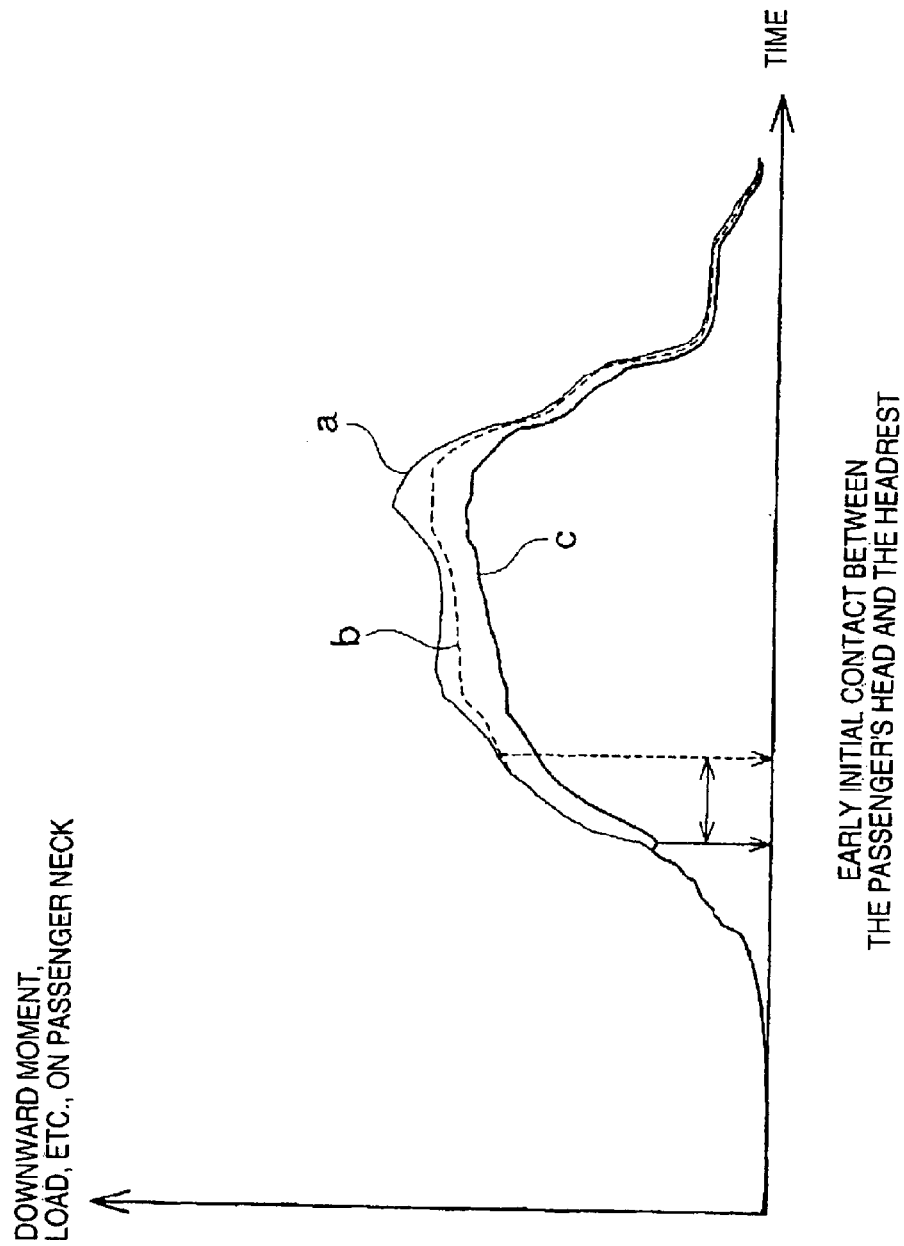
FIG. 18 is a comparative characteristic diagram of the downward moment exerted by the headrest apparatus on the passenger's neck in the first embodiment of the present invention.

The comparative characteristic diagram shown in FIG. 18 is based on an experiment conducted using a vehicle headrest apparatus 10 in accordance with this embodiment. The horizontal axis indicates time and the vertical axis indicates the moment (load) acting on the seated passenger.

In FIG. 18, a curve a represents a headrest that does not have a collision protection structure, a curve b represents a headrest having a collision protection structure that detects a rear-end collision using the load fluctuation caused by the inertia of the seated passenger, and a curve c represents a vehicle headrest apparatus 10 in accordance with this embodiment.

The moment born by the head H of the seated passenger is smaller in the case of the headrest having a collision protection structure (curve b) than in the headrest not having a collision protection structure (curve a), but the vehicle headrest apparatus 10 of this embodiment (curve c) makes contact with the passenger's head H more quickly and reduces the maximum load acting on the passenger's head H further than the headrest having a collision protection structure (curve b).

As explained above, the vehicle headrest apparatus 10 of the present embodiment is provided with swing force applying device 30 (deployment mechanism) that normally stores the sheet member 13 (flexible sheet restraining member) in a storage position and deploys the sheet member 13 so as to push the sheet-like body forward and upward when a rear-end collision occurs. Since the position at which the sheet member 13 restrains the passenger's head H is forward and upward due to the operation of the swing force applying device 30, the passenger's head H can be restrained in a reliable manner.

Since the sheet member 13 has a horizontal sheet support portion 13b formed integrally so as to extend rearward directly from the upper edge of the vertical sheet support portion 13a, a ridge is formed along the upper edge of the vertical sheet support portion 13a where the vertical sheet support portion 13a and the horizontal sheet support portion 13b intersect. This feature increases the overall rigidity of the sheet member 13 and enables the restraining performance with respect to the passenger's head H to be increased even further.

Furthermore, the vertical tensioning device in this embodiment is formed by the vertical members 15 that are coupled to the swing force applying device 30 that raises it and swings it forward with respect to the stay 11, when a rear-end collision occurs. The horizontal tensioning device in this embodiment is formed by the upper horizontal members 14 that are coupled to the swing force applying device 30. As a result, the operation of the swing force applying device 30 opens the vertical members 15 and the upper horizontal members 14 in a synchronized manner. Since tension can be applied to the vertical sheet support portion 13a and the horizontal sheet support portion 13b simultaneously, tension can be applied efficiently to the sheet member 13 that is comprised by the vertical sheet support portion 13a and the horizontal sheet support portion 13b.

The vertical members 15 are arranged such that the tension it applies to the sheet member 13 corresponds to the forward swing force of the swing force applying device 30. As a result, the minimum tension necessary can be applied to the deployed vertical sheet support portion 13a when a rear-end collision occurs by setting the force applied by the swing force applying device 30 in advance such that the required tensile force is generated.

The upper horizontal members 14 can also be made to apply the minimum tension necessary to the horizontal sheet support portion 13b by setting of the force applied by the swing force applying device 30 in advance such that the required tensile force is generated.

The tension application synchronizing device 18 is constituted by joining the respective pairs vertical members 15 and the upper horizontal members 14 together in an integral manner, and simultaneously releasing the outer cylinders 16. Since the tension application synchronizing device 18 causes the vertical members 15 and the upper horizontal members 14 to operate in a synchronized manner, tension can be applied to the vertical sheet support portion 13a and the horizontal sheet support portion 13b of the sheet member 13 simultaneously. As a result, the head H of the passenger can be restrained in a reliable manner.

Second Embodiment

Figure 19:
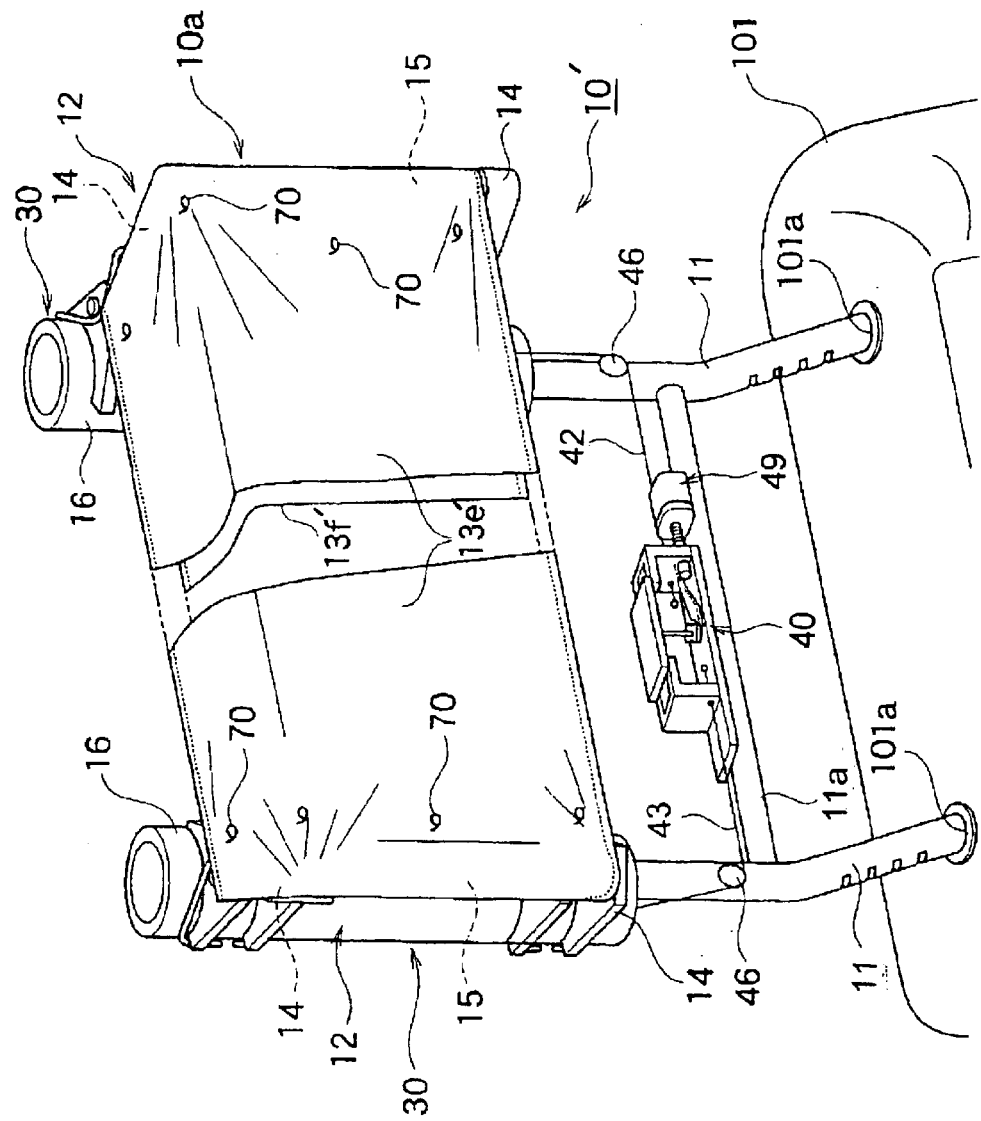
FIG. 19 is a front perspective view of a headrest unit in accordance with a second embodiment of the present invention in a completely deployed state with the cushion pads removed for purposes of illustration.
Figure 20:
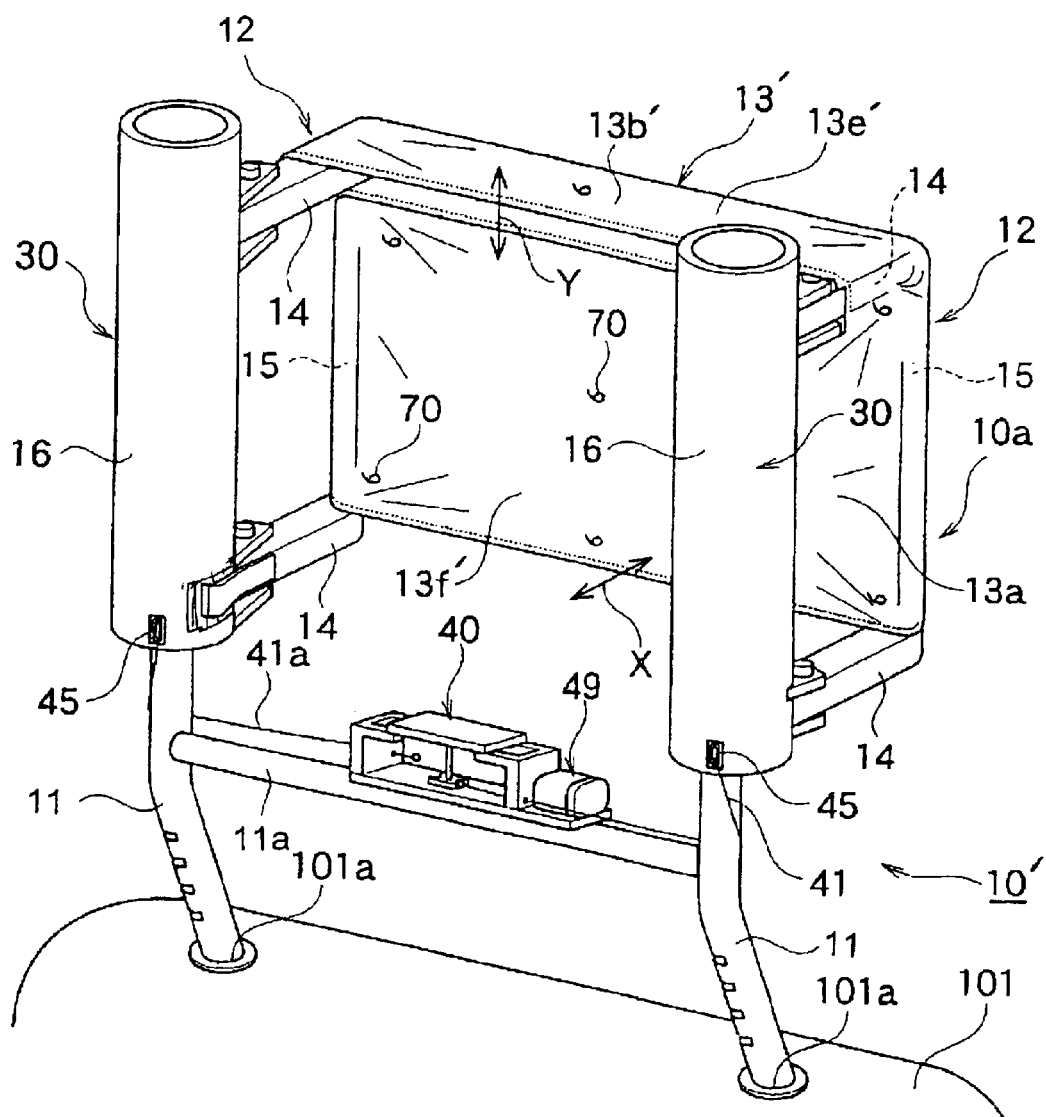
FIG. 20 is a simplified rear perspective view of the headrest unit of the second embodiment of the present invention in the completely deployed state with the cushion pads removed for purposes of illustration.
Figure 21:
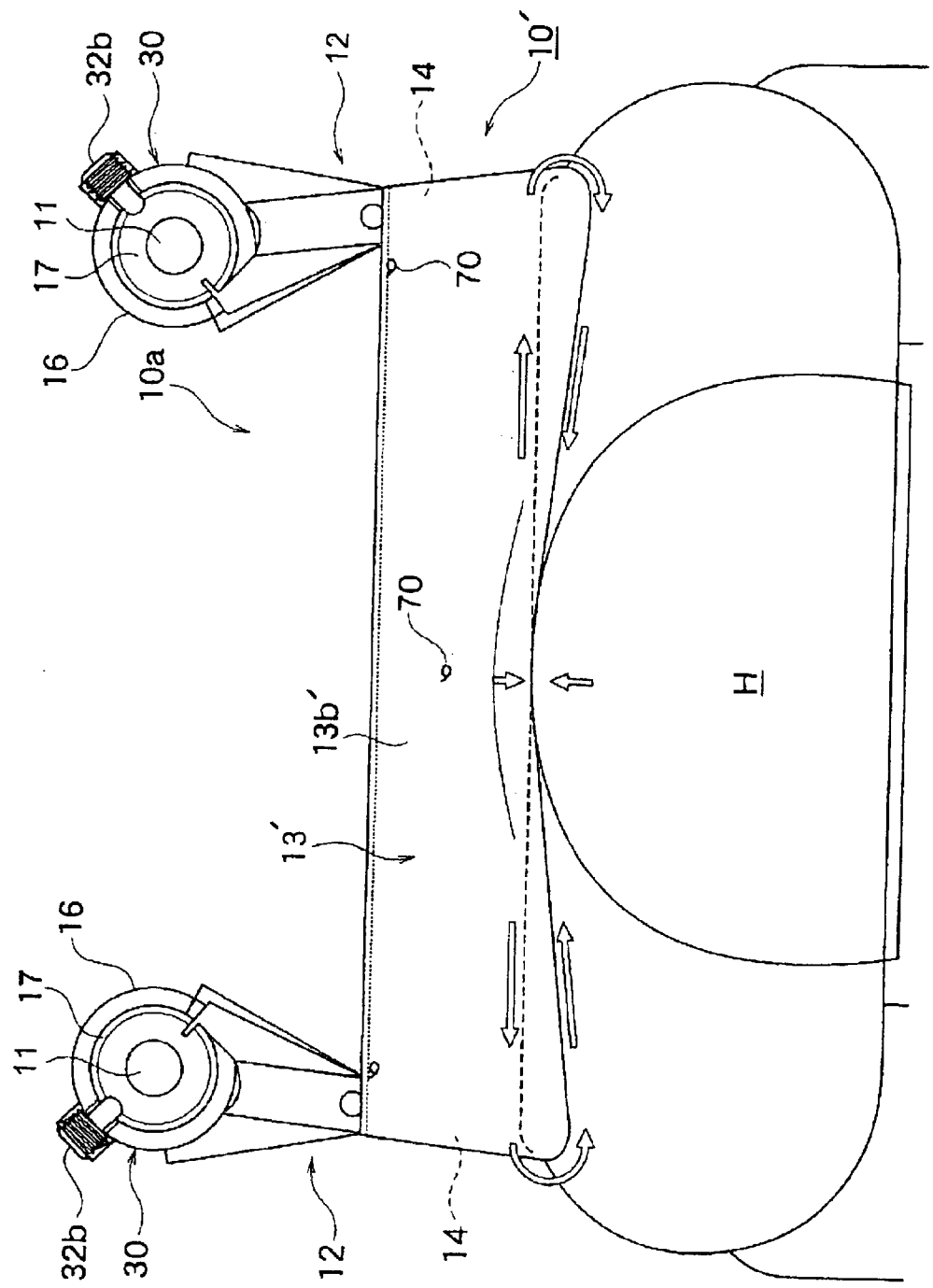
FIG. 21 is a simplified top plan view of the headrest unit of the second embodiment of the present invention in the completely deployed state after the load of the passenger's head has been delivered and with the cushion pads removed for purposes of illustration.

Referring now to FIGS. 19 to 21, a vehicle headrest apparatus 10' in accordance with a second embodiment will now be explained. Basically, the headrest apparatus 10' is identical to the headrest apparatus 10, as discussed above, except that a modified flexible sheet restraining member 13' is used instead of the sheet member 13 of the first embodiment. In view of the similarity between the first and second embodiments, the parts of the second embodiment that are identical to the parts of the first embodiment will be given the same reference numerals or symbols as the parts of the first embodiment. Moreover, the descriptions of the parts of the second embodiment that are identical to the parts of the first embodiment may be omitted for the sake of brevity.

FIG. 19 is a perspective view of the headrest apparatus 10' in the completely deployed state with the cushion pad removed. FIG. 20 is a rear perspective view of the headrest apparatus 10' in the completely deployed state. FIG. 21 is a top plan view of the headrest apparatus 10' in the completely deployed state after the load of the passenger's head has been delivered.

In the vehicle headrest apparatus 10' of the second embodiment, the sheet member 13' comprises front and back sheet layers 13e' and 13f' that overlap each other, as shown in FIGS. 19 and 20. The vertical sheet support portion 13a' and the horizontal sheet support portion 13b' are formed by the front and back sheet layers 13e' and 13f. The vertical members 15 are inserted into both ends of the portion of the front and back sheet layers 13e' and 13f' that corresponds to the vertical sheet support portion 13a' and the upper horizontal members 14 are inserted into both ends of the portion of the front and back sheet layers 13e' and 13f' that corresponds to the horizontal sheet support portion 13b'.

The sheet member 13' is made by sewing a pliable sheet material into an endless form. This endless sheet member 13' is arranged so as to span between the upper horizontal members 14 and vertical members 15 of the left and right headrest members 12. The portions where the endless sheet 13' folds around the upper horizontal members 14 and the vertical members 15 correspond to both ends of the horizontal sheet support portion 13b' and the vertical sheet support portion 13a'. Moreover, the front side of the pliable sheet is the front sheet layer 13e' and the rear side is the back sheet layer 13f.

The sheet member 13' is provided with a plurality of pins 70 that act as restricting members to restrict the relative displacement of the front and rear sheet layers 13e' and 13f. These pins 70 are attached in a dispersed manner to appropriate positions of the vertical sheet support portion 13a' and the horizontal sheet support portion 13b'.

Thus, with the vehicle headrest apparatus 10' of the second embodiment, the sheet member 13' can be constructed in a simple manner due to the pliable sheet being sewn into an endless form. Also, the rigidity of the vertical sheet support portion 13a" in the longitudinal direction and of the horizontal sheet support portion 13b' in the vertical direction (as indicated by arrows X and Y in FIG. 20) can be increased due to the existence of front and back sheet layers 13e' and 13f'.

Since the vertical members 15 and the upper horizontal members 14 are inserted at both ends of the portions of the front and back sheet layers 13e' and 13f' that correspond to the vertical sheet support portion 13a' and horizontal sheet support portion 13b', respectively, the tension that develops in the front sheet layer 13e' when a rearward load F acts due to the head H of the passenger contacting the front sheet layer 13e' portion of the vertical sheet support portion 13a' (as shown in FIG. 21) is transmitted to the back sheet layer 13f' through the folded-around portion at both ends of the sheet layers 13e' and 13f'. As a result, the tension in the back sheet layer 13f' increases and the deflection of the front sheet layer 13e' is supported by the increased tension in the back sheet layer 13f'. Thus, the passenger's head H can be reliably restrained by the vertical sheet support portion 13a'.

Since the pins 70 are attached in a dispersed manner to appropriate positions of the vertical sheet support portion 13a' and the horizontal sheet support portion 13b', the front and back sheet layers 13e' and 13f', can be prevented from undergoing large relative displacement and the passenger's head can be restrained reliably by maintaining the integrity of the front and back sheet layers 13e' and 13f'.

Third Embodiment

Figure 22:
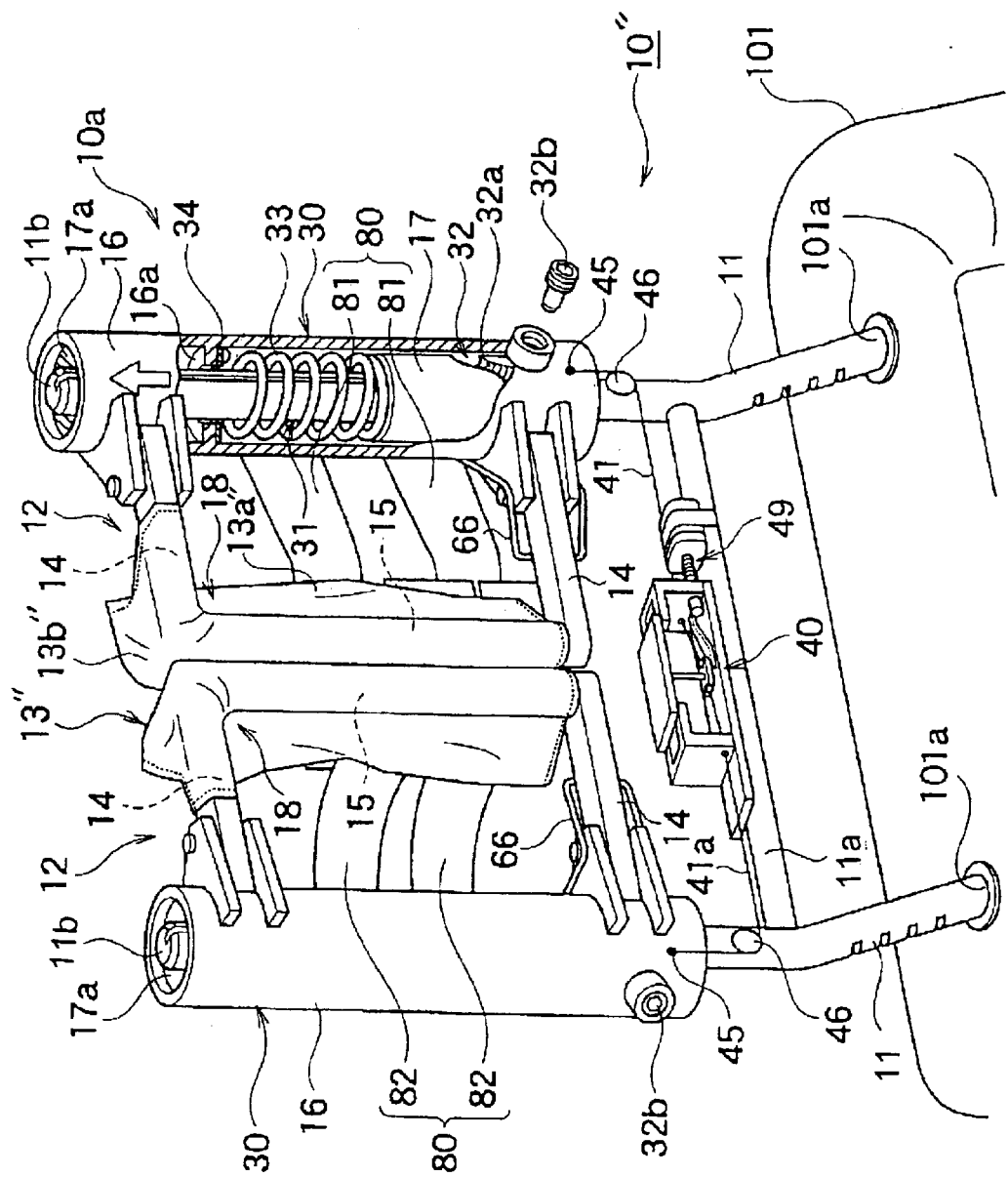
FIG. 22 is an enlarged cross-sectional perspective view of a headrest unit in accordance with a third embodiment of the present invention with portions broken away to show some of the main components.
Figure 23:
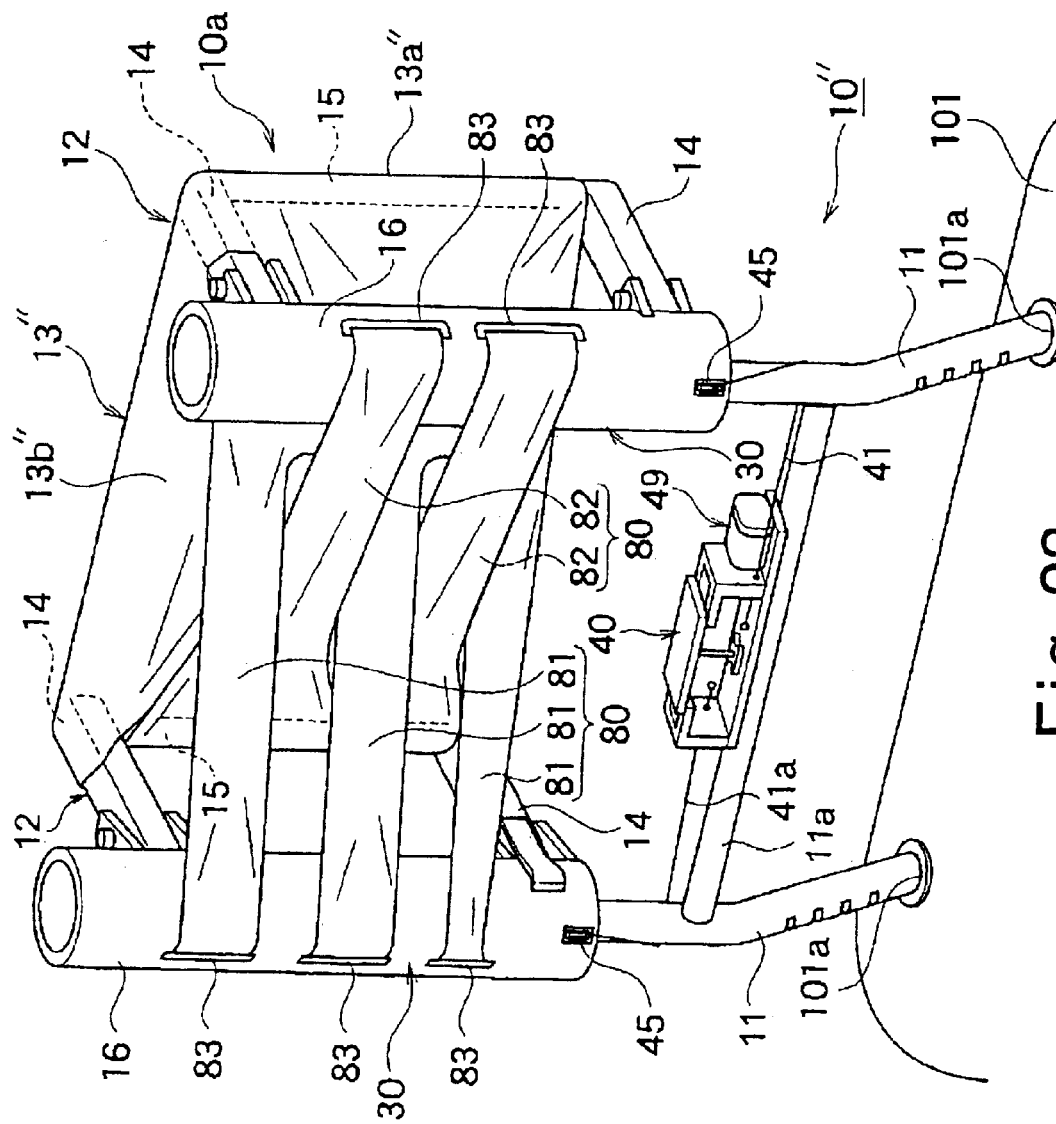
FIG. 23 is a simplified rear perspective view of the headrest unit of the third embodiment of the present invention when in the completely deployed state with the cushion pads removed for purposes of illustration.
Figure 24:
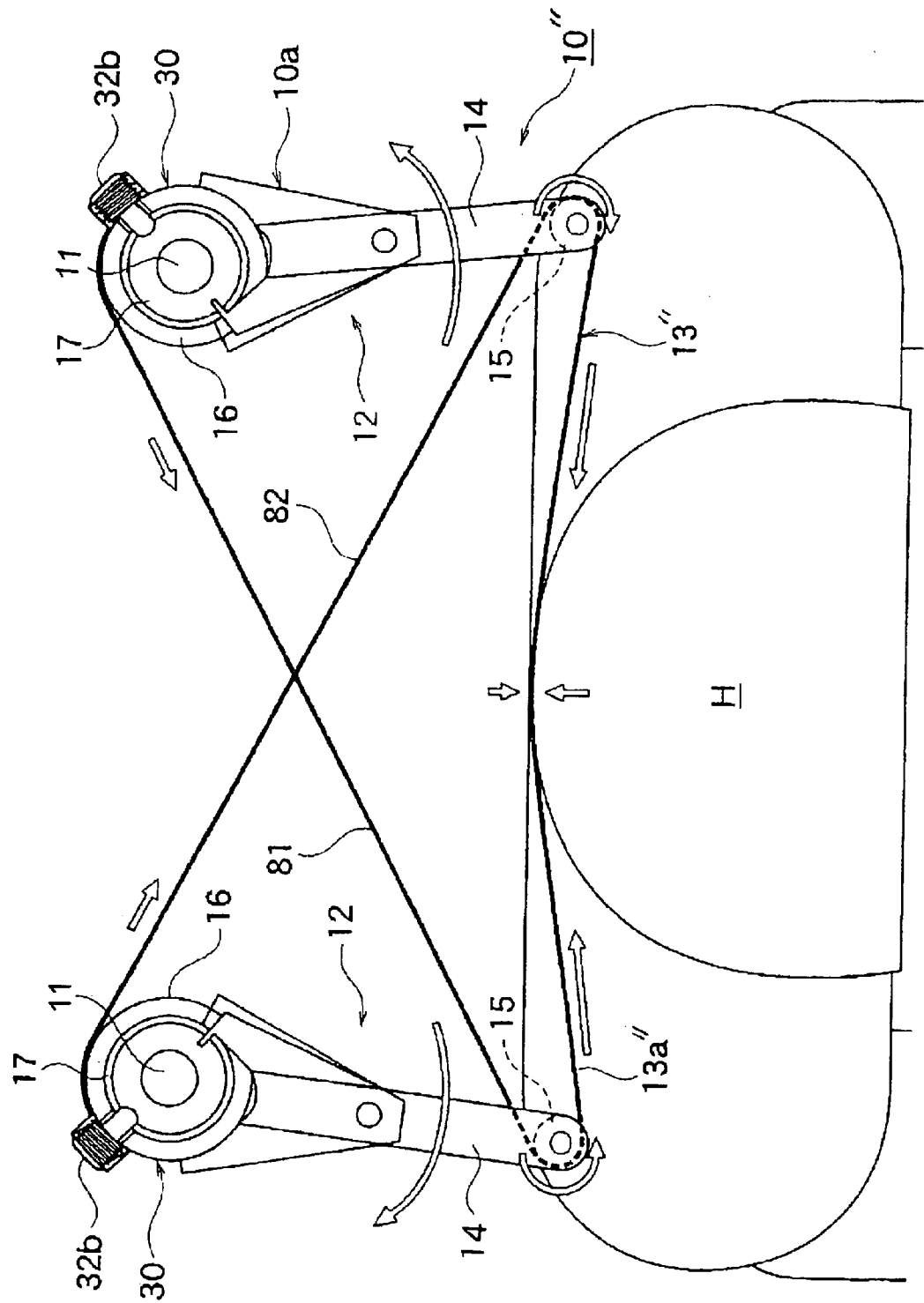
FIG. 24 is a simplified top plan view of the headrest unit of the third embodiment of the present invention in the completely deployed state after the load of the passenger's head has been delivered and with the cushion pads removed for purposes of illustration.

Referring now to FIGS. 22 to 24, a vehicle headrest apparatus 10" in accordance with a third embodiment will now be explained. Basically, the headrest apparatus 10" is identical to the headrest apparatus 10, as discussed above, except that a modified flexible sheet restraining member 13" is used instead of the sheet member 13 of the first embodiment. In view of the similarity between the third embodiment and the prior embodiments, the parts of the third embodiment that are identical to the parts of the prior embodiments will be given the same reference numerals or symbols as the parts of the prior embodiments. Moreover, the descriptions of the parts of the third embodiment that are identical to the parts of the prior embodiments have been omitted for the sake of brevity.

FIG. 22 is an enlarged cross-sectional perspective view of the main components of the headrest apparatus 10". FIG. 23 is a rear perspective view of the headrest apparatus 10" in the completely deployed state. FIG. 24 is a top plan view of the headrest apparatus 10" in the completely deployed state after the load of the passenger's head has been delivered.

Similarly to the previous embodiments, the vertical headrest apparatus 10" of the third embodiment is also configured such that the vertical members 15 and the upper horizontal members 14 of the left and right headrest members 12 apply tension to the vertical sheet support portion 13a" and horizontal sheet support portion 13b" of the sheet member 13". Additionally, as shown in FIGS. 22 and 23, this embodiment is also provided with a tension increasing mechanism or device 80 that converts the pressing force of the passenger's head H into tension in the vertical sheet support portion 13a" and horizontal sheet support portion 13b" when the vertical members 15 and upper horizontal members 14 apply tension to the vertical sheet support portion 13a" and horizontal sheet support portion 13b".

As shown in FIG. 23, the tension increasing mechanism 80 comprises a plurality of belt-shaped sheets 81 and 82 that are integral with the sheet member 13". The belt-shaped sheets 81 and 82 extend from the left and right end parts of the sheet member 13", and are separated by a prescribed spacing in the vertical direction. These belt-shaped sheets 81 and 82 are crisscrossed alternately and the tip end part of each is connected by a fastener 83 to a rear side of the transversely opposite one of the outer cylinders 16.

As shown in FIG. 23, the two uppermost belt-shaped sheets 81 and 82 extend from portions corresponding to the upper end part of the vertical sheet support portion 13a" and both side parts of the horizontal sheet support portion 13b" while the remaining belt-shaped sheets 81 and 82 extend from the side parts of the vertical sheet support portion 13a". Thus, with the vehicle headrest apparatus 10" of the third embodiment, the tension that develops in the vertical sheet support portion 13a" of the sheet member 13" when a rearward load F acts thereon due to the head H of the passenger contacting the vertical sheet support portion 13a" (as shown in FIG. 24) pulls the belt-shaped sheets 81 and 82 and causes the outer cylinders 16 of the left and right headrest members 12 to swing the upper and lower horizontal members 14 further open.

As a result, the tension in the horizontal sheet support portion 13b", which spans between the upper horizontal members 14 of the left and right headrest members 12, is increased further. The tension in the vertical sheet support portion 13a", which spans between the vertical members 15 is also increased.

Thus, the capacity of the apparatus to restrain the head H of a passenger is increased because contact of the passenger's head H with the vertical sheet support portion 13a" of the sheet member 13" causes the vertical sheet support portion 13a and horizontal sheet support portion 13b" to restrain the passenger's head H with an even larger amount of tension.

Fourth Embodiment

Figure 25:
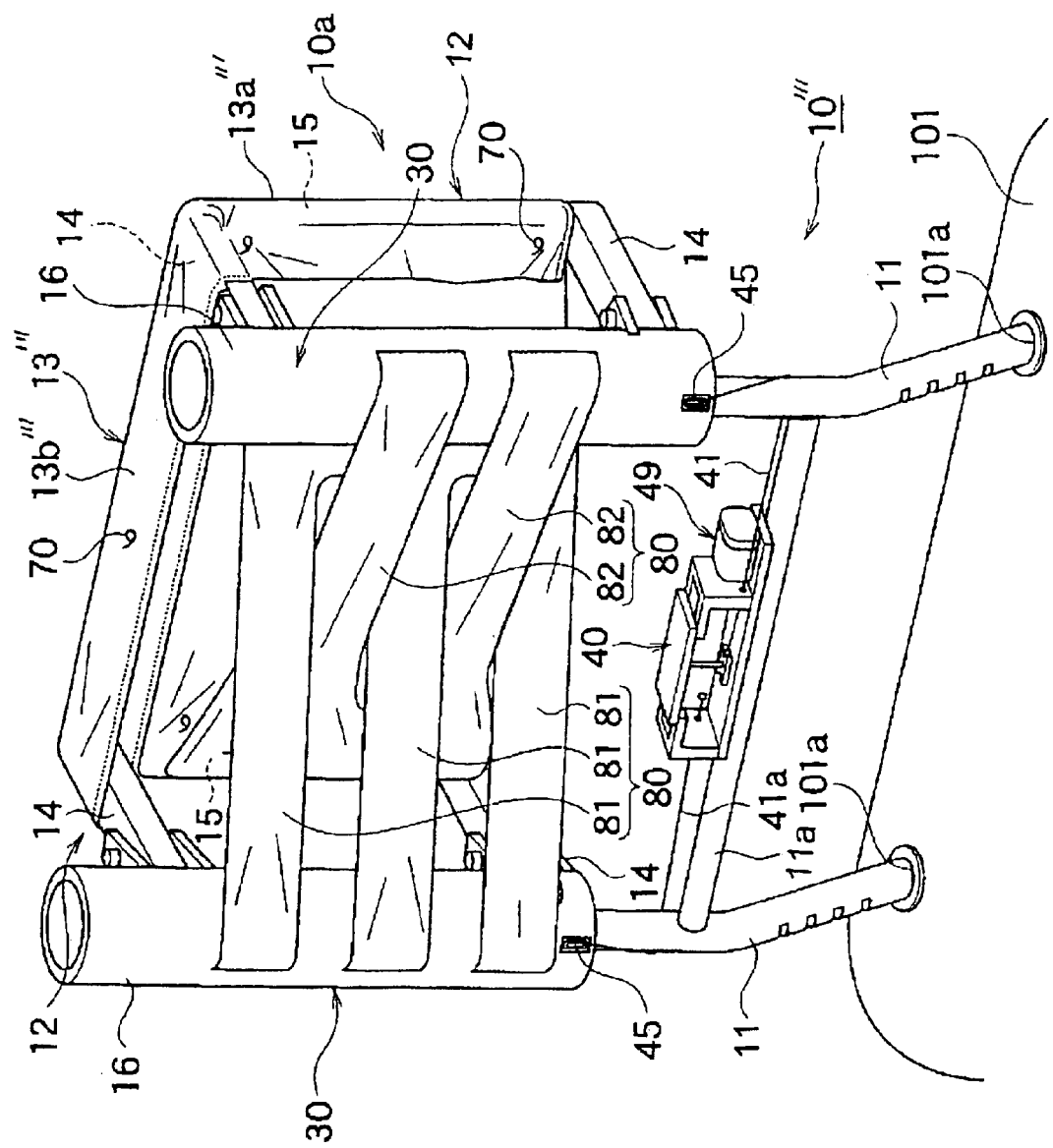
FIG. 25 is a simplified rear perspective view of a headrest unit in accordance with a fourth embodiment of the present invention when in the completely deployed state with the cushion pads removed for purposes of illustration.

Referring now to FIG. 25, a vehicle headrest apparatus 10''' in accordance with a fourth embodiment will now be explained. Basically, the headrest apparatus 10''' is identical to the headrest apparatus 10", explained above, except that a two-ply flexible sheet member 13''' is used instead of the single ply flexible sheet member 13" of the third embodiment. In view of the similarity between the fourth embodiment and the prior embodiments, the parts of the fourth embodiment that are identical to the parts of the prior embodiments will be given the same reference numerals or symbols as the parts of the first embodiment. Moreover, the descriptions of the parts of the fourth embodiment that are identical to the parts of the prior embodiments have been omitted for the sake of brevity.

FIG. 25 is a rear perspective view of a headrest apparatus 10''' in accordance with a fourth embodiment of the present invention when in the completely deployed state. While the third embodiment illustrates a case in which the tension increasing mechanism 80 is applied to the one-ply sheet member 13 of the first embodiment, the tension increasing mechanism 80 can also be applied to the two-ply sheet member 13''' (which is provided with front and back sheet layers 13e''' and 13f''') of the second embodiment. The fourth embodiment shown in FIG. 25 illustrates such an arrangement. The fourth embodiment features separate belt-shaped sheets 81 and 82 that are joined to the left and right end parts of a two-ply sheet member 13''' and exhibits the same function as the third embodiment. The two-ply sheet member 13''' has a vertical sheet support portion 13a''' and horizontal sheet support portion 13b'''. Thus, the tension increasing mechanism or device 80 converts the pressing force of the passenger's head H into tension in the vertical sheet support portion 13a''' and the horizontal sheet support portion 13b''' when the vertical members 15 and upper horizontal members 14 apply tension to the vertical sheet support portion 13''' and the horizontal sheet support portion 13b'''.

Fifth Embodiment

Referring now to FIGS. 26–39, a vehicle headrest unit 210 in accordance with a fifth embodiment will now be explained. Basically, the headrest unit 210 uses the basic features of the first embodiment, but has a modified head restraining member. In view of the similarity between the fifth embodiment and the prior embodiments, the parts of the fifth embodiment that are identical to the parts of the prior embodiments will be given the same reference numerals or symbols as the parts of the first embodiment. Moreover, the descriptions of the parts of the fifth embodiment that are identical to the parts of the prior embodiments have been omitted for the sake of brevity.

Figure 26:
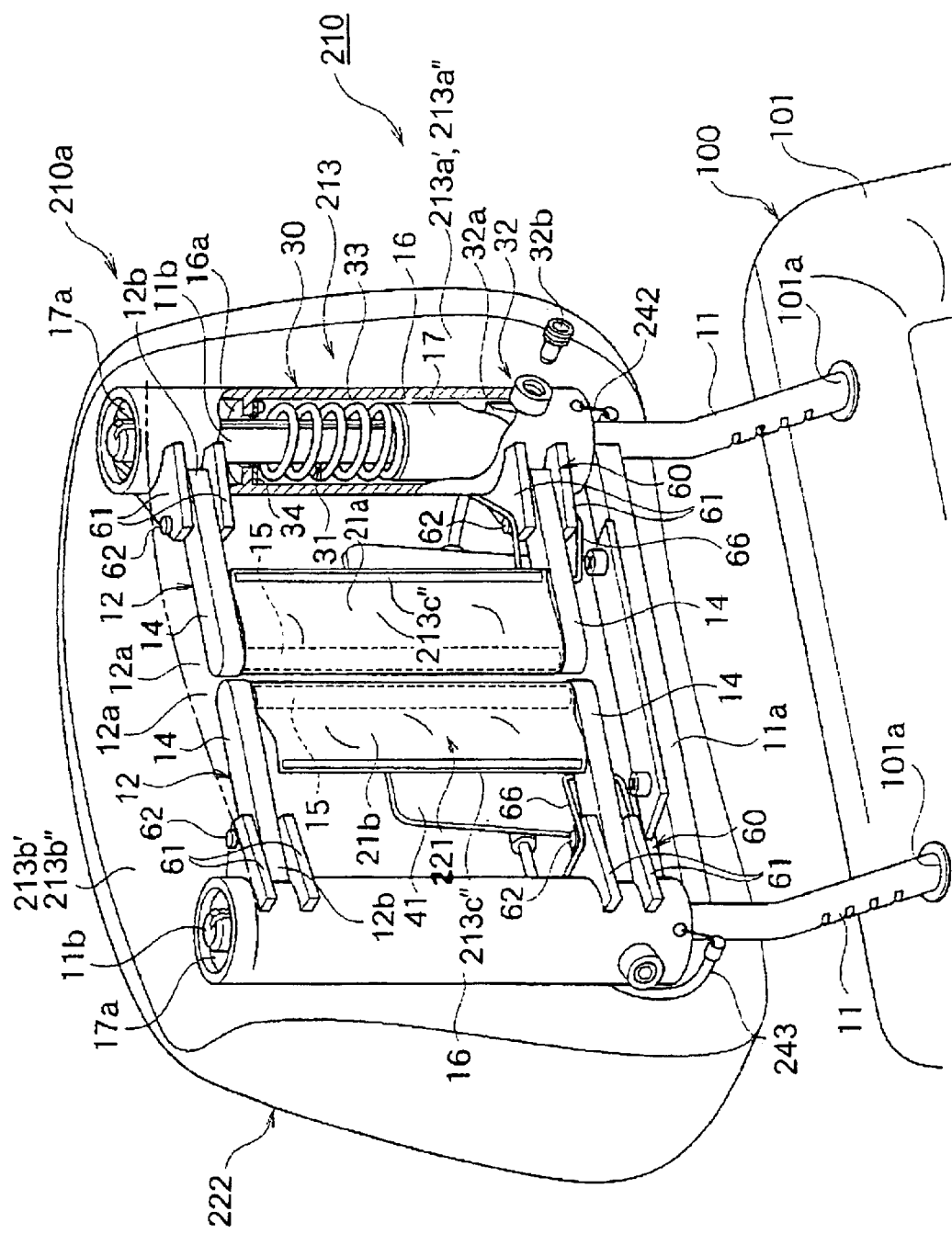
FIG. 26 is a front perspective view of a headrest unit (portions being transparent for purposes of illustration) in accordance with a fifth embodiment of the present invention when in the initial state.
Figure 27:
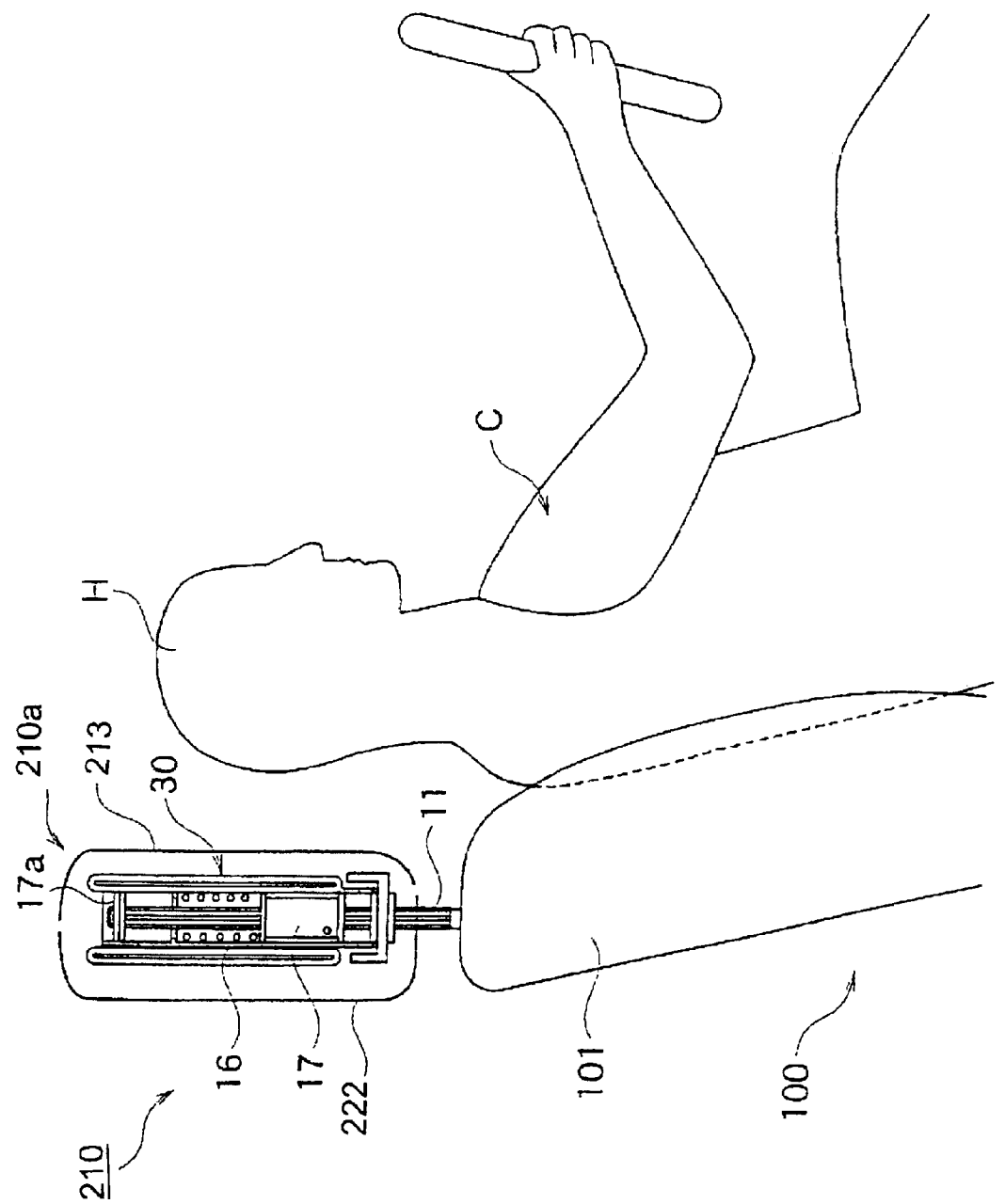
FIG. 27 is a simplified schematic side elevational view of the mounted state of the headrest unit of the fifth embodiment of the present invention.

As shown in FIGS. 26 and 27, the vehicle headrest apparatus 210 of this embodiment has a headrest portion unit 210a located on the upper end part of a seatback 101 of a vehicle seat 100 in which a passenger sits. The headrest unit 210a, which supports the head H of a seated passenger C, is mounted to a pair of left and right mounting holes 101a provided in the upper end part of the seatback 101 by a pair of stays 11. The headrest unit 210a is mounted such that its vertical position can be adjusted.

As in the first embodiment, the connecting member 11a of this fifth embodiment is connected integrally to the bottom end parts of the stays 11 such that it spans there-between. The headrest unit 210a is mounted between the projecting end parts 11b of the stays 11, which project from the connecting member 11a. Thus, the stays 11 and the connecting member 11a form a mounting member.

The headrest unit 210a is basically includes the left and right headrest members 12 from the first embodiment. However, the headrest members 12 of this fifth embodiment are covered by a front cover 213 and a back cover 222 that form a cushion pad. The front cover 213 functions as a head restraining member as explained below. The headrest unit 210a uses the frame members 14 and 15, and the swing force applying devices 30 of the first embodiment. A modified lock device 240 is operated by the control system 50 of the first embodiment A sheet member 221 that functions as a tension increasing device is part of the front cover 213.

Figure 28:
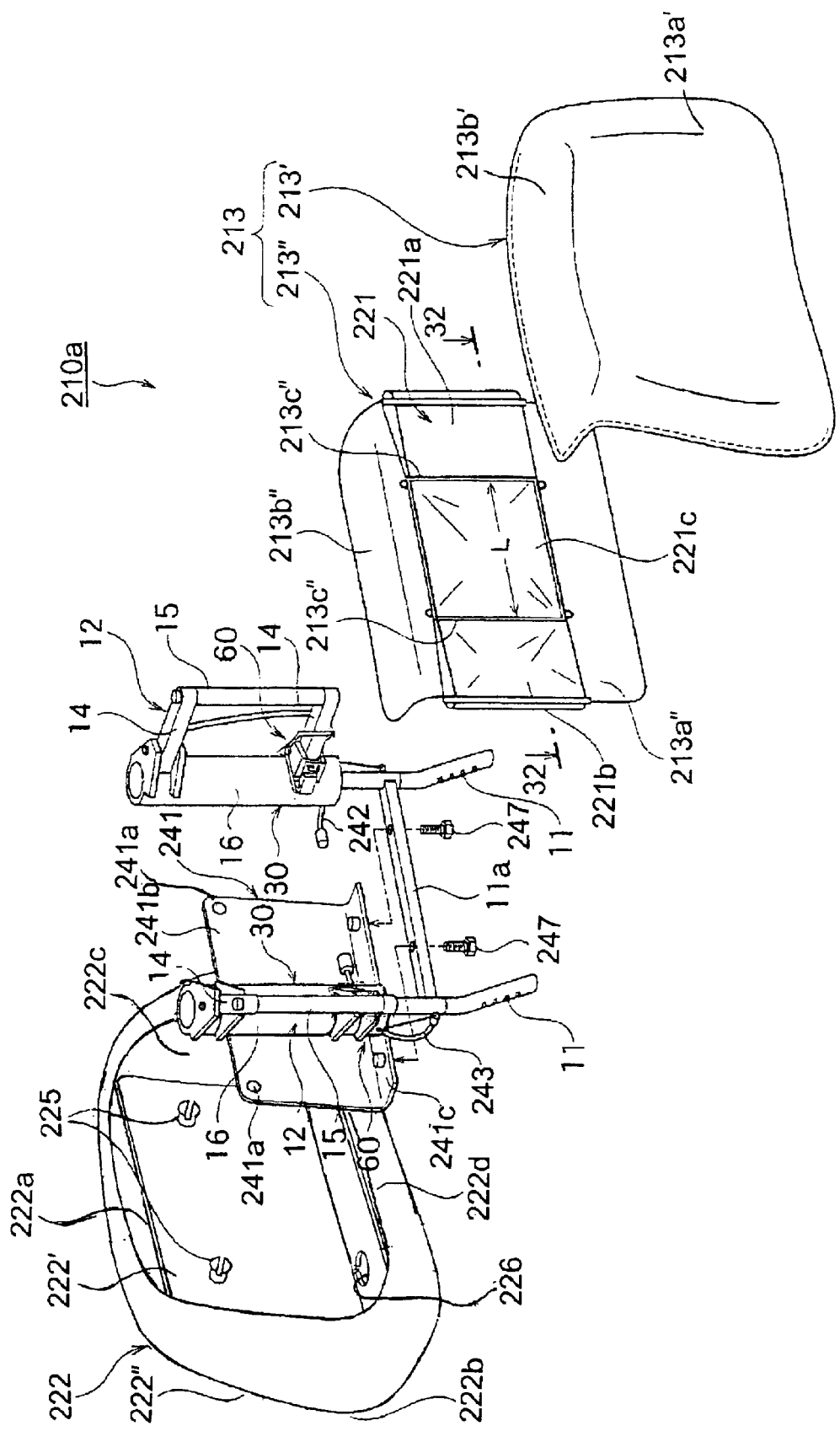
FIG. 28 is an exploded front perspective view of the headrest unit of the fifth embodiment of the present invention.

Thus, as shown in FIG. 28, the portion of the headrest unit 210a that supports the passenger's head H has the front cover 213 covering the front of the left and right headrest members 12 and the back cover 222 covering the back of the left and right headrest members 12. A mounting bracket 241 for the lock device 240 is attached to the connecting member 11a, which is enclosed between the front cover 213 and the back cover 222.

As shown in FIG. 26, the left and right headrest members 12 divide the headrest unit 210a approximately midway in the transverse direction. The headrest members 12 have division end parts 12a and outer end parts 12b are opposite the division end parts 12a. The end parts 12b are swingably mounted to the stays 11 through the swing force applying devices 30.

As in the first embodiment, the left and right headrest members 12 of this fifth embodiment each form a generally rectangular frame portion comprising the upper and lower horizontal members 14, the vertical member 15 that joins the upper and lower horizontal members 14 together at the ends thereof that correspond to the division end parts 12a, and one of the outer cylinders 16 that couples the end parts 12b together.

As in the first embodiment, the inner cylinder 17 of this fifth embodiment is joined in an integral manner to the outside of a bottom part of the projecting end part of each stay 11 (near the connecting member 11a) and the flange-shaped end plate 17a is joined to the upper end of each stay 11. The outer cylinders 16 are fitted closely around the outside circumference of the inner cylinders 17 and the endplates 17a in such a manner that they can rotate freely and move freely in the axial direction. Thus, the left and right headrest members 12 connected to the outer cylinders 16 can open and close about the inner cylinders 17 in the manner of a double-hinged door.

Figure 30:
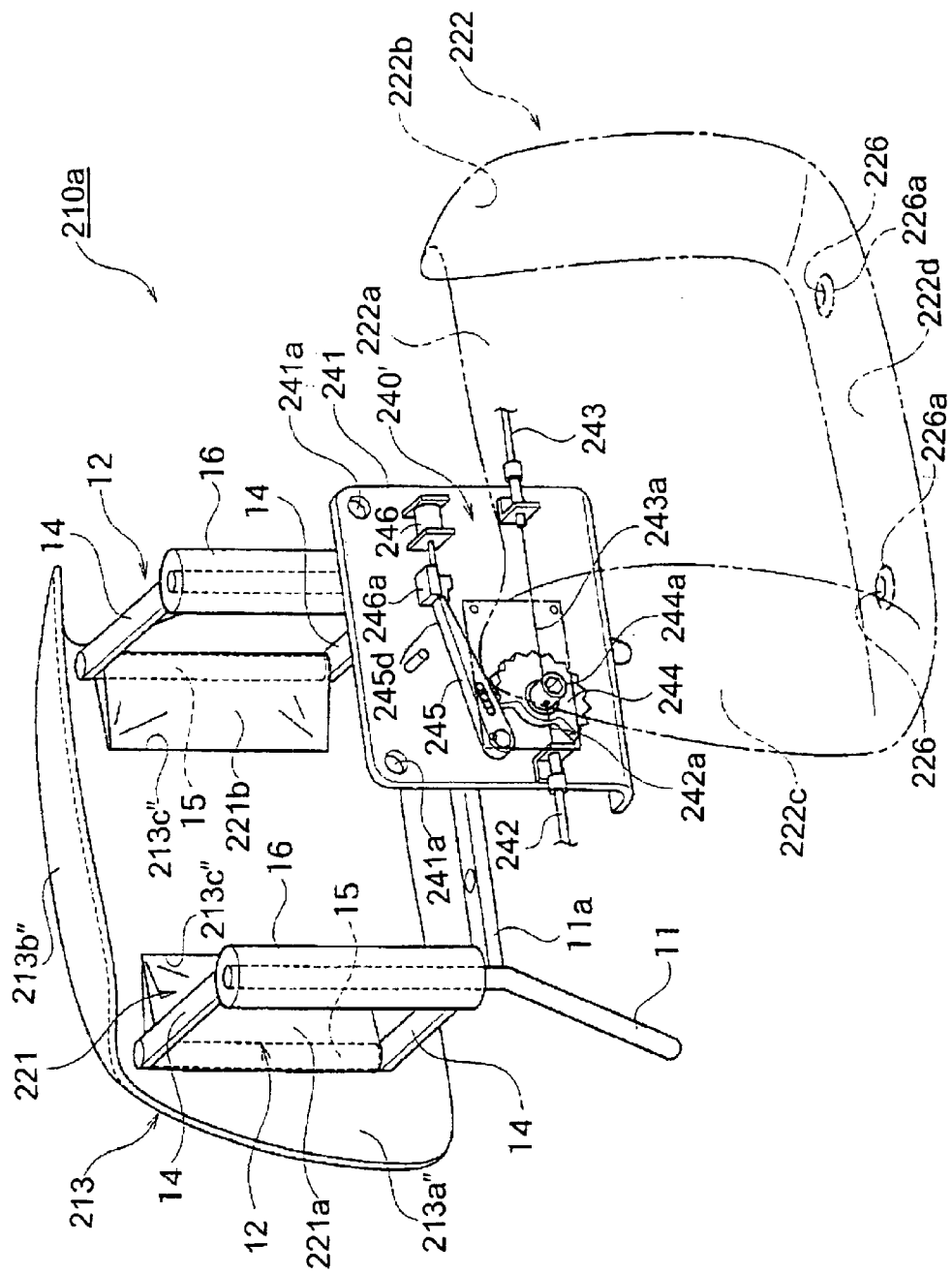
FIG. 30 is a simplified, exploded rear perspective view of the headrest unit (portions being transparent for purposes of illustration) of the fifth embodiment of the present invention during assembly.
Figure 31:
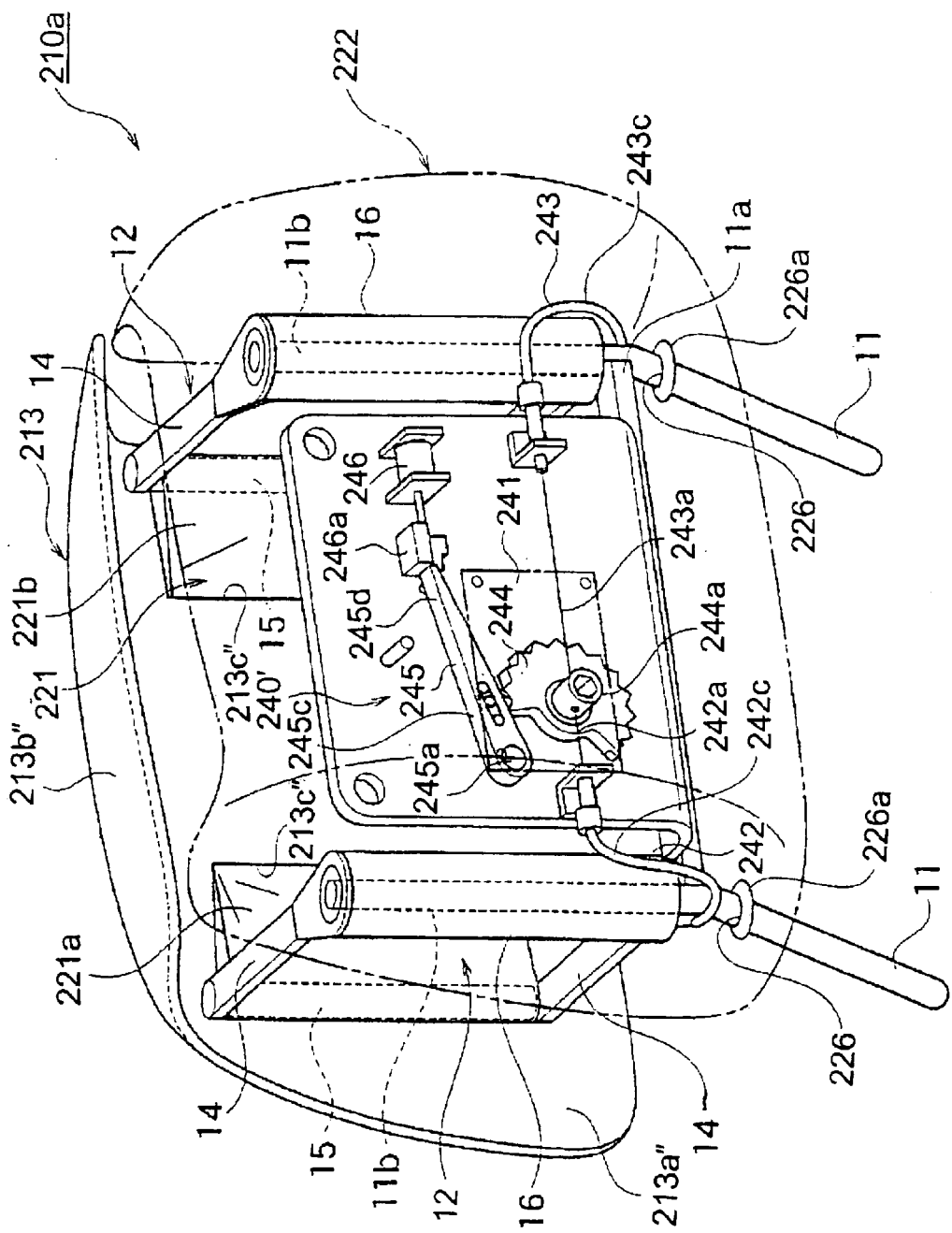
FIG. 31 is a simplified rear perspective view of the headrest unit (portions being transparent for purposes of illustration) of the fifth embodiment of the present invention in its assembled state.

As shown in FIGS. 30 and 31, the front cover 213 is installed so as to span between the division end parts 12a of the left and right headrest members 12 in such a manner that it can move relative thereto and the sheet member 221 is disposed there-between. The front cover 213 has two leaves, a vertical sheet support portion 213a" that faces the head H of the passenger and a horizontal sheet support portion 213b" that extends rearward from and is substantially perpendicular to the upper edge of the vertical sheet support portion 213a". The front cover 213 is configured to restrain the passenger's head H.

As shown in FIG. 28, the front cover 213 is provided with a front cover outer skin 213' that acts as a low-rigidity front layer that contacts the passenger's head H and has an excellent deflection characteristic and a front cover core material 213" that acts as a high-rigidity rear layer having an excellent load transmitting characteristic. Thus, a multilayered structure is obtained by bonding the front cover outer skin 213' and the front cover core material 213" together as an integral unit.

The front cover outer skin or layer 213' is preferably made of cloth material provided with a backing of sponge or other buffer material that is resiliently compressible. The front cover core material or layer 213" is made of a material that, in a thin-walled state, is resilient and has excellent shape-retaining performance, e.g., polycarbonate. The front cover outer skin 213' is bonded to the front surface of the front cover core material 213".

The front cover core material 213" is formed such that its overall shape is that of a gently curved three-dimensional surface in which a center portion of the vertical sheet support portion 213a" is concave in such a manner as to substantially follow the contour of the back of the passenger's head H and the peripheral edge portion thereof is curved smoothly rearward.

The sheet-like member 221, which functions as a tension increasing device, is provided in back of the front cover 213, and is stretched between the division end parts 12a of the left and right headrest members 12 when the headrest members are in the swung-forward state.

Figure 32:
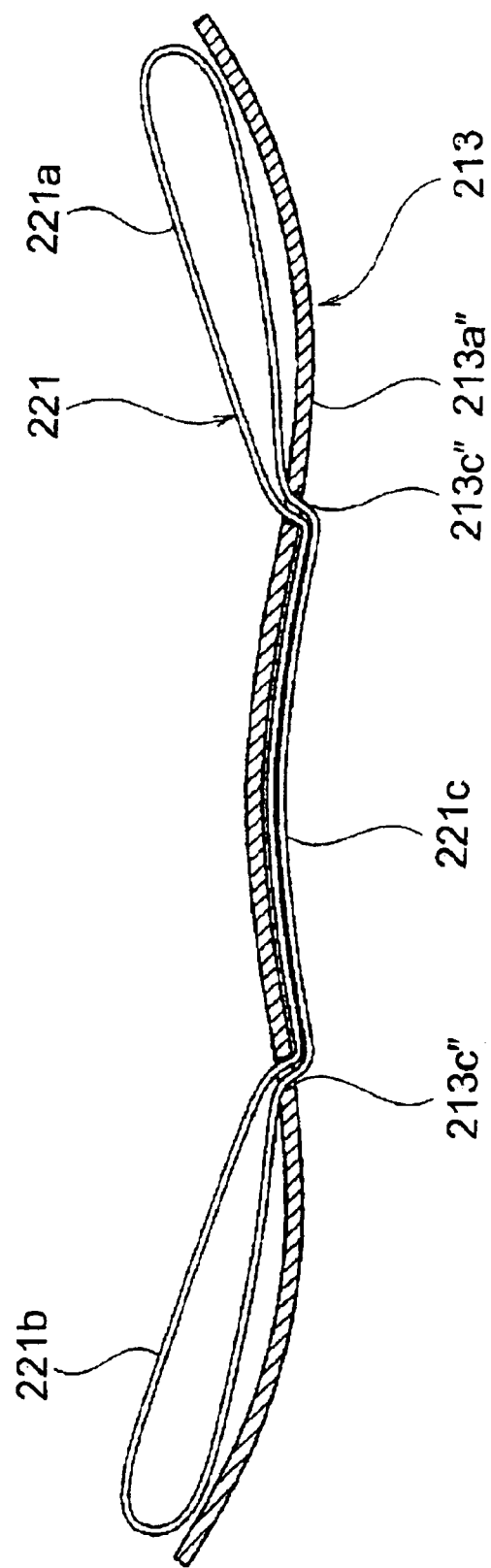
FIG. 32 is an enlarged cross-sectional view taken along the line 32—32 in FIG. 28.

More specifically, the sheet member 221 is a belt-shaped piece of cloth sewn into a loop form as shown in FIG. 28. The length of the loop is approximately equal to the transverse width of the front cover core material 213". A pair of vertical slits 213c" of prescribed length L is provided in a portion of the front cover core material 213" corresponding generally to the center of the vertical sheet support portion 213a". As shown in FIG. 32, one end part 221a of the sheet member 221 is inserted into one vertical slit 213c" from the rear side of the front cover core material 213" and pulled through to the front side of the front cover core material 213". Then, the same end part 221a is inserted into the other vertical slit 213c" and pulled through to the rear side of the front cover core material 213".

Therefore, the middle section 221c of the sheet member 221 is disposed on the front side of the front cover core material 213" between the two vertical slits 213c" and the two end parts 221a and 221b are disposed on the rear side of the front cover core material 213". Each of the end parts 221a and 221b is loop-shaped.

The sheet member 221 is pinch-fixed or bonded at the portions thereof that passes through the vertical slits 213c" such that the sheet-like member becomes integral with the front cover core material 213".

Figure 33:
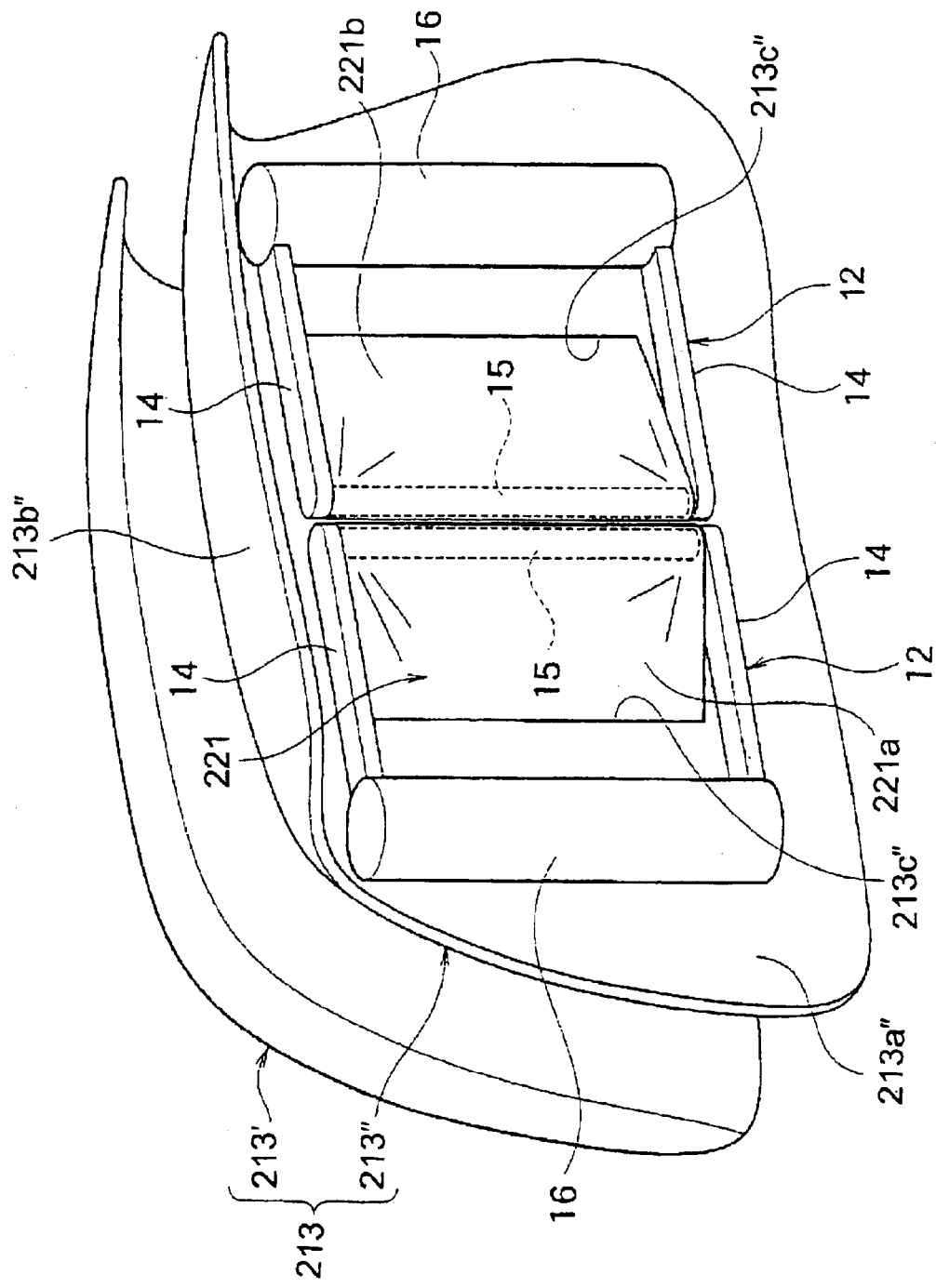
FIG. 33 is a simplified rear perspective view of the mounted state of the head restraining member of the fifth embodiment of the present invention on the left and right headrest members before deployment.
Figure 34:
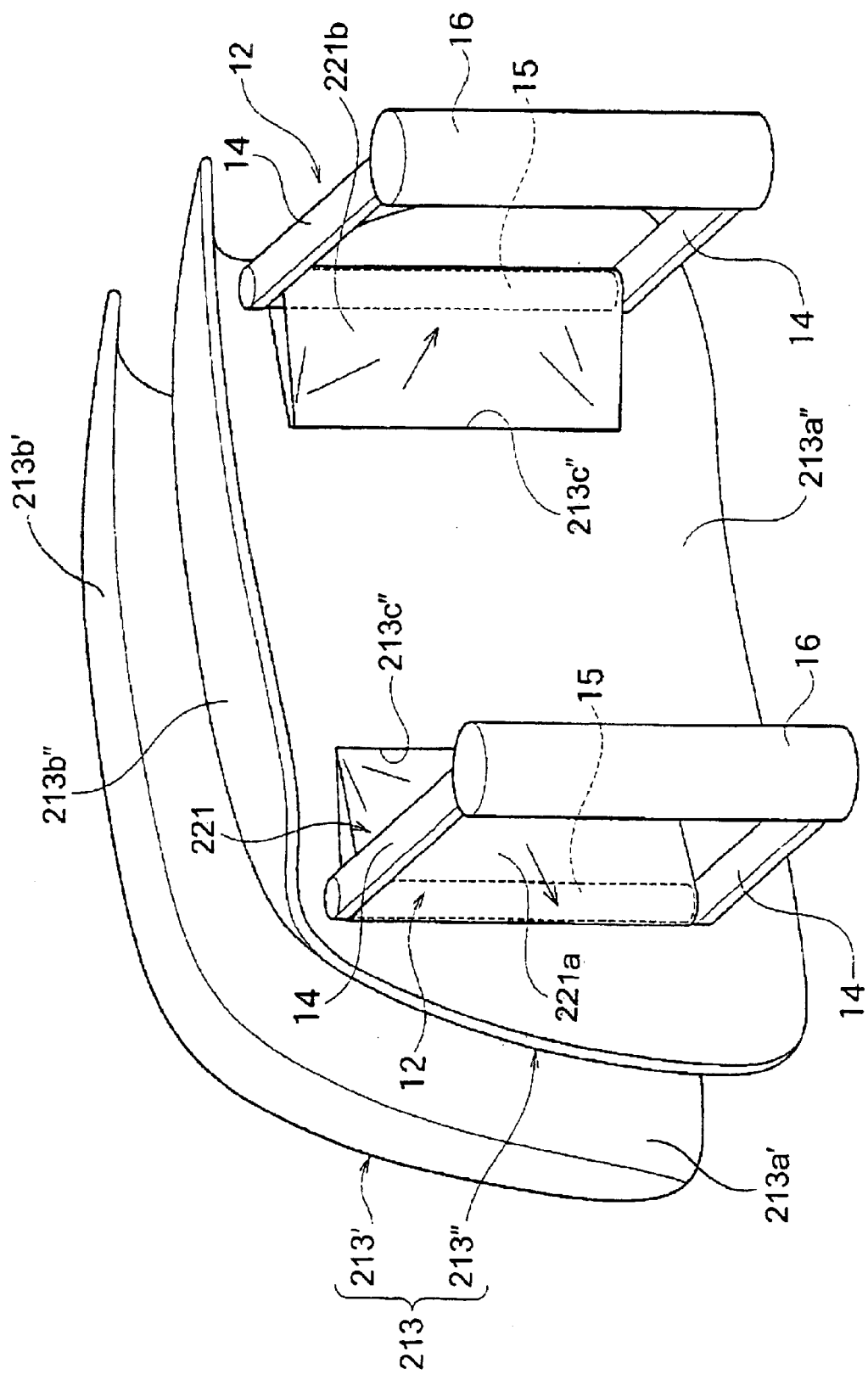
FIG. 34 is a simplified rear perspective view of the mounted state of the head restraining member of the fifth embodiment of the present invention on the left and right headrest members after deployment.

The vertical members 15 of the left and right headrest members 12 are passed through the insides of the loop-shaped end parts 221a and 221b of the sheet member 221. Since the vertical members 15 are close together when the left and right headrest members 12 are in the initial state, the end parts 221a and 221b of the sheet member 221 are folded inward to the middle of the front cover core material 213" from the vertical slits 213c", as shown in FIG. 33. When the left and right headrest members 12 are swung forward, the end parts 221a and 221b are spread outward from the vertical slits 213c" in a tensioned state, as shown in FIG. 34.

Meanwhile, as shown in FIG. 28, the back cover 222 that covers the left and right headrest members 12 from the rear is provided with a back support portion 222a, two side support portions 222b and 222c, and a bottom support portion 222d such that it covers a region including the back and sides of the left and right headrest members 12 and the under side of the connecting member 11a. The open upper portion is covered by the horizontal sheet support portion 213b" of the front cover 213.

Figure 29:
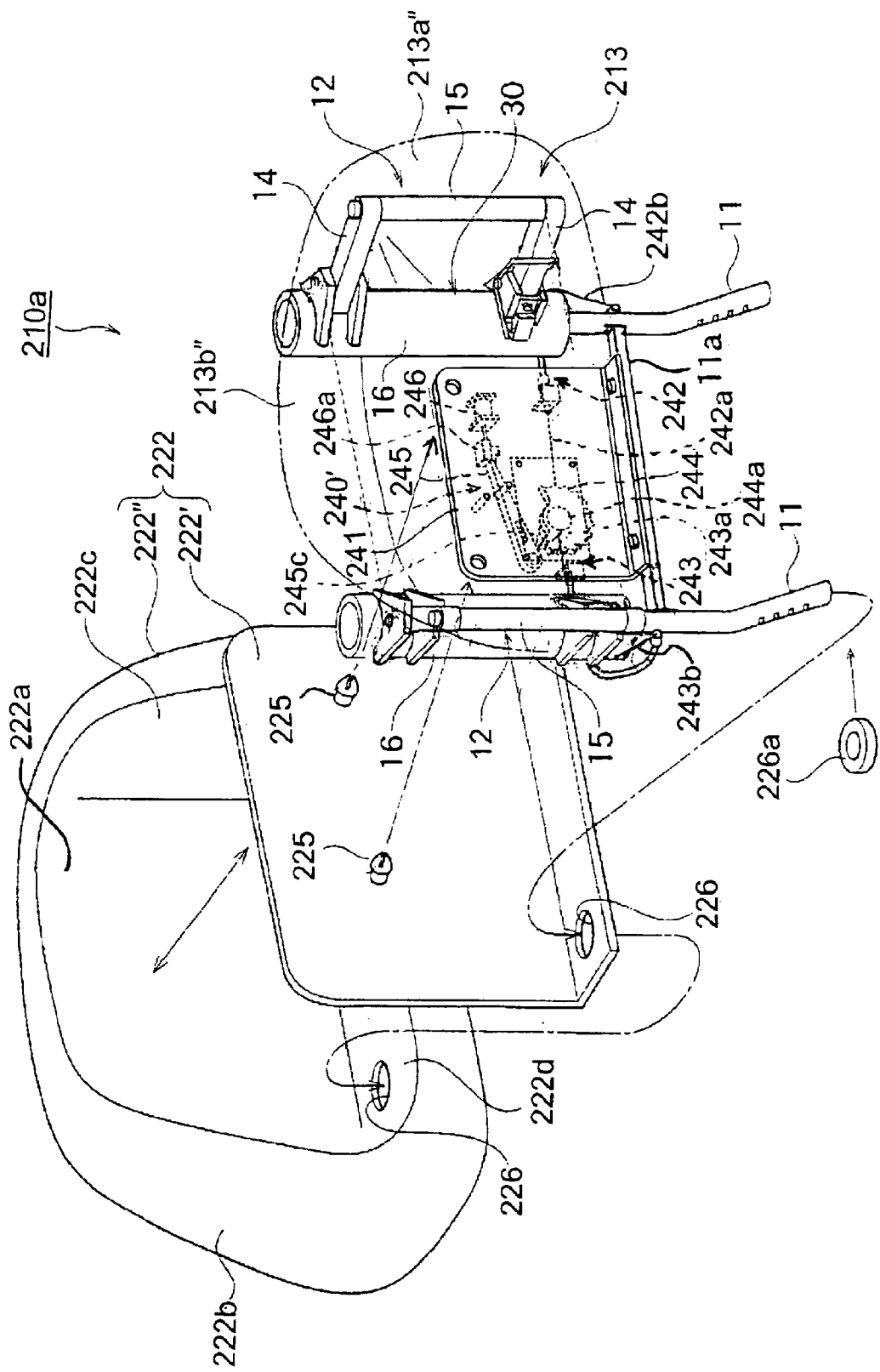
FIG. 29 is an exploded front perspective view of the headrest unit (portions being transparent for purposes of illustration) of the fifth embodiment of the present invention during assembly.

The back cover 222 comprises, as shown in FIG. 29, a thin-walled base section 222' made of polycarbonate or another synthetic resin and a cloth section 222" that is bonded to the outside of the base section and whose back side has been provided with a sponge. Several clips 225 are provided so as to project forward from the back support portion 222a, and a pair of through holes 226 for the stays 11 to pass through are provided in the bottom support portion 222d.

As shown in FIG. 29, the back cover 222 is mounted by first passing the lower ends of the stays 11 through rubber bushings 226a and through the through holes 226 in the bottom support portion 222d and then inserting the fasteners 225 of the back support portion 222a into the mating holes 241a formed in the mounting bracket 241 of the lock device 240, which is fixed to the connecting member 11a.

As in the first embodiment, the swing force applying devices 30 of this fifth embodiment each comprise, as shown in FIG. 26, the lift mechanism 31 that raises the left or right headrest member 12 with respect to the respective stay 11 and the swing mechanism 32 that swing-guides the left or right headrest member 12 forward in conjunction with the lifting action of the lift mechanism 31. Thus, while the left and right headrest members 12 are pushed upward by the lift mechanism 31, they are swung forward by the swing mechanism 32.

As in the first embodiment, the lift mechanism 31 of this fifth embodiment also comprises the spring 33 that is compressed between the upper end face of the inner cylinder 17 and the annular reduced-diameter part 16a that is formed integrally on the inside of the upper part of the outer cylinder 16. The washer 34 is provided between the spring 33 and the reduced-diameter part 16a to facilitate good sliding.

Consequently, the outer cylinders 16 are constantly subjected to an upward pushing force applied by the respective springs 33. Thus, the left and right headrest members 12, which are supported on the outer cylinders 16, are also subjected to an upward pushing force.

As shown in FIG. 26, as in the first embodiment, each swing mechanism 32 of this fifth embodiment comprises the helical groove 32a formed in the outer circumference of the inner cylinder 17 and the bolt 32b that screws into the outer cylinder 16. The helical groove 32a is slanted in such a direction that the left and right headrest members 12 are swung forward as they move upward, and the tip end part of the bolt 32b mates with the helical groove 32a such that it can slide freely therein. Thus, when the left and right headrest members 12 are pushed upward by the springs 33 of the lift mechanisms 31, the bolts 32b of the swing mechanisms 32 move upward while following the helical grooves 32a in the inner cylinders 17. As a result, the outer cylinder 16, being integrally joined with bolt 32b, swings in such a manner as to push the left and right headrest members 12 open in the forward direction. The amounts by which the left and right headrest members 12 swing can be established in advance by adjusting the shape, i.e., the slant angle, of the helical groove 32a. The helical groove 32a also enables the amount of swing per amount of upward rise of the left and right headrest members 12 to be adjusted.

The lock device 240 functions to hold the left and right headrest members 12 in an initial position in resistance to the force applied by the swing force applying device 30. As shown in FIGS. 29 to 31, the lock device 240 comprises a mounting bracket 241 and the following components provided on the rear side thereof: a gear or winding element 244 having wound thereon a pair of wires 242 and 243, a link 245 that engages and disengages with respect to the gear 244, and a solenoid 246 that controls the swing motion of the link 245.

The mounting bracket 241 has a vertical mechanism mounting leaf 241b and a mounting flange 241c formed by bending the bottom edge of the vertical mechanism mounting leaf 241b into a horizontal orientation, thus giving the mounting bracket 240 an L-shaped cross section. The mounting flange 241c is fastened to the upper surface of the connecting member 11a (which spans between the left and right stays 11) with a pair of bolts 247.

The winding element 244 is provided with a small-diameter drum 244a for winding the wires 242 and 243 in a center part thereof and is mounted to the mechanism mounting leaf 241b of the mounting bracket 241 in such a manner that it can rotate freely. One end part 242a and 243a of each wire 242 and 243 is wound onto the drum 244a in the same rotational direction. The other end part 242b of one wire 242 is connected with a pin to a bottom part of the outer cylinder 16 of the left headrest member 12 and the other end part 243b of the other wire 243 is connected with a pin to a bottom part of the outer cylinder 16 of the right headrest member 12.

As shown in FIGS. 26 and 31, middle portions of the wires 242 and 243 are enclosed in flexible outer tubes 242c and 243c such that the wires 242 and 243 can be easily pushed and pulled therein. When the left and right headrest members 12 are in the initial state (i.e., the un-swung state) shown in FIG. 26, the first end parts 242a and 243a of the wires 242 and 243 are wound fully onto the winding element 244 and are tensioned by the force of the swing force applying devices 30.

The base end 245a of the link 245 is pivotally mounted to mounting bracket 241 above the winding element 244, and an intermediate section of the link 245 that is closer to the base end 245a than the other end is provided with a ratchet mechanism 245b having a mating claw 245c that engages and disengages with the winding element 244.

Figure 36:
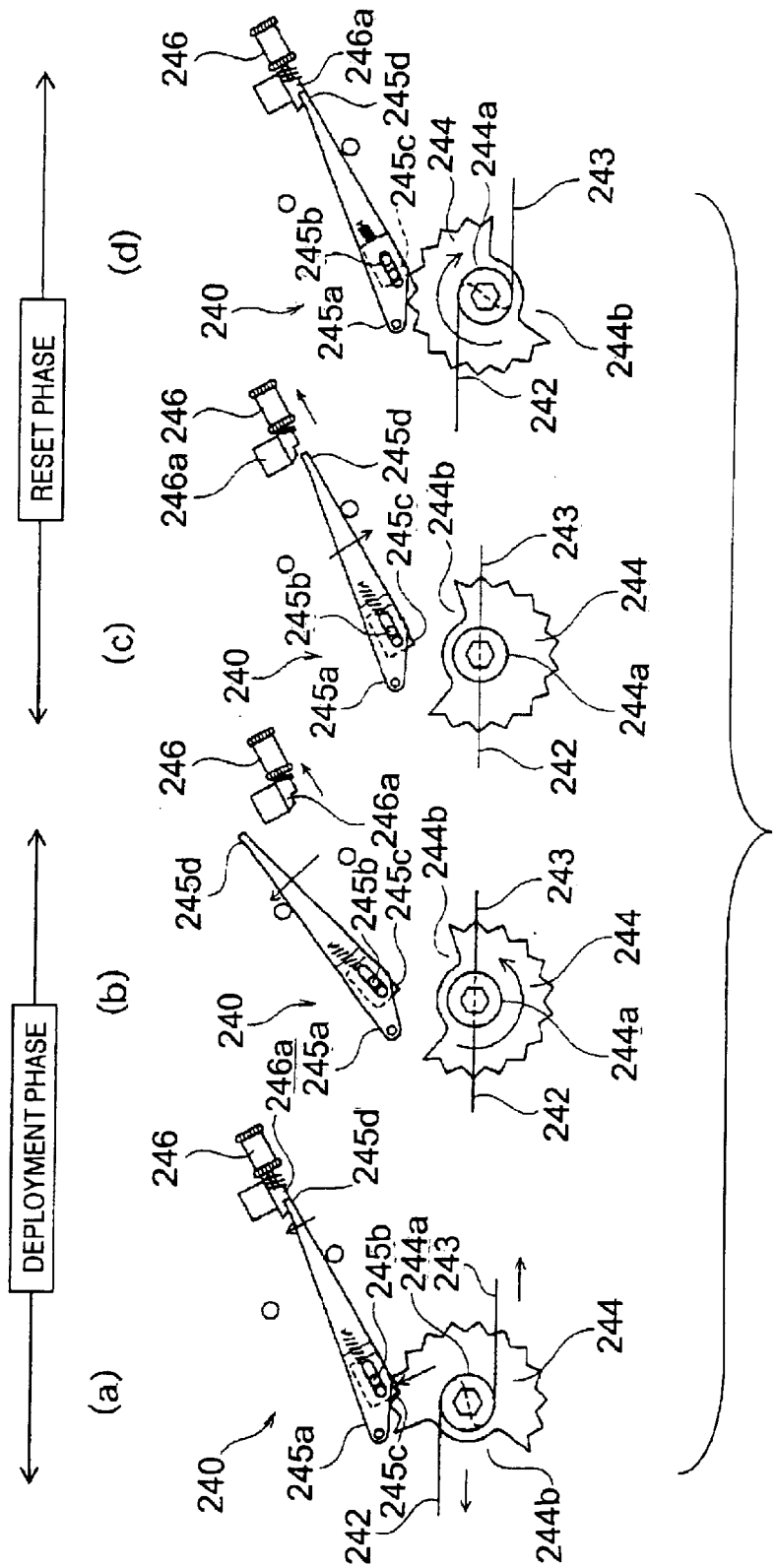
FIG. 36 is a sequential schematic view illustrating the operation of the lock device or mechanism of the fifth embodiment of the present invention in the order of steps (a) to (d)

As shown in FIG. 36, the mating claw 245c of the ratchet mechanism 245b mates with the winding element 244 in such a manner as to oppose rotation in the direction (counterclockwise direction) that would cause the wires 242 and 243 to unwind from the drum 244a but allow rotation in the direction (counterclockwise direction) that would cause the wires 242 and 243 to be wound onto the drum 244a.

The solenoid 246 is arranged so as to face the tip end part 245d of the link 245 and is contrived to extend and retract a mating portion 246a to and from the tip end part 245d. In the locked state shown in step (a) of FIG. 36, the current is OFF and the mating portion 246a is extended so as to mate with the tip end part 245d of the link 245. In the lock-released state shown in step (b) of FIG. 36, the current is ON and the mating portion 246a is retracted such that it disengages from the tip end part 245d of the link 245.

In the locked state shown in step (a) of FIG. 36, the mated condition of the winding element 244 and the mating claw 245c is maintained and unwinding of the wires 242 and 243 is prevented. Thus, the outer cylinders 16 remain in such a rotational position that the left and right headrest members 12 are held in the initial state.

Meanwhile, in the lock-released state shown in step (b) of FIG. 36, the link 245 pops up due to the rotational force of the winding element 244 and swings in the counterclockwise direction, causing the mating claw 245c to disengage from the winding element 244. As a result, the wires 242 and 243 are allowed to unwind freely and the outer cylinders 16 are lifted and swung by the swing force applying device 30 so as to lift up and swing forward the left and right headrest members 12.

Based on the amount by which wires 242 and 243 are wound onto the winding element 244, there is a portion of the winding element 244 where gear teeth are not required. To prevent the mating claw 245c from catching at some point along this portion, a cut-away portion 244b is provided to eliminate the unnecessary teeth.

The lock device 240 can be reset after it has allowed the left and right headrest members 12 to swing forward. The link 245 is swung clockwise from the lock-released state shown in step (b) of FIG. 36 to the position shown in step (c) of FIG. 36 and the mating portion 246a of the solenoid 246 is mated with the tip end portion 245d of the link as shown in step (d) of FIG. 36.

With the mating portion 246a thus engaged, the winding element 244 is rotated clockwise against the force of the swing force applying devices 30 such that the wires 242 and 243 are wound up and the lock device 240 is returned to the initial state shown in step (a) of FIG. 36.

This fifth embodiment uses the control system 50 of the first embodiment as shown in FIG. 10. Thus, the controller 54 is constituted such that when it detects a rear-end collision based on the detection signals from the sensors 51, 52 and 53, it applies a current to the solenoid 246 so as to release the lock device 240.

As shown in FIG. 26, the left and right headrest members 12 of this embodiment are also provided with the fastening mechanisms 60 of the first embodiment that hold the left and right headrest members 12 in line with the stays 11 against rearward pressing forces acting on the front cover 213. Thus, the fastening mechanisms 60 will not be explained again. Rather, the fastening mechanisms 60 of this embodiment are the same as the one shown in FIGS. 11 and 12 and described above.

As in the first embodiment, when the head H of a seated passenger or anything else touches against the front cover 213 such that a rearward force acts on the left and right headrest members 12, the horizontal members 14 swing rearward against the force of springs 66 and the outer cylinders 16 are locked to the inner cylinders 17 by the mating of the claws 63a of the mating members 63 with the rack 65.

Thus configured, the vehicle headrest apparatus 210 in accordance with the fifth embodiment detects when a following vehicle m collides with the rear end of the vehicle M (as shown in FIG. 10) using the V-sensor 51, the G-sensor 52, and the pressure sensor 53 of the first embodiment. A touch sensor and a strain gauge (not shown) can also be used. When a collision is detected, the controller 54 applies a current to the solenoid 246 of the lock mechanism 240.

An example of the control operations executed by the controller 54 is presented in the flowchart of FIG. 14. First, in step S1, control of the headrest apparatus 210 commences when the ignition switch is turned ON. At this stage, the current (hereinafter called "solenoid drive current") to be supplied to the solenoid 46 is OFF.

Next, in step S2, the controller 54 detects the following vehicle m based on the detection signal of the V-sensor 51. In step S3, the same detection signal is used to calculate the relative distance S between the vehicle M installed with the present invention and the following vehicle m. In step S4, the controller 54 calculates the relative velocity ΔV between the two vehicles M and m.

In step S5, the controller 54 uses the control map shown in FIG. 15 to calculate the relationship between the relative distance S and relative velocity ΔV found in steps S3 and S4 and the preset relative distance Scr and relative velocity ΔVcr. If the two conditions S<Scr and V>Vcr are both satisfied, the controller estimates that the following vehicle m will collide with the rear end of the vehicle M and proceeds to step S6. Otherwise, the controller 54 returns to step S2.

In step S6, a current smaller than the actual drive current is applied to the solenoid 246 of the lock device 240 in order to raise the operational response of the solenoid 246 in advance.

Then, in step S7, one sensor from among the G-sensor 52 and the pressure sensor 53, or the touch sensor and strain gauge, is used to detect if the vehicle M has actually experienced a rear-end collision. In step S8, the actual solenoid current (maximum current) is applied to solenoid 246. As a result, the lock device 240 is put into the released state.

Figure 35:
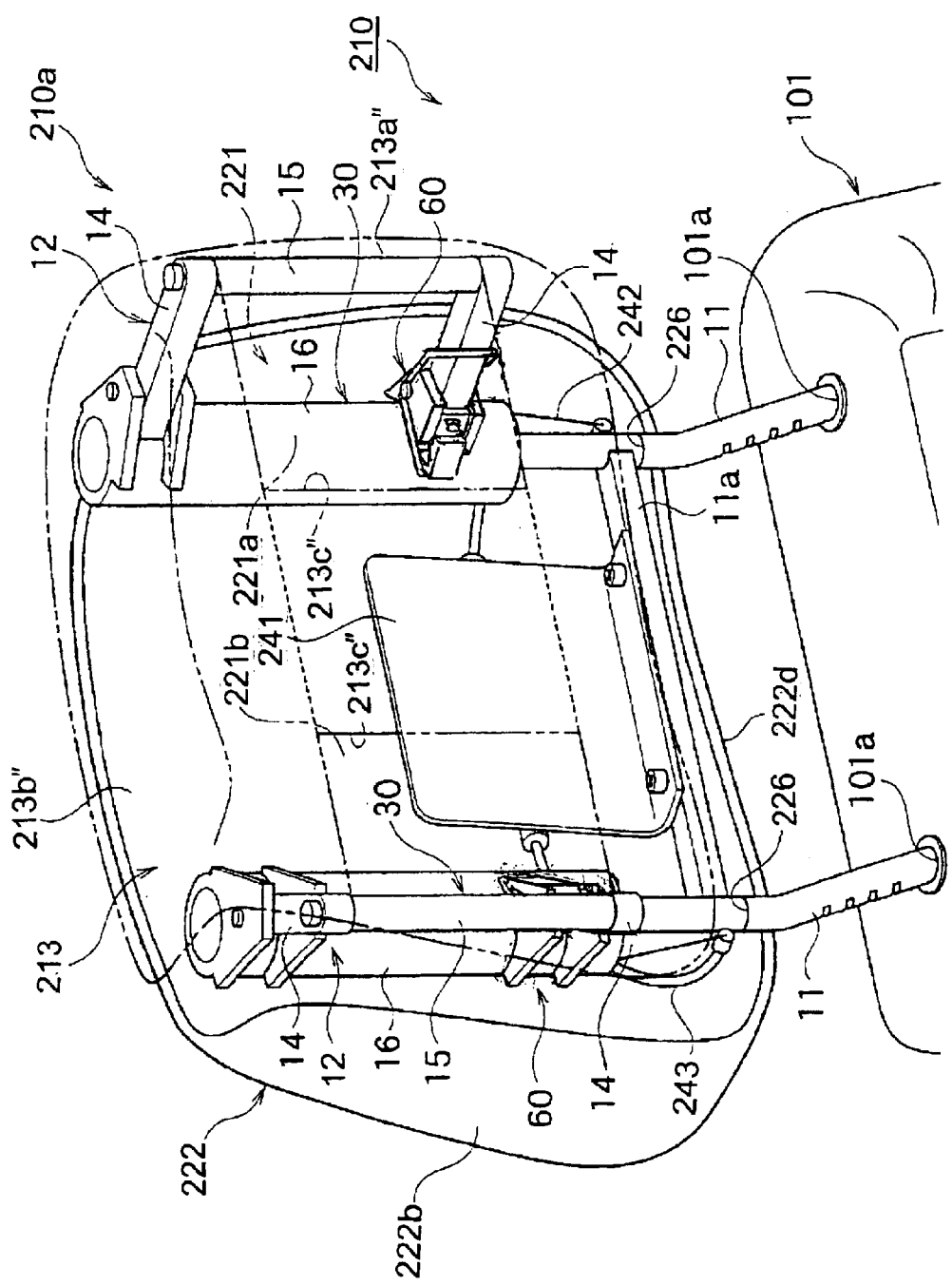
FIG. 35 is a front perspective view of the headrest unit (portions being transparent for purposes of illustration) of the fifth embodiment of the present invention in the deployed state.
Figure 37:
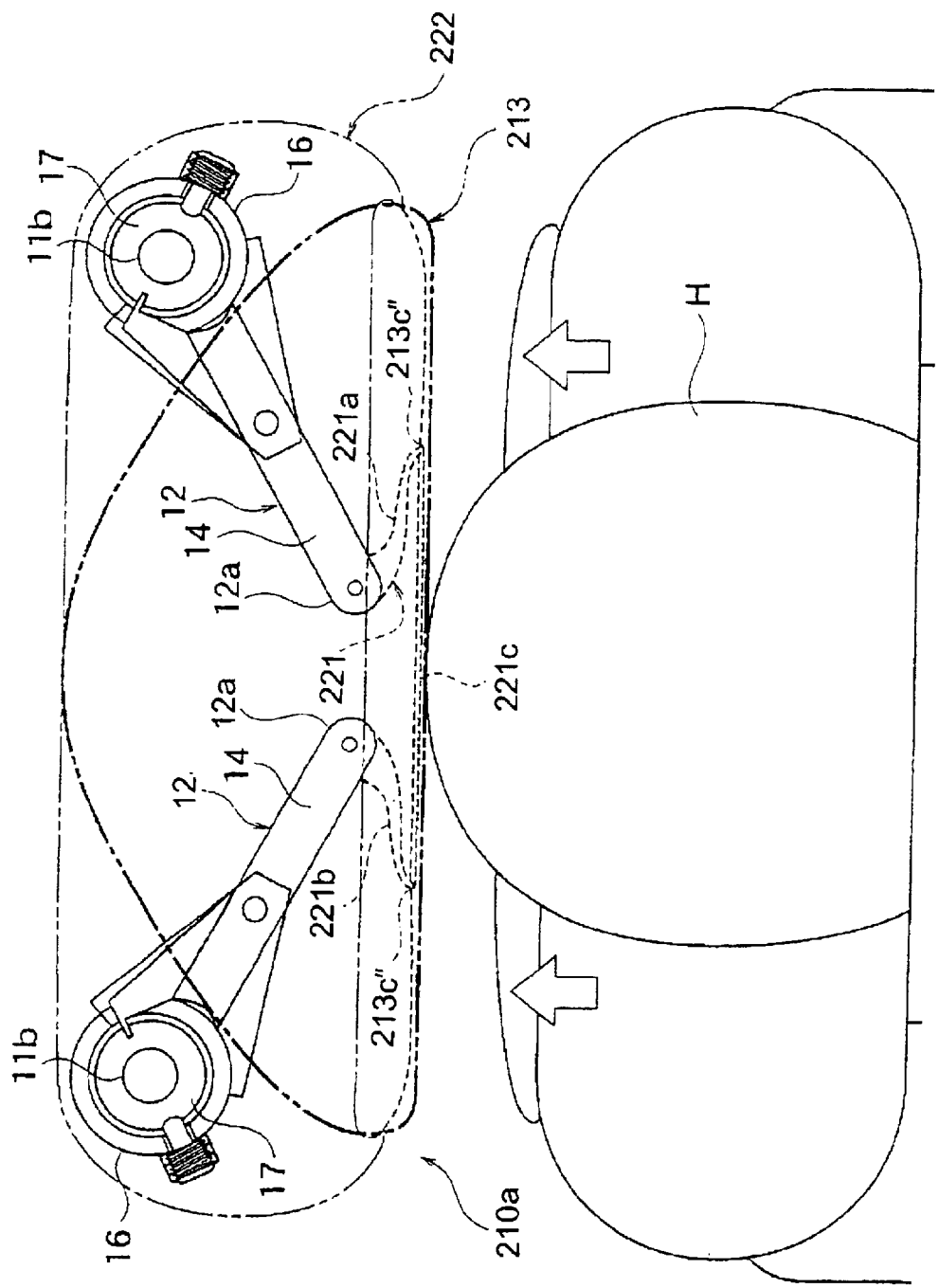
FIG. 37 is a simplified top plan view of the headrest unit (portions being transparent for purposes of illustration) of the fifth embodiment of the present invention during deployment immediately after a rear-end collision.
Figure 38:
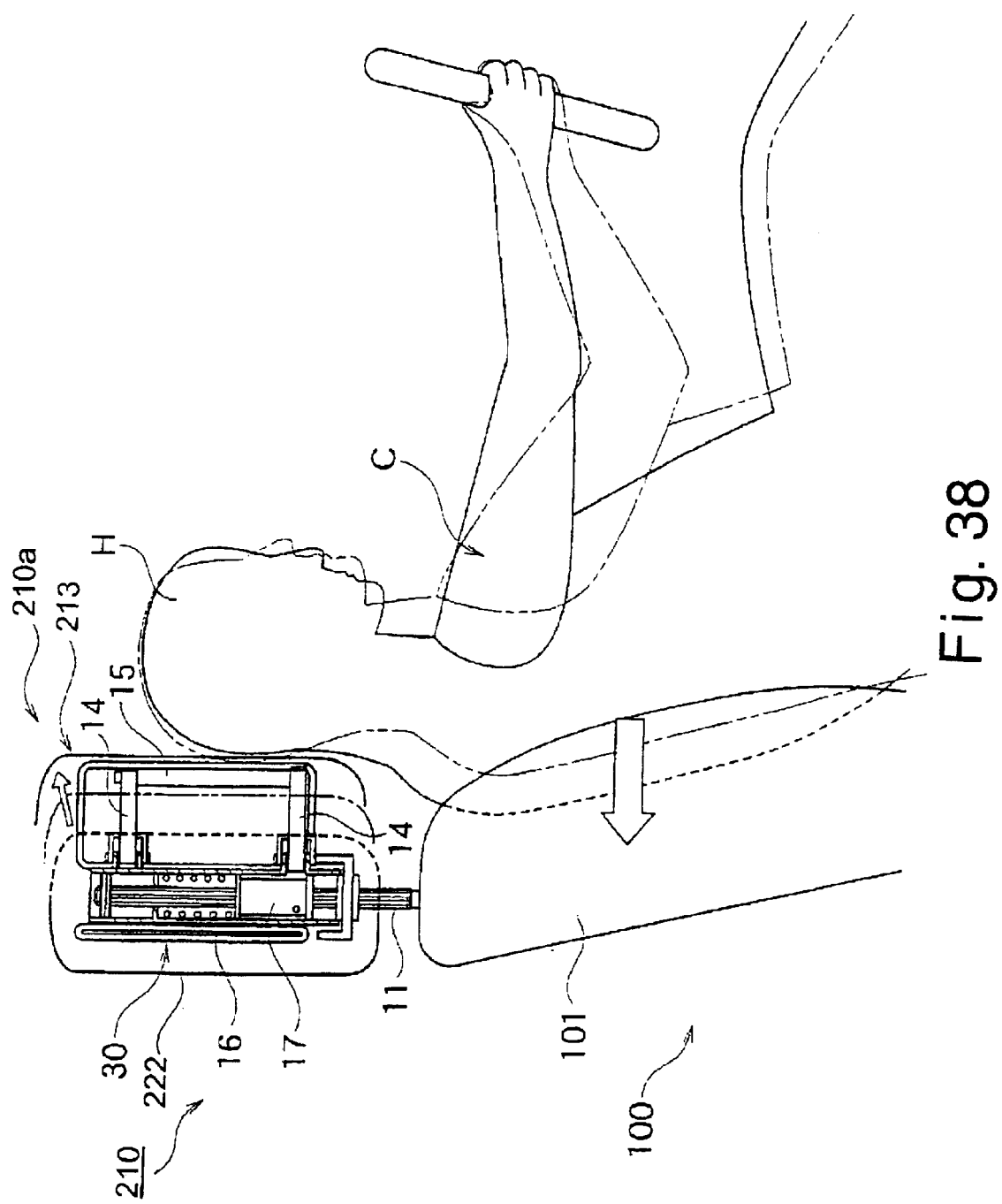
FIG. 38 is a simplified schematic side elevational view of the headrest unit of the fifth embodiment of the present invention showing the completely deployed state after a rear-end collision.
Figure 39:
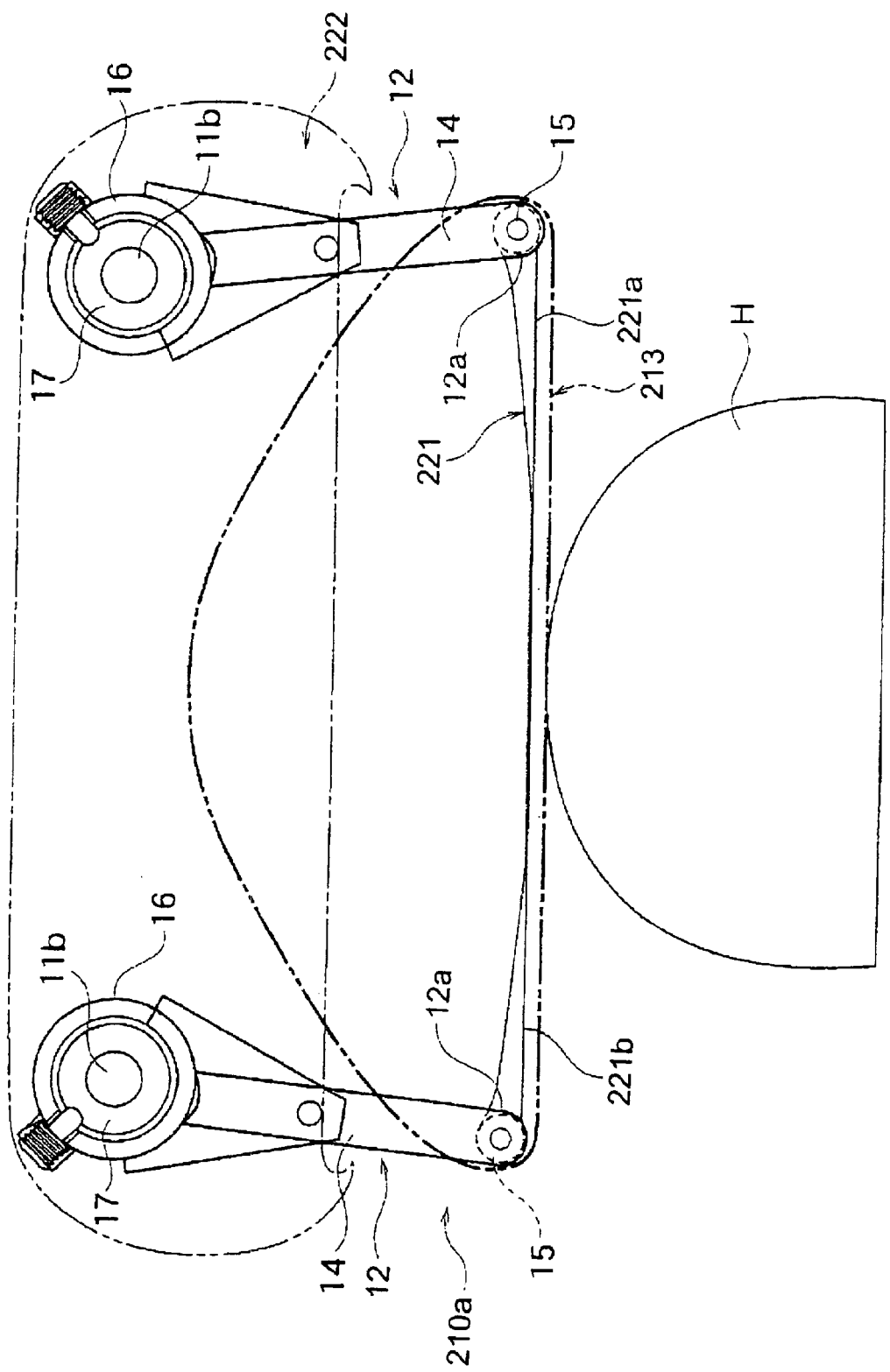
FIG. 39 is a simplified top plan view of the headrest unit (portions being transparent for purposes of illustration) of the first embodiment of the present invention in the completely deployed state after a rear-end collision.

When the lock device 240 is released, the swing force applying devices 30 move the left and right headrest members 12 through the partially deployed state shown in FIG. 37 and on to the forward-swung and raised-up state shown in FIGS. 35, 38, and 39.

When the left and right headrest members 12 swing forward, they spread and tension the sheet member 221 and also push the front cover 213 diagonally upward and forward. Thus, the head H of a seated passenger C can be restrained even more quickly against large rearward movement caused by inertia force when a rear-end collision occurs.

Since the front cover 213 that restrains the passenger's head H in the fifth embodiment is made of polycarbonate or other resilient material having an excellent shape-retaining property, the shape of the front cover 213 can be maintained regardless of the amount by which the left and right headrest members 12 are swung. As a result, the passenger's head H can be reliably and safely restrained even while the left and right headrest members 12 are still in the process of being deployed.

Also, since the front cover 213 is provided with both the vertical support potion 13a" and the horizontal sheet support potion 213b" for supporting the passenger's head H, the passenger's head H can be reliably restrained by the vertical sheet support potion 213a" when a rearward load acts thereon and the passenger's head H can be reliably restrained by the horizontal sheet support potion 213b" when the passenger's head H rides up the front cover 213 and is rotated rearward such that a downward load is generated.

Regarding the actuation of the left and right headrest members 12, the rear-end collision of the vehicle M is detected instead of the load fluctuation caused by the inertia of the seated passenger C and only the left and right headrest members 12 and the front cover 213 are deployed. As a result, the headrest unit 210a can be deployed and the head H of the seated passenger C can be restrained rapidly and reliably regardless of the weight or sitting posture of the passenger.

Since there is no need to provide the seatback 101 with a mechanism for detecting the load fluctuation of the seated passenger C, the seatback 101 can be designed without restrictions on its transverse width, height, or shape. The appropriate degree of comfort can be ensured and the weight of the seat itself can be reduced.

The front cover 213 is formed such that its overall shape is that of a gently curved three-dimensional surface in which a center portion of the vertical sheet support potion 213a" is concave in such a manner as to substantially follow the contour of the back of the passenger's head H and the peripheral edge portion thereof is curved smoothly rearward. As a result, the restraining performance with respect to the passenger's head H can be improved and the weight of the headrest unit 210a can be reduced because the wall thickness of the front cover 213 can be reduced due to increased rigidity.

The front part (which contacts the passenger's head H) of front cover 213 is a front cover outer skin 213' that is made of cloth provided with a backing of sponge or other buffer material and has an excellent deflection characteristic, and the rear part of the front cover is a front cover core material 213" that is made of polycarbonate and has an excellent load transmitting characteristic. The front cover core material 213", which serves as a high-rigidity layer, ensures excellent restraint of the passenger's head H and the front cover outer skin 213', which serves as a low-rigidity layer, alleviates the shock that occurs when the passenger's head H contacts the headrest.

A sheet member 221 is provided in back of the front cover core material 213" of the front cover 213 and is stretched between the division end parts of the left and right headrest members 12 when the headrest members are in the swung-forward state. In its tensioned state, the sheet member 221 can elastically support the front cover 213 and can therefore efficiently absorb the impact energy generated when the passenger's head H strikes the headrest.

Since the left and right headrest members 12 are provided with fastening mechanisms that hold the left and right headrest members 12 in line with the stays 11 when a rearward pressing force acts on the front cover 213, even if the passenger's head H strikes the front cover 213 while it is still in the process of being pushed forward in response to a rear-end collision, the front cover can be prevented from being pushed rearward and the passenger's head H can be protected.

The vehicle headrest apparatus 210 of this fifth embodiment of present invention is not limited to the structure discussed above. For example, the core portions of the front cover 213 and the back cover 222 were made of the polycarbonate in the previous embodiments, but it is also possible to use other materials having appropriate rigidity and strength (e.g., BBS and other engineering plastics).

Sixth Embodiment

Figure 40:
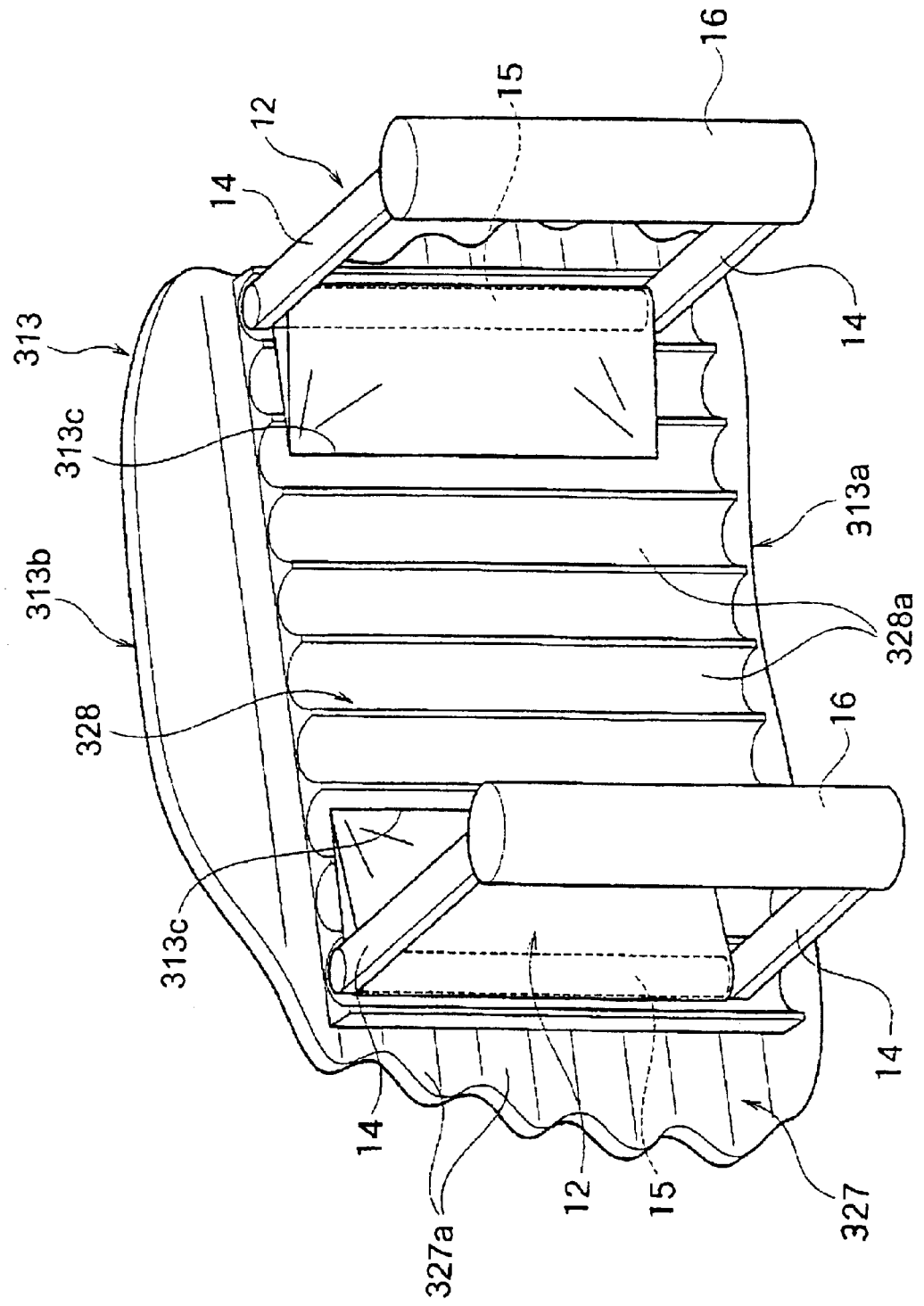
FIG. 40 is a simplified partial rear perspective view of a head restraining member in accordance with a sixth embodiment of the present invention.

Referring now to FIG. 40, a portion of a vehicle headrest apparatus in accordance with a sixth embodiment will now be explained. Basically, the headrest apparatus of this embodiment is identical to the headrest apparatus 210, as discussed above, except that a modified front cover core material 313 is used instead of the front cover core material 213" of the fifth embodiment. Thus, the front cover core material 313 replaces the front cover core material 213" of the headrest apparatus 210, discussed above. Accordingly, the front cover core material 313 is coupled to the sheet member 221 of the fifth embodiment. In view of the similarity between the fifth and sixth embodiments, the parts of the sixth embodiment that are identical to the parts of the fifth embodiment will be given the same reference numerals or symbols as the parts of the fifth embodiment. Moreover, many of the parts of the fifth embodiment that are used with the front cover core material 313 have been omitted from this sixth embodiment for the sake of brevity.

FIG. 40 is a rear perspective view of the front cover core material 313. The front cover core material 313 has a vertical sheet support potion 313a (only part shown) and a horizontal portion 313b (only part shown). In the sixth embodiment, the vertical sheet support potion 313a of the front cover core material 313 is provided with a horizontally undulated part 327 having a plurality of horizontal undulations 327a that run in the transverse direction. To the rear of the horizontally undulated part 327 is a vertically undulated part 328 having a plurality of vertical undulates 328a that run in up and down.

Similarly to the previous embodiment, the front cover core material 313 of the sixth embodiment has two slits 313c that open through the horizontally undulated part 327 and the vertically undulated part 328 and serve as passages for the sheet-like body 221 to pass through.

Thus, with the sixth embodiment, the bending rigidity of the front cover 213 can be increased by the frontally positioned horizontally undulated part 327 and increased still further by providing the vertically undulated part 328 to the rear thereof. As a result, the restraining performance with respect to the passenger's head H can be increased and the wall thickness of the front cover can be decreased, thus allowing the weight to be reduced.

Seventh Embodiment

Figure 41:
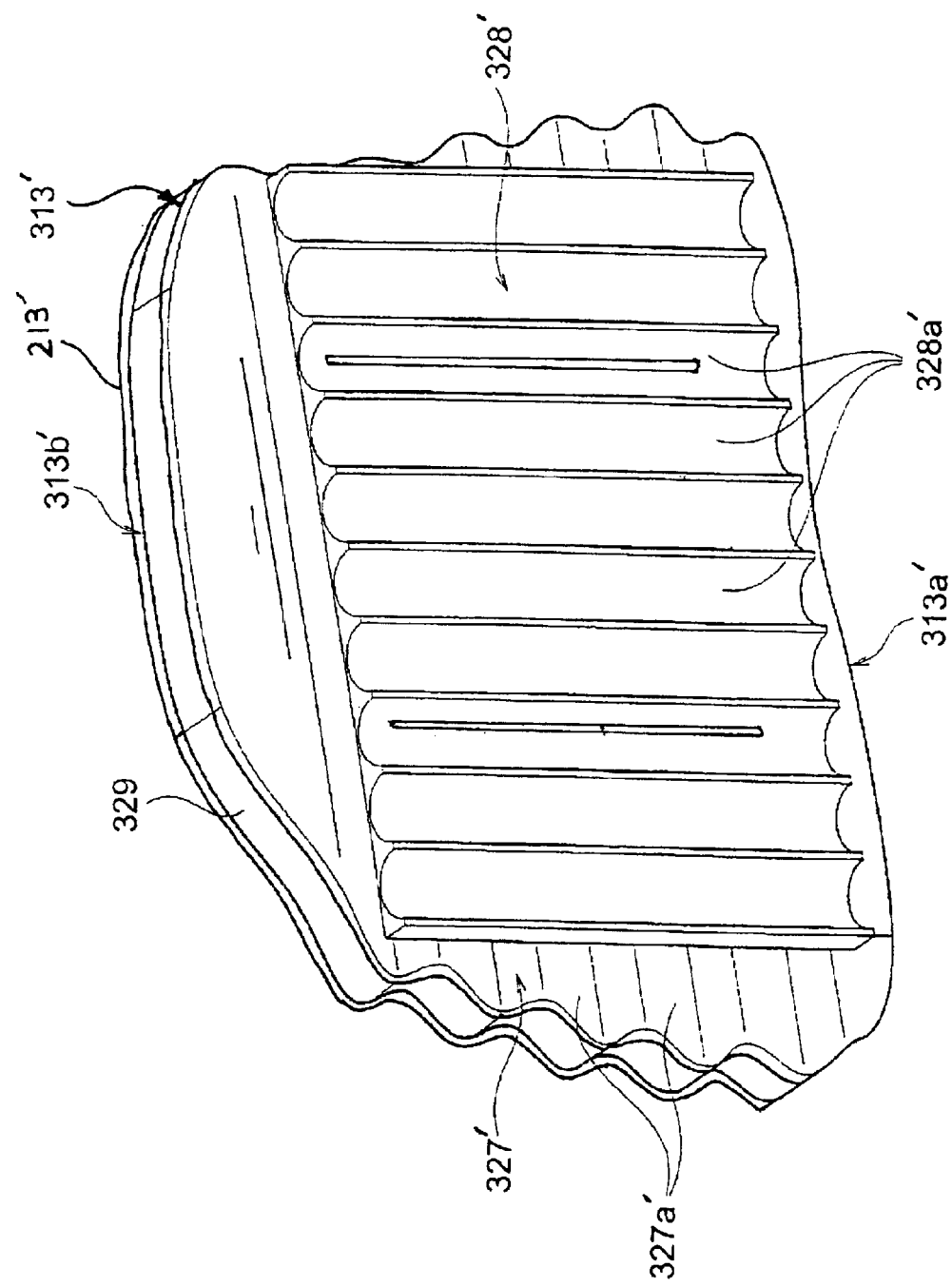
FIG. 41 is a simplified partial rear perspective view of a head restraining member in accordance with a seventh embodiment of the present invention.

Referring now to FIG. 41, a portion of modified front cover 313' for a vehicle headrest apparatus in accordance with a seventh embodiment will now be explained. Basically, the front cover 313' replaces the front cover core material 213" of the headrest apparatus 210, discussed above. Thus, the front cover core material 313' is coupled to the sheet member 221 of the fifth embodiment. In view of the similarity between the fifth and seventh embodiments, the parts of the fifth embodiment that are used with the front cover core material 313' have been omitted from this seventh embodiment for the sake of brevity.

FIG. 41 is a rear perspective view of a portion of the front cover core material 313'. The front cover core material 313' has a vertical sheet support potion 313a' (only part shown) and a horizontal portion 313b' (only part shown). In the seventh embodiment, the vertical sheet support potion 313a' of the front cover core material 313' is provided with a horizontally undulated part 327' having a plurality of horizontal undulations 327a' that run in the transverse direction. To the rear of the horizontally undulated part 327' is a vertically undulated part 328' having a plurality of vertical undulates 328a' that run in up and down. In the seventh embodiment, the front cover outer skin 213' from the fifth embodiment overlies the front face of the front cover core material 313'. The front cover outer skin 213' serves as a low-rigidity layer, which is preferably made of thin-walled polycarbonate having certain degree of rigidity. The front cover core material 313' serves as a high-rigidity layer relative to the front cover outer skin 213. The front cover core material 313' is also made of thin-walled polycarbonate. A lightweight foam material 329, e.g., styrene foam, is disposed between the front cover outer skin 213' and the front cover core material 313' as a lightweight buffer layer.

Thus, with the fourth embodiment, the front cover core material 313' is provided with both increased rigidity and a lighter weight by disposing a lightweight foam material 329 between the front cover outer skin 213' and the front cover core material 313'.

Eighth Embodiment

Figure 42:
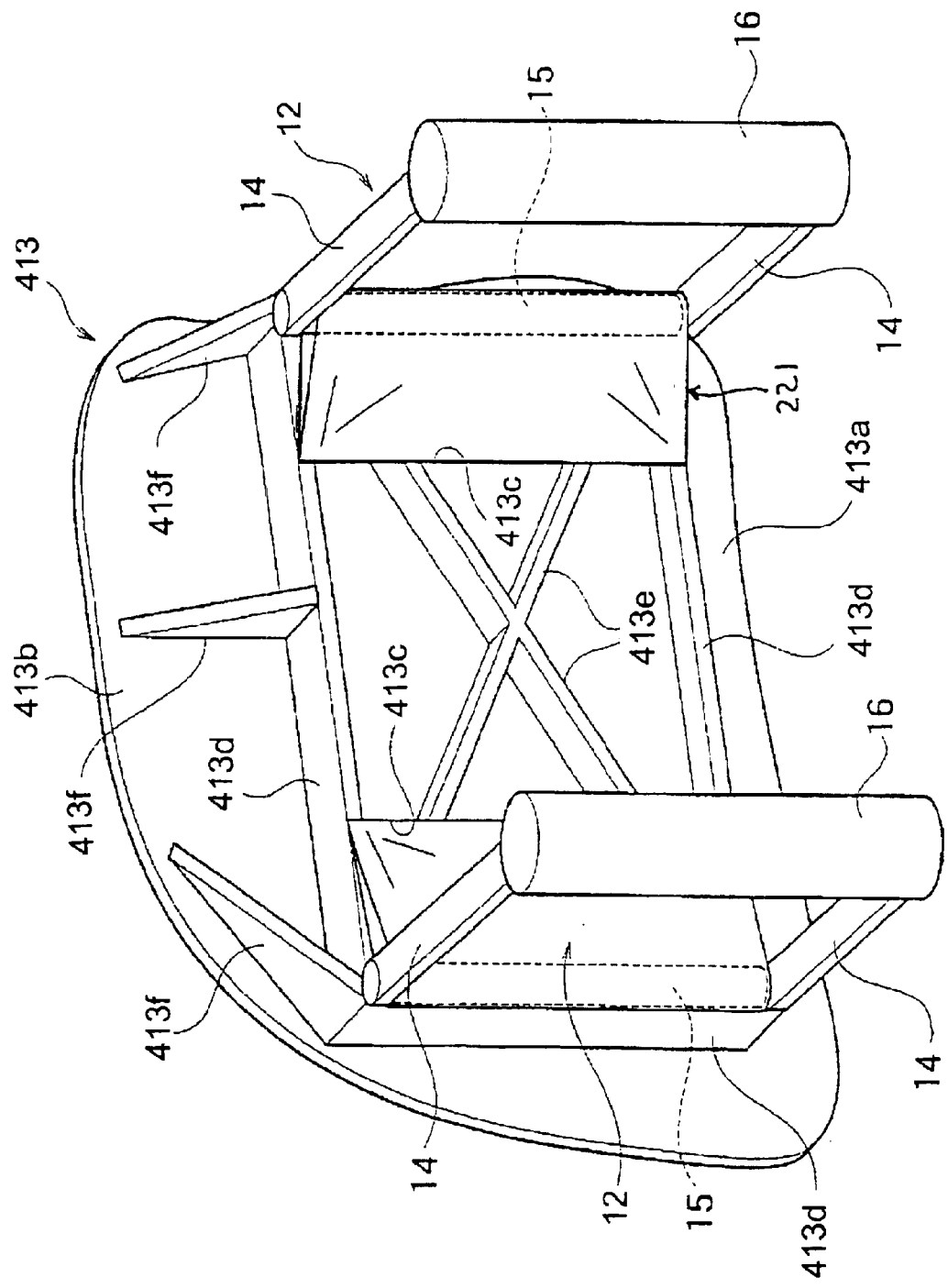
FIG. 42 is a simplified rear perspective view of a head restraining member in accordance with an eighth embodiment of the present invention.

Referring now to FIG. 42, a portion of a vehicle headrest apparatus in accordance with an eighth embodiment will now be explained. Basically, the headrest apparatus of this embodiment is identical to the headrest apparatus 210, as discussed above, except that a modified front cover core material 413 is used instead of the front cover core material 213" of the fifth embodiment. Thus, the front cover core material 413 replaces the front cover core material 213" of the headrest apparatus 210, discussed above. Accordingly, the front cover core material 413 is coupled to the sheet member 221 of the fifth embodiment. In view of the similarity between the fifth and eighth embodiments, the parts of the eighth embodiment that are identical to the parts of the fifth embodiment will be given the same reference numerals or symbols as the parts of the fifth embodiment. Moreover, many of the parts of the fifth embodiment that are used with the front cover core material 413 have been omitted from this eighth embodiment for the sake of brevity.

FIG. 42 is a rear perspective view of the front cover core material 413. The front cover core material 413 has a vertical sheet support potion 413a (only part shown) and a horizontal portion 413b (only part shown). The vertical sheet support potion 413a has a pair of slits 413c. In the eighth embodiment, a plurality of reinforcing ribs 413d, 413e and 413f are provided on the rear side of the vertical sheet support potion 413a of the front cover core material 413. In particular, the ribs 413d enclose the back face of the vertical leaf portion 413a of the front cover core material 413 in a rectangular form. The ribs 413e run diagonally between diagonally opposite corners of the rectangular ribs 413d. The upper ribs 413f are provided so as to run along the horizontal leaf portion 413b of the front cover core material 413 from the top side of the rectangular ribs 413d. Thus, with ribs 413d, 413e and 413f, the eighth embodiment can increase the bending rigidity of the front cover core material 413 and reduce the weight of the front cover core material 413 by reducing the wall thickness thereof.

The slits 413c cut through the diagonal ribs 413e and receive the sheet member 221 of the fifth embodiment.

Ninth Embodiment

Figure 43:
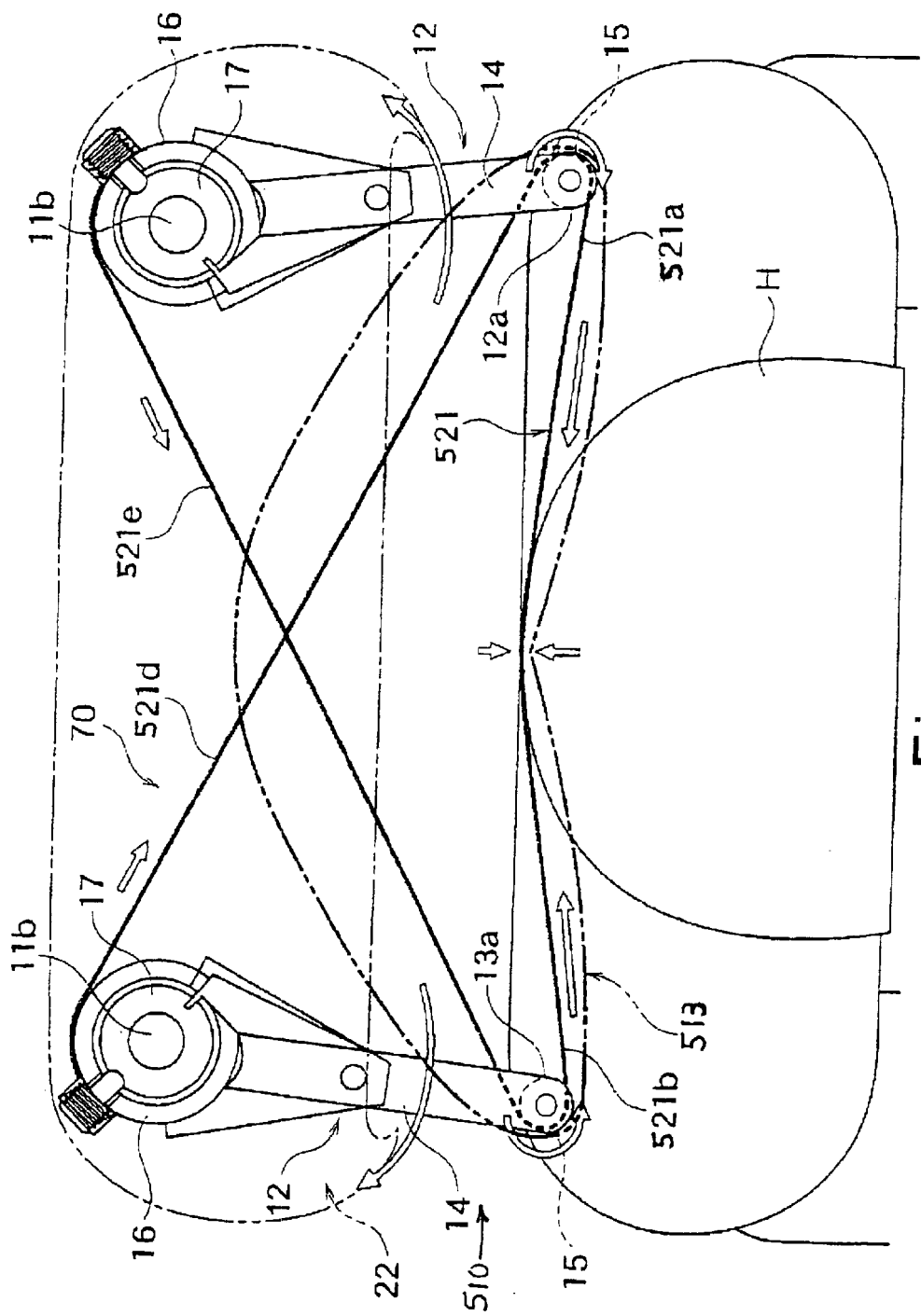
FIG. 43 is a simplified top plan view of a headrest unit (portions being transparent for purposes of illustration) in accordance with a ninth embodiment of the present invention.

Referring now to FIG. 43, a vehicle headrest apparatus 510 in accordance with a ninth embodiment will now be explained. FIG. 43 is a top cross-sectional view of the headrest unit. Basically, the headrest apparatus 510 of this embodiment is identical to the headrest apparatus 210, as discussed above, except that a tension increasing mechanism 580 has been added that is like the one shown in the third embodiment. In other words, the front cover 513 is identical to cover 213, except that the sheet member 521 includes a tension increasing mechanism 580 that converts a pressing force of a passenger's head H acting on the front cover 513 into a tensile force in the sheet member 521. In view of the similarity between the ninth embodiment and the third and fifth embodiments, the parts of the ninth embodiment that are identical to the parts of the third and fifth embodiments will be given the same reference numerals or symbols as the parts of the third and fifth embodiments. Moreover, many of the parts of the ninth embodiment that are shown in the third and fifth embodiments have been omitted from this ninth embodiment for the sake of brevity.

The sheet member 521 of the ninth embodiment has a pair of end parts 521a and 521b and a pair of extended sheet portions 521d and 521e. While the sheet member 221 of the fifth embodiment was loop-shaped, the sheet member 521 of the ninth embodiment is formed into a tension increasing mechanism 580 by first severing a center part of each loop-shaped rear section and extending the same. The extended sheet portions 521d and 521e are then crossed over each other and fixed to the respective diagonally opposite outer cylinders 16 so as to wrap around the rear portion of the outer cylinders 16.

Regarding the intersection of the extended sheet portions 521d and 521e, it is preferred to provide the extended sheet portions 521d and 521e in the form of a plurality of strips arranged alternately such that the pluralities of sheets constituting the extended sheet portions 521d and 521e intersect with one another in an alternating manner.

Thus, with the ninth embodiment, when a rear-end collision occurs and inertial forces cause the passenger's head H to exert a rearward pressing force that deflects the front cover 513 rearward and acts on the sheet member 521, the extended sheet portions 521d and 521e are pulled due to the tensioning of the front part of the sheet member 521.

The pulling forces of the extended sheet portions 521d and 521e act on the outer cylinders 16 and cause the left and right headrest members 12 to be swing further open. As a result, the tension in the front part of the sheet member 521 is increased. In fact, the larger the rearward pressing force of the passenger's head H is, the larger this tension becomes. Consequently, even if the impact force of the rear-end collision is large and the rearward inertial force acting on the passenger's head H is considerably large, the sheet member 521 will be tensioned with a large tensile force and the passenger's head H can be reliably restrained.

Tenth Embodiment

Figure 44:
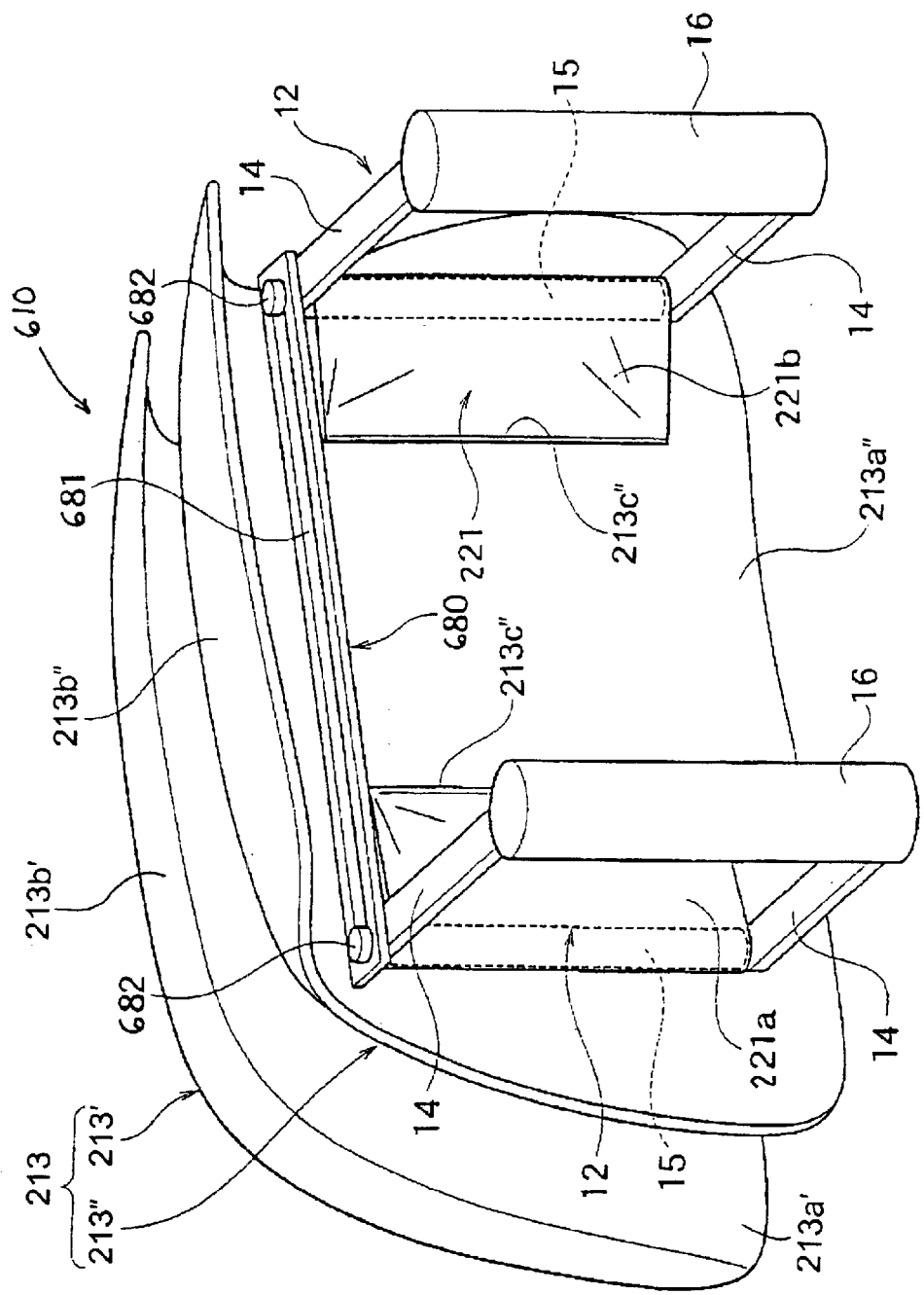
FIG. 44 is a simplified rear perspective view of left and right headrest members in accordance with a tenth embodiment of the present invention.
Figure 45:
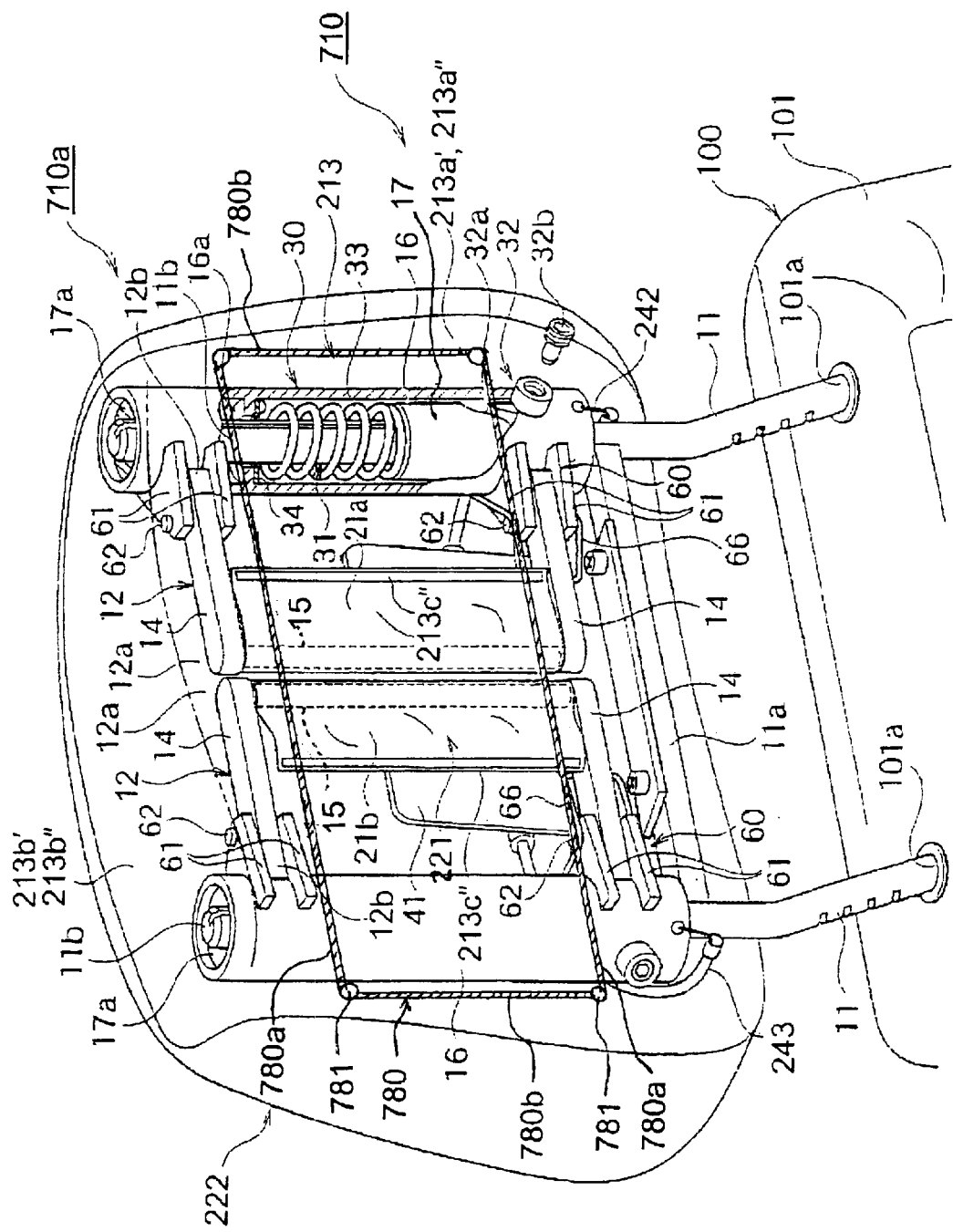
FIG. 45 is a front perspective view of the headrest unit (portions being transparent for purposes of illustration) of an eleventh embodiment of the present invention in an undeployed state.
Figure 46:
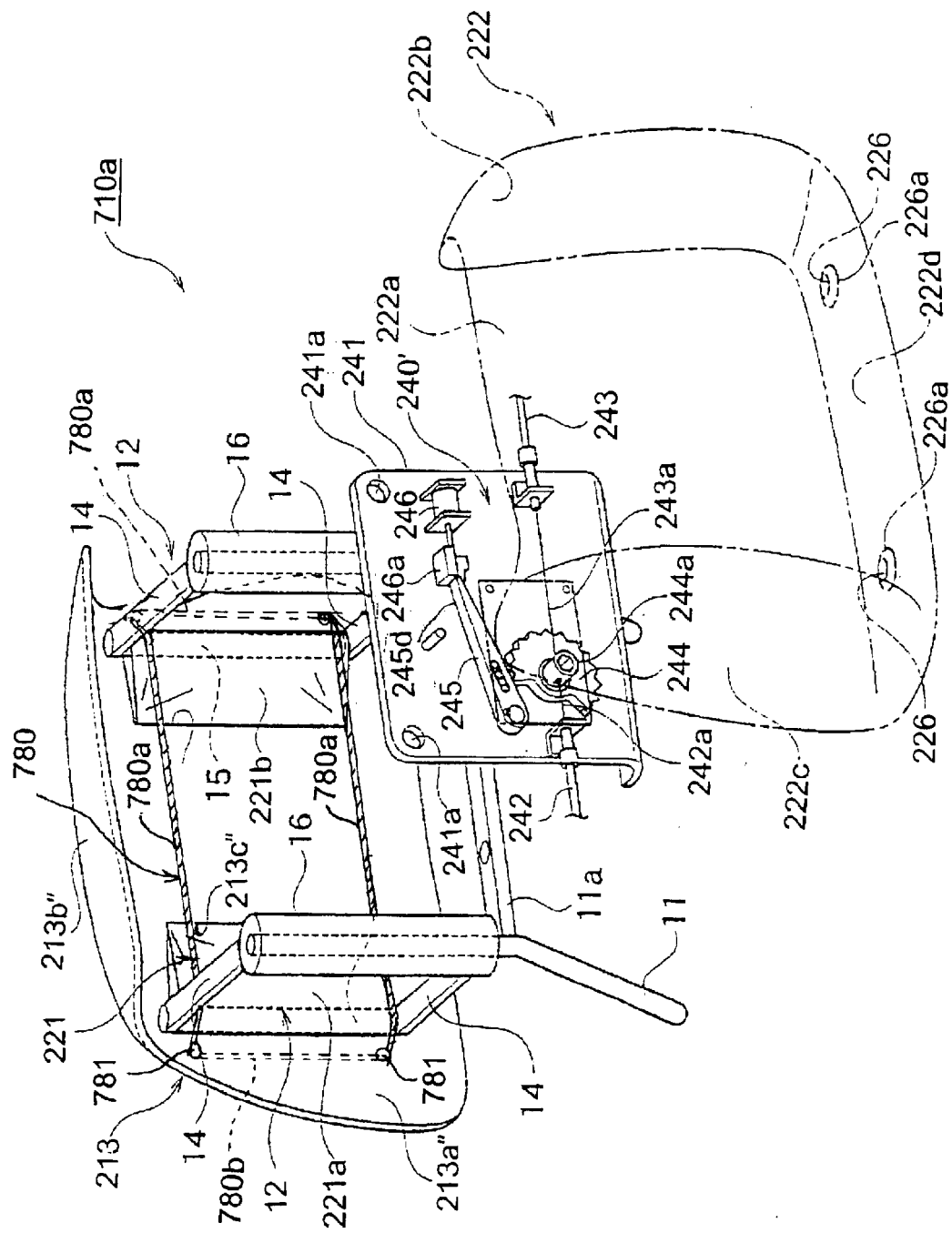
FIG. 46 is a simplified exploded rear perspective view of the headrest unit of the eleventh embodiment of the present invention in the completely deployed state with the selected components and parts removed for purposes of illustration.
Figure 47:
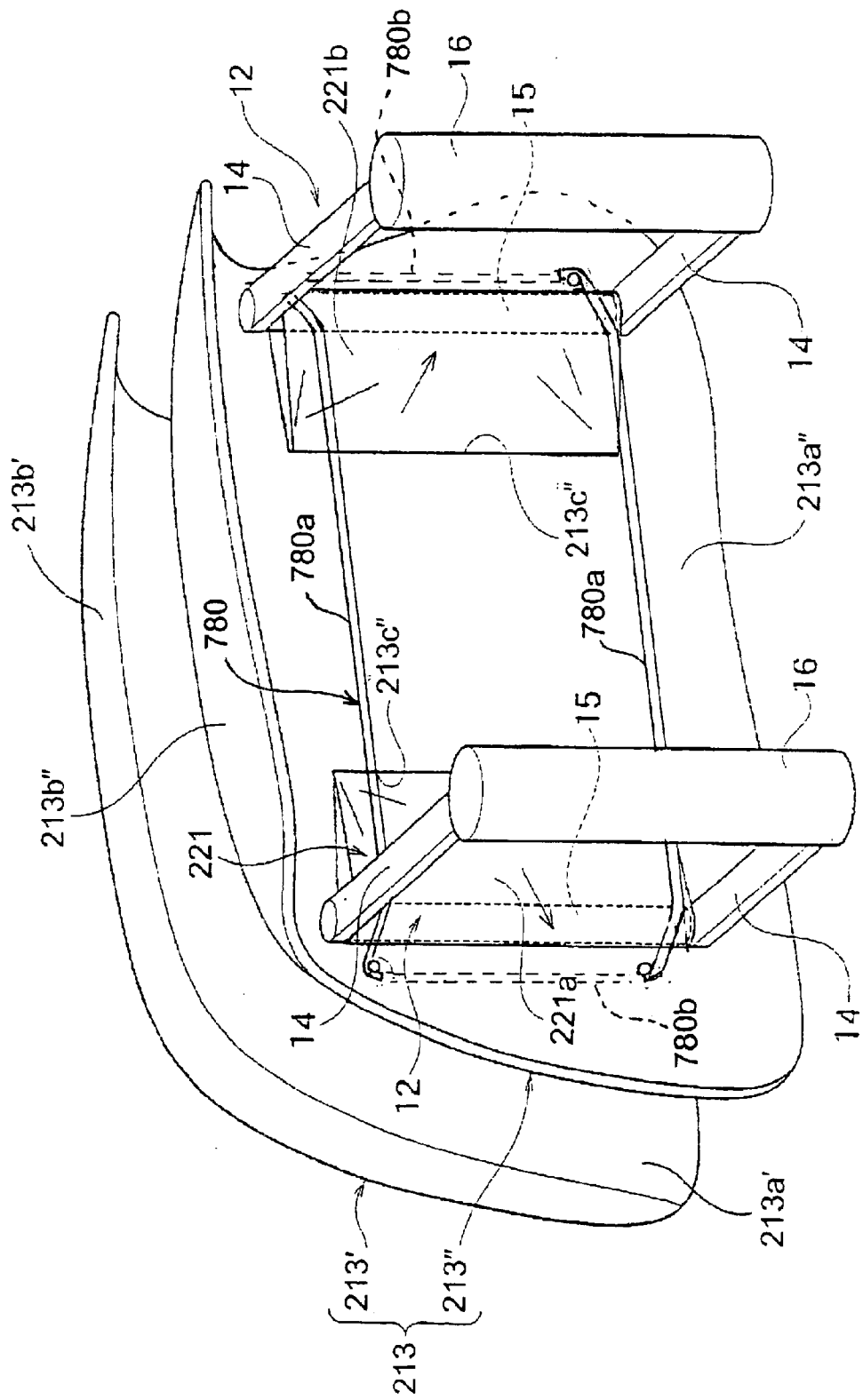
FIG. 47 is a simplified exploded rear perspective view of the cushion pad and the head restraining member in the extended state in accordance with the eleventh embodiment of the present invention on the left and right headrest members after deployment.

Referring now to FIG. 44, a vehicle headrest apparatus 610 in accordance with a tenth embodiment will now be explained. Basically, the headrest apparatus 610 of this embodiment is identical to the headrest apparatus 210, as discussed above, except that a slider 680 that serves as a swing regulating member. In view of the similarity between the fifth and tenth embodiments, the parts of the tenth embodiment that are identical to the parts of the fifth embodiment will be given the same reference numerals or symbols as the parts of the fifth embodiment. Moreover, many of the parts of the tenth embodiment that are shown in the fifth embodiment have been omitted from this ninth embodiment for the sake of brevity.

FIG. 44 is a rear perspective view of the left and right headrest members 12. In the tenth embodiment, the slider 680 that serves as a swing regulating member is arranged between the upper horizontal frame members 14 of the left and right headrest members 12. This slider 680 serves to fix the maximum swing positions of the left and right headrest members 12. The slider 680 comprises a long narrow plate having a slit 681 that runs uninterruptedly along the centerline thereof. Two guide pins 682 are installed into the top side of the tip end parts (i.e., the ends corresponding to the division end parts 12a of the headrest members 12) of the horizontal frame members 14 of the left and right headrest members 12. The guide pins 682 slide freely inside the slit 681.

The length of the slit 681 is set such that the guide pins 682 abut against the ends of the slit 681 at the maximum swing positions of the left and right headrest members 12, as shown in FIG. 44. Thus, with the tenth embodiment, when the left and right headrest members 12 are swung to the maximum swing position, the guide pins 681 abut against the end of the slit 681 of the slider 680 and prevent the left and right headrest members 12 from opening any further.

As a result, when a rear-end collision causes the passenger's head H to strike the front cover 213 and exert an extremely large rearward pressing force, the swing positions of the left and right headrest members 12 are fixed securely and the restraining performance with respect to the passenger's head H can be increased.

Eleventh Embodiment

Referring now to FIGS. 45–49, a vehicle headrest apparatus 710 in accordance with an eleventh embodiment will now be explained. Basically, the headrest apparatus 710 of this embodiment is identical to the headrest apparatus 210, as discussed above, except that a front cover retaining device or member has been added in the headrest apparatus 710. In view of the similarity between the fifth and eleventh embodiments, the parts of the eleventh embodiment that are identical to the parts of the fifth embodiment will be given the same reference numerals or symbols as the parts of the fifth embodiment. Moreover, many of the parts of the eleventh embodiment that are shown in the fifth embodiment have been omitted from this eleventh embodiment for the sake of brevity.

The vehicle headrest apparatus 710 basically comprises a headrest portion or unit 710a that includes the front cover 213 with the integrated head restraining member of the fifth embodiment, plus a front cover retaining member 780. As mentioned previously herein, the front cover 213 is a multilayered structure that is obtained by bonding the front cover outer skin or layer 213' and the front cover core material or layer 213" together as an integral unit. The front cover core material or layer 213" acts as a high-rigidity rear layer having an excellent load transmitting characteristic, while the front cover outer skin or layer 213' is preferably made of cloth material provided with a backing of sponge or other buffer material that is resiliently compressible.

The front cover 213, in this embodiment, also functions as a head restraining member as explained previously herein. The headrest unit 210a uses the frame members 14 and 15, and the swing force applying devices 30 of the first embodiment.

Figure 48:
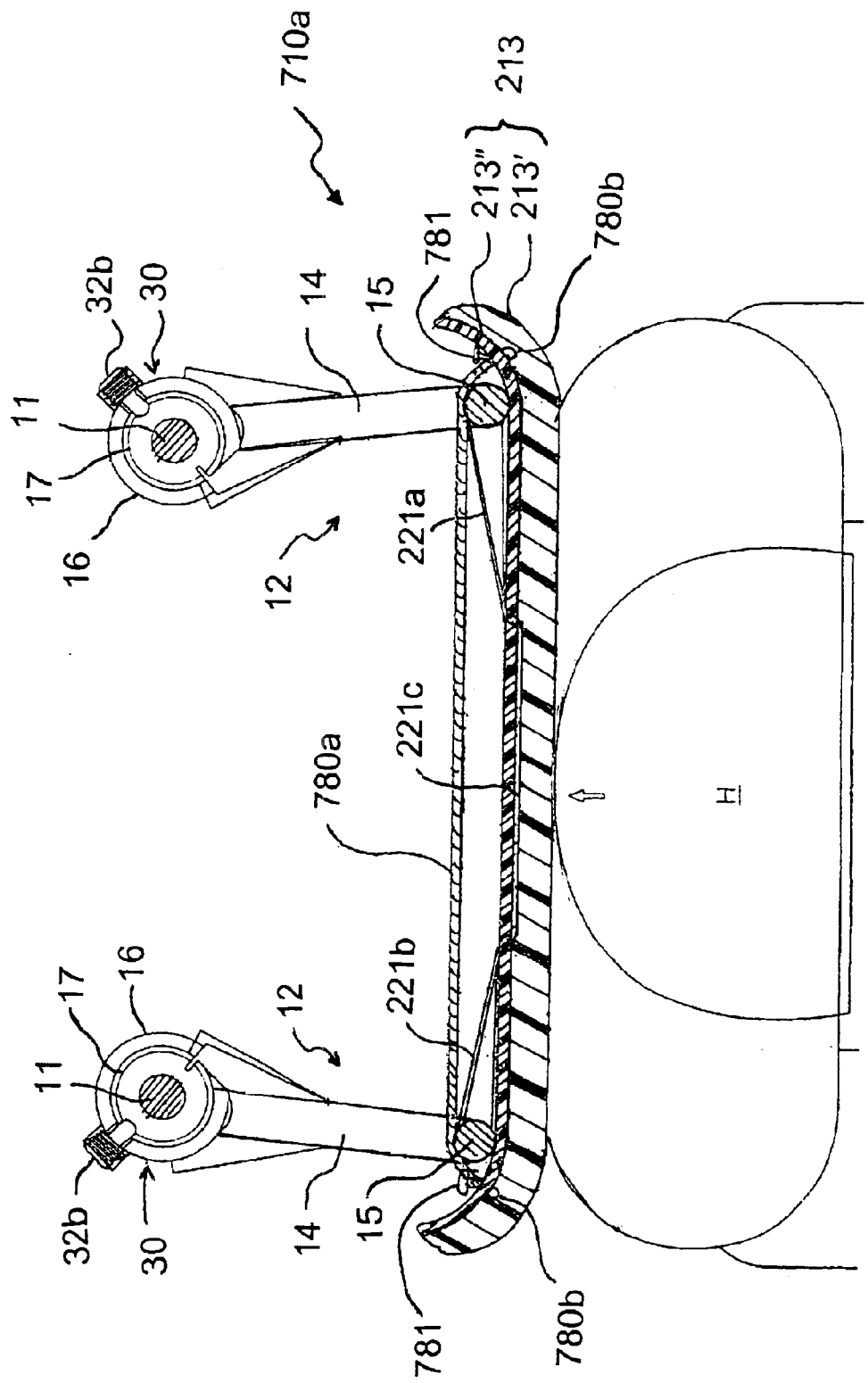
FIG. 48 is a simplified transverse cross-sectional view of the headrest unit of the eleventh embodiment of the present invention in the completely deployed state, but prior to the load of the passenger's head being pressed against the cushion pad.
Figure 49:
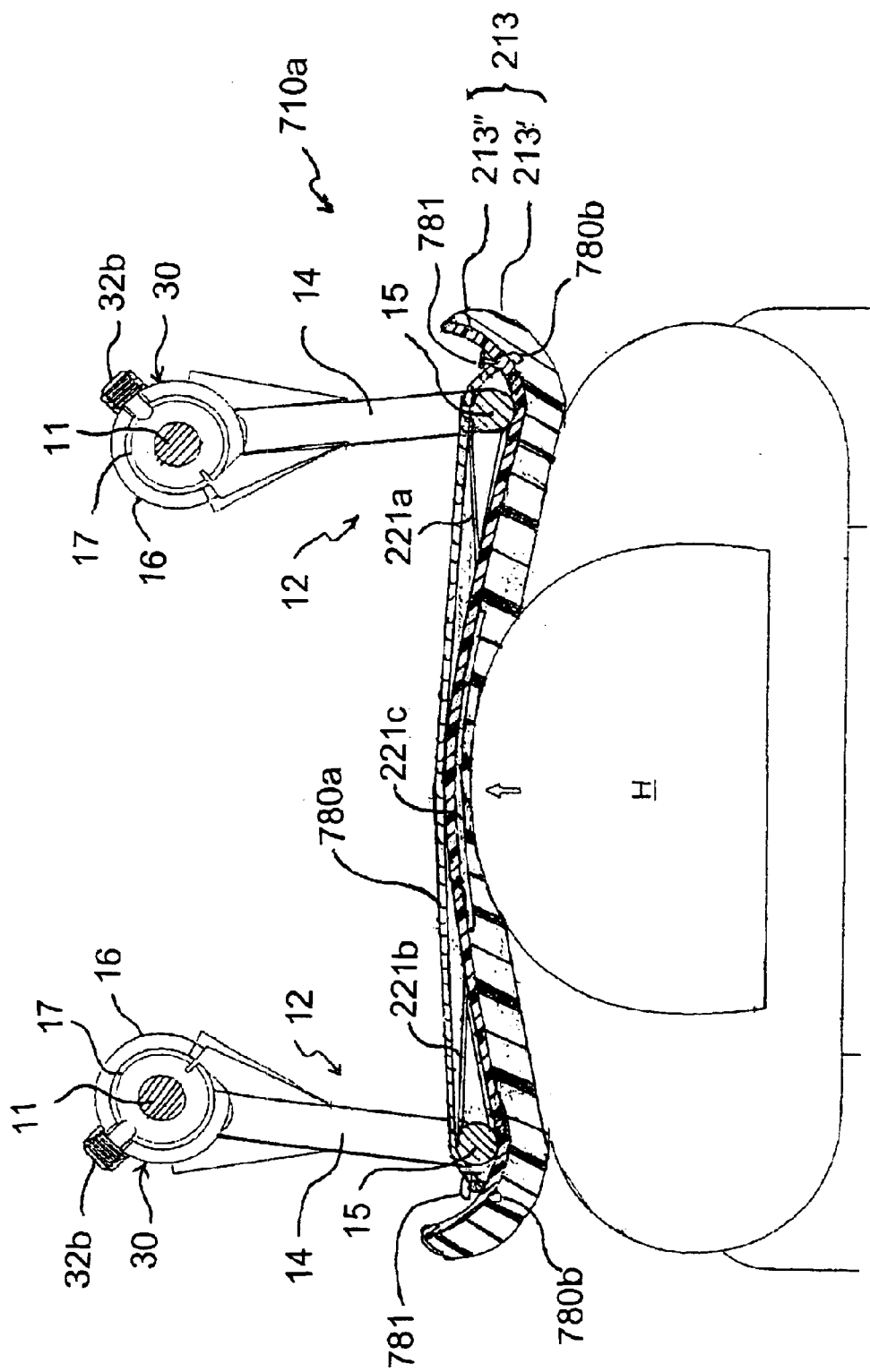
FIG. 49 is a simplified transverse cross-sectional view of the headrest unit of the eleventh embodiment of the present invention in the completely deployed state after the load of the passenger's head has been delivered against the cushion pads.
Figure 50:
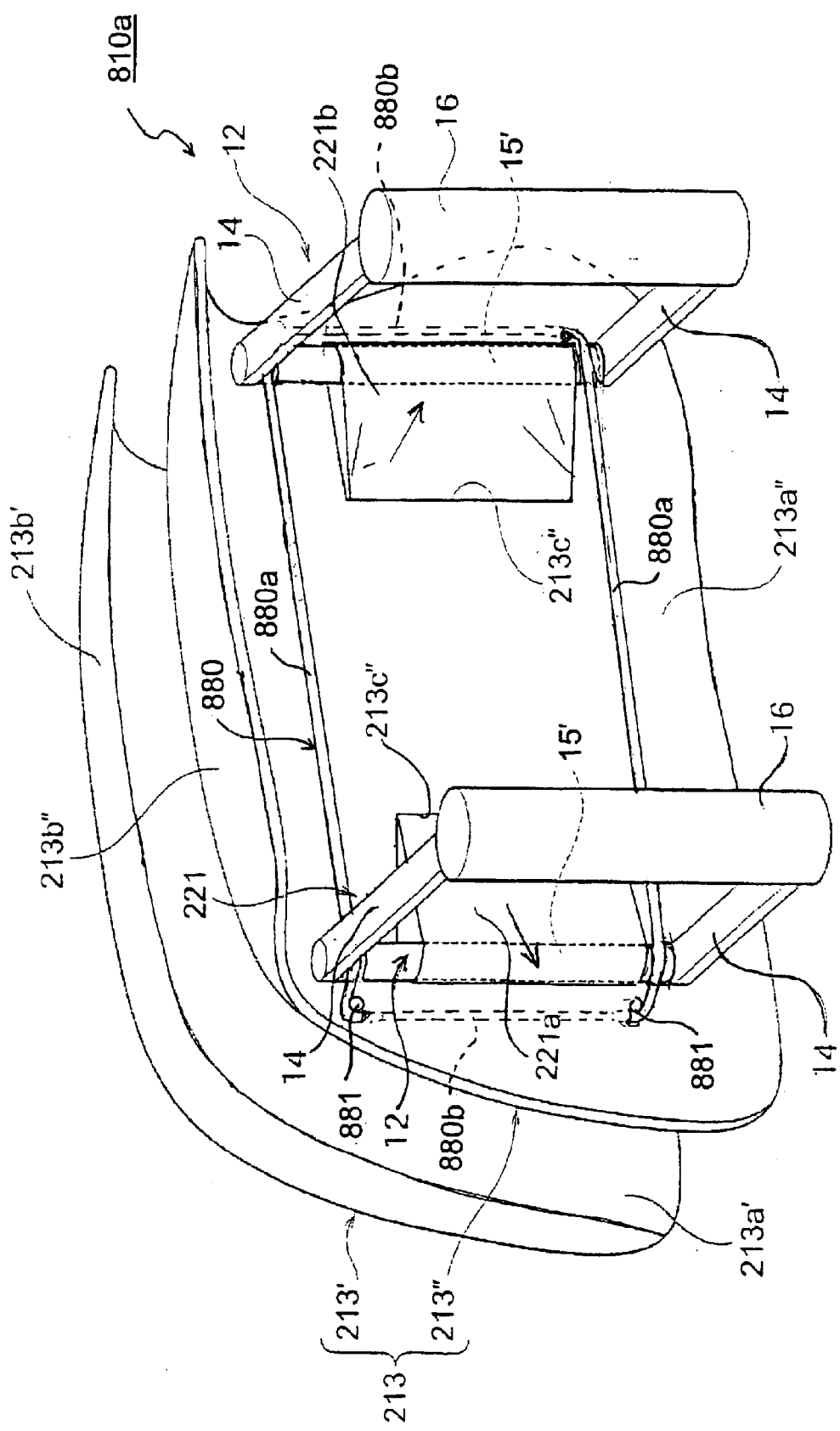
FIG. 50 is a simplified rear perspective view of the cushion pad and selected parts of the head restraining member in the extended state in accordance with a twelfth embodiment of the present invention.
Figure 52:
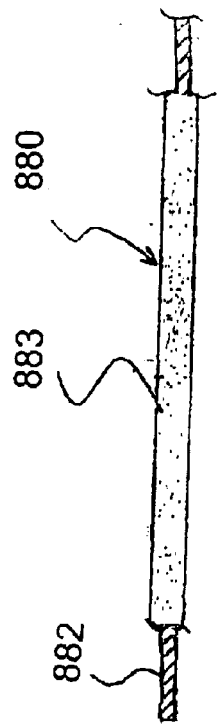
FIG. 52 is a partial enlarged elevational view of a portion of the retaining element of the cushion pad for the head restraining member in an unstressed state in accordance with the twelfth embodiment of the present invention.
Figure 53:
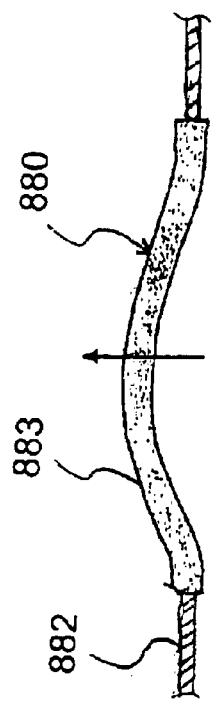
FIG. 53 is a partial enlarged elevational view of the portion of the retaining element illustrated in FIG. 52 in a stressed state in accordance with the twelfth embodiment of the present invention.
Figure 51:
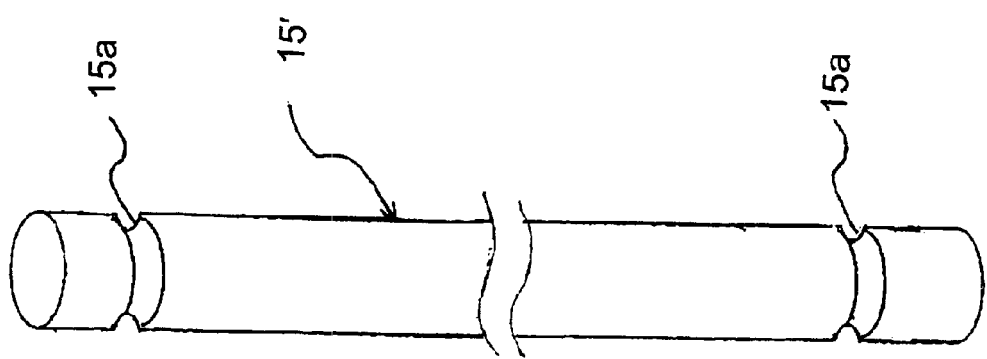
FIG. 51 is an enlarged perspective view of one of the vertical frame members of the tensioning member for the head restraining member in accordance with the twelfth embodiment of the present invention.

In the illustrated embodiment, the front cover retaining member 780 is a wire that is fixedly coupled to the front cover core material or layer 213" of the front cover 213. The front cover retaining member 780 is preferably made of a material having a high tensile strength such as a metal stranded wire. The front cover retaining member 780 extends along the front cover core material or layer 213" of the front cover 213 to limit excessive bending of the front cover core material or layer 213" of the front cover 213. As a result, the wire tension in the front cover retaining member 780 reduces shock to a passenger's head when the passenger's head presses against the front cover 213 as illustrated in FIGS. 48 and 49.

The front cover retaining member 780 is configured to form a loop wire that is supported at each corner by four pins 781 which are fixed to the front cover core material or layer 213" of the front cover 213. Thus, the loop wire of the front cover retaining member 780 is arranged to form a pair of horizontal retaining elements or wire portions 780a extending horizontally across the rearwardly facing surface of the front cover core material or layer 213", and a pair of vertical retaining elements or wire portions 780b extending vertically across the forwardly facing surface of the front cover core material or layer 213". Accordingly, the vertical retaining elements or wire portions 780b are located between the front cover outer skin or layer 213' and the front cover core material or layer 213".

The horizontal retaining elements or wire portions 780a also extend across the frame members 15 to operatively couple the front cover core material or layer 213" of the front cover 213 to the tensioning device of the headrest portion or unit 710a.

Similar to the prior embodiments, the head restraining member of headrest portion or unit 710a is deployed by the swing force applying device 30 when the lock device 240 is released by the controller 54 upon detecting a rear-end collision as previously discussed.

Twelfth Embodiment

Referring now to FIGS. 50–53, a headrest portion or unit 810a in accordance with a twelfth embodiment will now be explained. Basically, the headrest portion or unit 810a of this embodiment is identical to the headrest portion or unit 710a, as discussed above, except for modifications to the front cover retaining device. In view of the similarity between the eleventh embodiment, which is a modified version of fifth embodiment, and the twelfth embodiment, the parts of the twelfth embodiment that are identical to the parts of the fifth embodiment will be given the same reference numerals or symbols as the parts of the fifth embodiment. Moreover, many of the parts of the twelfth embodiment that are shown in the fifth embodiment have been omitted from this twelfth embodiment for the sake of brevity.

The headrest portion or unit 810a includes the front cover 213 with the integrated head restraining member of the fifth embodiment, plus a front cover retaining member 880. The front cover 213 is a multilayered structure that is obtained by bonding the front cover outer skin or layer 213' and the front cover core material or layer 213" together as an integral unit. The front cover core material or layer 213" acts as a high-rigidity rear layer having an excellent load transmitting characteristic, while the front cover outer skin or layer 213' is preferably made of cloth material provided with a backing of sponge or other buffer material that is resiliently compressible.

In the illustrated embodiment, the front cover retaining member 880 is fixedly coupled to the front cover core material or layer 213" of the front cover 213. The front cover retaining member 880 extends along the front cover core material or layer 213" of the front cover 213 to limit excessive bending of the front cover core material or layer 213" of the front cover 213. In this embodiment, the The front cover retaining member 880 is configured to form a loop wire that is supported at each corner by four pins 881 which are fixed to the front cover core material or layer 213" of the front cover 213. Thus, the loop wire of the front cover retaining member 880 is arranged to form a pair of horizontal retaining elements or wire portions 880a extending horizontally across the rearwardly facing surface of the front cover core material or layer 213", and a pair of vertical retaining elements or wire portions 880b extending vertically across the forwardly facing surface of the front cover core material or layer 213". Accordingly, the vertical retaining elements or wire portions 880b are located between the front cover outer skin or layer 213' and the front cover core material or layer 213".

In this embodiment, the front cover retaining member 880 is formed by an inner wire 882 with a pair of outer hollow tubes 883 located on the horizontal retaining elements or wire portions 880a. Preferably, the entire length of the horizontal retaining elements or wire portions 880a are covered by the outer hollow tubes 883. The vertical retaining elements or wire portions 880b are not covered by the outer hollow tubes 883.

The outer hollow tubes 883 are preferably made of a material having a low coefficient of friction such as Teflon®.

The inner wire 882 is preferably made of a material having a high tensile strength such as a metal stranded wire. Preferably, the upper and lower horizontal retaining elements or wire portions 880a are stretch in the transverse direction and then wrapped by the outer hollow tubes 883. In this arrangement, the inner wire 882 can freely slide within the outer hollow tubes 883, when the front cover 213 is deformed rearwardly by a passenger's head.

In this embodiment, each of the headrest members 12 comprises a pair of the horizontal frame members 14 fixedly coupled to a modified vertical frame member 15' to form a rigid U-shaped tensioning member that is pivotally mounted to the outer cylinder 16. In other words, the left and right headrest members 12 each have a generally rectangular frame portion that comprises the following: the outer cylinder 16 that forms the shell of the swing force applying device 30; the upper and lower horizontal members 14 that extend horizontally from the upper and lower end parts of the outer cylinder 16; and the vertical member 15' that joins the upper and lower horizontal members 14 together at the ends that are closer to the free end parts 12a. The rigid U-shaped tensioning members hold the flexible sheet member 221 in the folded state when in the retracted storage position, and in the expanded state when in the extended deployed position. The frame members 14 and 15' serve as the tension applying device or member.

The horizontal retaining elements or wire portions 880a also extend across the frame members 15' to operatively couple the front cover core material or layer 213" of the front cover 213 to the tensioning device of the headrest portion or unit 810a. Each of the frame members 15' has a groove 15a to guide the front cover retaining member 880 on each end. With this structure, the front cover 213 does not move up and down on the frame members 15' because the front cover retaining member 880 fixes the front cover 213 to the frame members 15' by the grooves 15a, even when a passenger's head contacts the front cover 213. Furthermore, the shock can be dispersed across the entire cover because the outer hollow tubes 883 are used to reduce the friction with the inner wire 882 and relative displacement between the frame members 15' and the inner wire 882 becomes possible.

Similar to the prior embodiments, the head restraining member of headrest portion or unit 710a is deployed by the swing force applying device 30 when the lock device 240 is released by the controller 54 upon detecting a rear-end collision as previously discussed.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% to ±10% of the modified term if this deviation would not negate the meaning of the word it modifies.

This application claims priority to Japanese Patent Application Nos. 2002-186689 and 2002-332715. The entire disclosures of Japanese Patent Application Nos. 2002-186689 and 2002-332715 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle headrest apparatus comprising:
   a headrest portion with a mounting member configured to be mounted to an upper end part of a seatback;
   a head restraining member including a vertical support portion arranged to face towards a passenger's head and a horizontal support portion arranged substantially perpendicular to the vertical support portion; and
   a tensioning device operatively coupled to the head restraining member to apply tension to at least part of the vertical support portion when a rear-end collision occurs.

2. The vehicle headrest apparatus as recited in claim 1, further comprising
   a deployment mechanism operatively coupled to the head restraining member to deploy the head restraining member forwardly from a storage position to a deployed position when a rear-end collision occurs.

3. The vehicle headrest apparatus as recited in claim 2, wherein
   the deployment mechanism is further configured to deploy the head restraining member upwardly from the storage position to the deployed position when the rear-end collision occurs.

4. The vehicle headrest apparatus as recited in claim 2, wherein
   the deployment mechanism is coupled to the tensioning device to apply tension to both the vertical and horizontal support portions during deployment of the head restraining member.

5. The vehicle headrest apparatus as recited in claim 4, wherein
   the tensioning device includes a vertically arranged member configured to move upwardly and forward with respect to the mounting member to apply tension to the vertical support portion, and a horizontally arranged member configured to move upwardly and forward with respect to the mounting member to apply tension to the horizontal support portion.

6. The vehicle headrest apparatus as recited in claim 1, wherein
   the vertical support portion and the horizontal support portion are formed integrally from a flexible sheet material with the horizontal support portion extending directly rearward from an upper edge of the vertical support portion.

7. The vehicle headrest apparatus as recited in claim 1, wherein
   the tensioning device is configured and arranged to apply tension to the vertical and horizontal support portions.

8. The vehicle headrest apparatus as recited in claim 1, wherein
   the head restraining member includes left and right headrest members swingably coupled to the mounting member about left and right vertically arranged pivot axes, respectively, and a swing force applying device configured to deploy the left and right headrest members forwardly from a storage position to a deployed position when a rear-end collision occurs, and
   each of the left and right headrest members includes a vertically arranged member configured to move upwardly and forward with respect to the mounting member to apply tension to the vertical support portion of the head restraining member upon deployment of the swing force applying device, and a horizontally arranged member configured to move upwardly and forward with respect to the mounting member to apply tension to the horizontal support portion of the head restraining member upon deployment of the swing force applying device.

9. The vehicle headrest apparatus as recited in claim 8, wherein
   each of the vertical and horizontal support portions of the head restraining member includes a front flexible sheet layer and a rear flexible sheet layer that overlap each other, and
   the head restraining member is connected to the vertically arranged members and the horizontally arranged members such that the vertically arranged members are located between a pair of lateral end parts of the front and rear flexible sheet layers of the vertical support portion, and such that the horizontally arranged members are located between a pair of lateral end parts of the front and rear sheet layers of the horizontal support portion.

10. The vehicle headrest apparatus as recited in claim 9, wherein
    the head restraining member includes at least one restraining member coupled to the front and rear flexible sheet layers to restrain relative displacement between the front and rear flexible sheet layers.

11. The vehicle headrest apparatus as recited in claim 10, wherein
    the tensioning device includes a tension increasing mechanism configured to apply an additional tension force to the horizontal support portion in response to rearward movement of the vertical support portion by a pressing force from a passenger's head.

12. The vehicle headrest apparatus as recited in claim 8, wherein
    the tensioning device is arranged and configured to apply the tension to the vertical support portion from a forward swing force applied by the swing force applying device.

13. The vehicle headrest apparatus as recited in claim 12, wherein
    the tensioning device includes a tension increasing mechanism configured to apply an additional tension force to the vertical support portion in response to rearward movement of the vertical support portion by a pressing force from a passenger's head.

14. The vehicle headrest apparatus as recited in claim 8, wherein
    the tensioning device is arranged and configured to apply tension to the horizontal support portion from a forward swing force applied by the swing force applying device.

15. The vehicle headrest apparatus as recited in claim 1, wherein
    the tensioning device is further arranged and configured to synchronize movement of the vertical support portion and the horizontal support portion of the head restraining member to apply tension to both the vertical and horizontal support portions.

16. The vehicle headrest apparatus as recited in claim 1, wherein the headrest portion includes left and right headrest members swingably coupled to the mounting member about left and right vertically arranged pivot axes, respectively, and a swing force applying device configured to deploy the left and right headrest members forwardly from a storage position to a deployed position when a rear-end collision occurs.

17. The vehicle headrest apparatus as recited in claim 16, wherein
the tensioning device is arranged and configured to apply tension to the vertical support portion from a forward swing force applied by the swing force applying device.

18. The vehicle headrest apparatus as recited in claim 17, wherein
the tensioning device is arranged and configured to apply tension to the horizontal support portion from the forward swing force applied by the swing force applying device.

19. The vehicle headrest apparatus as recited in claim 17, further comprising
a lock device operatively coupled to the left and right headrest members to hold the left and right headrest members in an initial storage position against an urging force applied by the swing force applying device.

20. The vehicle headrest apparatus as recited in claim 19, further comprising
a controller operatively coupled to the lock device to release the lock device upon detecting a rear-end collision.

21. The vehicle headrest apparatus as recited in claim 16, wherein
the vertical support portion includes a flexible sheet member having left and right lateral ends coupled to the left and right headrest members, respectively, with the flexible sheet member being stretched between the left and right headrest members when the left and right headrest members are in the deployed position.

22. The vehicle headrest apparatus as recited in claim 21, wherein
the left and right headrest members are arranged and configured to apply tension to the horizontal support portion from the forward swing force applied by the swing force applying device.

23. The vehicle headrest apparatus as recited in claim 21, wherein
the vertical support portion further includes at least a front layer constructed of a resilient shape-retaining material with the flexible sheet member extending across the front layer to limit rearward movement of the front layer.

24. The vehicle headrest apparatus as recited in claim 23, wherein
the horizontal support portion is formed integrally with the front layer of the vertical support portion.

25. The vehicle headrest apparatus as recited in claim 23, wherein
the front layer of the vertical support portion has an overall shape of a curved three-dimensional surface that includes a center concaved surface facing forwardly to substantially follow a contour of a back of the passenger's head and a peripheral edge surface curving rearwardly relative to the center concaved surface.

26. The vehicle headrest apparatus as recited in claim 23, wherein
the vertical support portion further includes a rear layer located rearward of the front layer, the front layer being constructed of a low-rigidity material possessing a high deflection characteristic relative to the rear layer and the rear layer being constructed of a high-rigidity material possessing an high load transmitting characteristic relative to the front layer.

27. The vehicle headrest apparatus as recited in claim 23, wherein
the vertical support portion further includes at least one retaining element extending along the front layer to limit excessive bending of the front layer.

28. The vehicle headrest apparatus as recited in claim 27, wherein
the retaining element extends horizontally across the front layer.

29. The vehicle headrest apparatus as recited in claim 27, wherein
the retaining element operatively couples the front layer to the tensioning device.

30. A vehicle headrest apparatus comprising:
a headrest portion including left and right headrest members dividing the headrest portion approximately midway in a transverse direction and a mounting member configured to swingably couple the left and right headrest members to an upper end part of a seatback;
a head restraining member moveably coupled between the left and right headrest members, the head restraining member including a vertical support portion arranged to face towards a passenger's head and a horizontal support portion arranged substantially perpendicular to an upper edge of the vertical support portion, at least one of the horizontal and vertical support portions being made of a resilient shape-retaining material;
a swing force applying device operatively coupled to the left and right headrest members to apply an urging force to the left and right headrest members to swing the left and right headrest members toward a front of a vehicle;
a lock device operatively coupled to the left and right headrest members to hold the left and right headrest members in an initial storage position against the urging force applied by the swing force applying device;
a controller operatively coupled to the lock device to release the lock device upon detecting a rear-end collision; and
a tensioning device operatively coupled to the vertical support portion to apply tension in at least part of the vertical support portion of the head restraining member when the left and right headrest members are in a swung forward state and to reduce deflection of the vertical support portion during elastic deformation of the vertical support portion.

31. The vehicle headrest apparatus as recited in claim 30, wherein
the vertical support portion has an overall shape of a curved three-dimensional surface that includes a center concaved surface facing forwardly to substantially follow a contour of a back of the passenger's head and a peripheral edge surface curving rearwardly relative to the center concaved surface.

32. The vehicle headrest apparatus as recited in claim 30, wherein
the head restraining member has a multi-layered structure at least comprising a front layer being arranged to support the passenger's head and a rear layer located rearward of the front layer, the front layer being constructed of a low-rigidity material possessing a high deflection characteristic relative to the rear layer and the rear layer being constructed of a high-rigidity material possessing a high load transmitting characteristic relative to the front layer.

33. The vehicle headrest apparatus as recited in claim 32, wherein
the multi-layered structure of the head restraining member further comprises a lightweight buffer layer disposed between the front layer and the rear layer.

34. The vehicle headrest apparatus as recited in claim 30, wherein
at least the vertical support portion of the head restraining member includes a horizontally undulated part having horizontally extending undulations.

35. The vehicle headrest apparatus as recited in claim 34, wherein
at least the vertical support portion of the head restraining member includes a vertically undulated part with vertically extending undulations located rearwardly of the horizontally undulated part.

36. The vehicle headrest apparatus as recited in claim 30, wherein
the head restraining member has ribs disposed on a rearwardly facing surface of the head restraining member.

37. The vehicle headrest apparatus as recited in claim 30, wherein
the vertical support portion includes a flexible sheet member having left and right lateral ends coupled to the left and right headrest members, respectively, with the flexible sheet member being stretched between left and right headrest members when the left and right headrest members are in the swung forward state.

38. The vehicle headrest apparatus as recited in claim 37, wherein
the sheet member is configured and arranged relative to the left and right headrest members to convert a pressing force of the passenger's head acting on the head restraining member into a tensile force in the sheet member.

39. The vehicle headrest apparatus as recited in claim 30, wherein
the left and right headrest members include a resistance mechanism that limits relative rearward movement of the left and right headrest members relative to the mounting member in response to a rearward pressing force acting on the head restraining member.

40. The vehicle headrest apparatus as recited in claim 30, further comprising
a swing regulating member arranged between swinging portions of the left and right headrest members to fix maximum swing positions of the left and right headrest members.

41. A vehicle headrest apparatus comprising:

headrest means for mounting to an upper end part of a seatback;

vertical head restraining means for supporting a passenger's head when a rear-end collision occurs;

horizontal head restraining means for supporting a passenger's head when the rear-end collision occurs, the horizontal head restraining means being arranged substantially perpendicular to the vertical head restraining means; and tensioning device means for applying tension to at least part of the vertical head restraining means when the rear-end collision occurs.

* * * * *